US005471008A

United States Patent [19]

Fujita et al.

[11] Patent Number: 5,471,008

[45] Date of Patent: Nov. 28, 1995

[54] MIDI CONTROL APPARATUS

[75] Inventors: Akihiro Fujita, Iwata; Seiji Nakano, Hamamatsu; Katsushi Ishii, Iwata, all of Japan

[73] Assignee: Kabushiki Kaisha Kawai Gakki Seisakusho, Hamamatsu, Japan

[21] Appl. No.: 327,261

[22] Filed: Oct. 21, 1994

Related U.S. Application Data

[63] Continuation of Ser. No. 849,038, Apr. 9, 1992, abandoned.

[30] Foreign Application Priority Data

Nov. 19, 1990 [JP] Japan ........................................ 311464

[51] Int. Cl.$^{6}$ ............................ G09B 15/02; G10H 1/46; G10H 7/00

[52] U.S. Cl. ............................ 84/633; 84/645; 84/477 R

[58] Field of Search ..................... 84/601, 602, 609–614, 84/617, 626, 633–638, 645, 477 R, 478, 453, 462

[56] References Cited

U.S. PATENT DOCUMENTS

| | | | |
|---|---|---|---|
| 4,295,406 | 10/1981 | Smith | 84/478 X |
| 4,903,571 | 2/1990 | Coles | 84/453 X |
| 5,009,147 | 4/1991 | Yamamori | 84/633 X |
| 5,099,738 | 3/1992 | Hotz | 84/645 X |
| 5,131,309 | 7/1992 | Nishikawa et al. | 84/601 |
| 5,138,926 | 8/1992 | Stier et al. | 84/634 X |
| 5,142,961 | 9/1992 | Paroutaud | 84/645 X |
| 5,208,421 | 5/1993 | Lisle et al. | 84/645 |
| 5,225,618 | 7/1993 | Wadhams | 84/602 |

*Primary Examiner*—Stanley J. Witkowski
*Attorney, Agent, or Firm*—Joseph C. Mason, Jr.; Ronald E. Smith

[57] ABSTRACT

An apparatus for inputting MIDI information output from a sequencer or a keyboard and performing a predetermined process on the input MIDI information in accordance with an instruction from an operation panel to alter that information to new MIDI information or to generate new MIDI information in the apparatus in accordance with an instruction from the operation panel, and for outputting the altered or generated MIDI information to a tone generator to provide tone generation or the setting of a machine.

13 Claims, 79 Drawing Sheets

Fig. 3B

| | | | |
|---|---|---|---|
| F_OF_F FADER ON/OFF FLAG | STORE PROHIBITION AGAINST VOLUME TRANSMISSION AT THE TIME OF READING SETUP AND INVALIDATION OF FADER OPERATION IN SETUP MODE AFTER SETUP READING | SETUP DATA LOAD AREA (TEMPORARY) | WORK MEMORY 6 |
| P_V_B PRESET VOLUME BUFFER | STORE POSITIONS OF FADERS 1-17 | | |
| P_P_B PRESET PROGRAM BUFFER | STOR PROGRAM CHANGE DATA FOR CHANNELS 1-16 | | |
| CH-C-T CHANNEL CONVERT TABLE | STORE CHANNELS AFTER CONVERSION OF CHANNELS 1-16 | | |
| P_N_B SETEEP NAME BUFFER | SETUP NAME BUFFR | | |
| EX_DB EXCLUSIVE DATA BUFFER | STORE EXCLUSIVE DATA BYTE | EXCLUSIVE LOAD AREA (TEMPORARY) | |
| EXDUB EXCLUSIVE DATA DUMMY | DUMMY DATA FOR END OF EXCLUSIVE DATA | | |
| EX_NB EXCLUSIVE NAME BUFFER | STORE EXCLUSIVE NAME | | |
| M B MERGE BUFFER | BUFFER FOR ESTABLISHING ONE MESSAGE OF MIDI DATA | | |
| P T B PRETRANSMIT BUFFER | SAME AS ABOVE | | |
| DATA WRITE POINTER | | | |
| DATA WRITE BUFFER | | | |
| M_F_R MODE FLAG REGISTER | FLAG REGISTER INDICATING MODE | | |
| F_C_B FADER CHANNEL BUFFER | | | |
| OTHERS | OTHER WORKS | | |

Fig. 72

S E P A  C H .
1  1 2  1 2  - - - - - -

Fig. 73

S E P A R A T E  M E N U
T Y P E =  R E A L  T I M E

Fig. 74

S E P A R A T E  M E N U
T Y P E =  N O T E  N O .

Fig. 75

S E P A  K E Y = C  2 ~  1
S S S  S S  S S

Fig. 76

```
SEPARATE MENU
TYPE=    ODD/EVEN
```

Fig. 77

```
SEPA ODD/EVEN
SS   SSSS      S
```

Fig. 78

```
SEPARATE MENU
TYPE=   VEL SPLIT
```

Fig. 79

```
SEPA VEL=065~   1
SSS SS SS
```

Fig. 87

```
N A M E D A T A            0 2
  4 0   4 A   0 2   0 3   0 4
```

Fig. 88

```
N A M E D A T A            0 2
  4 0   0 0   4 A   0 2   0 3
```

Fig. 89

```
N A M E D A T A            0 2
  4 0   0 1   0 2   0 3   0 4
```

Fig. 90

```
N A M E D A T A            0 9
  4 7   # #
```

Fig. 95

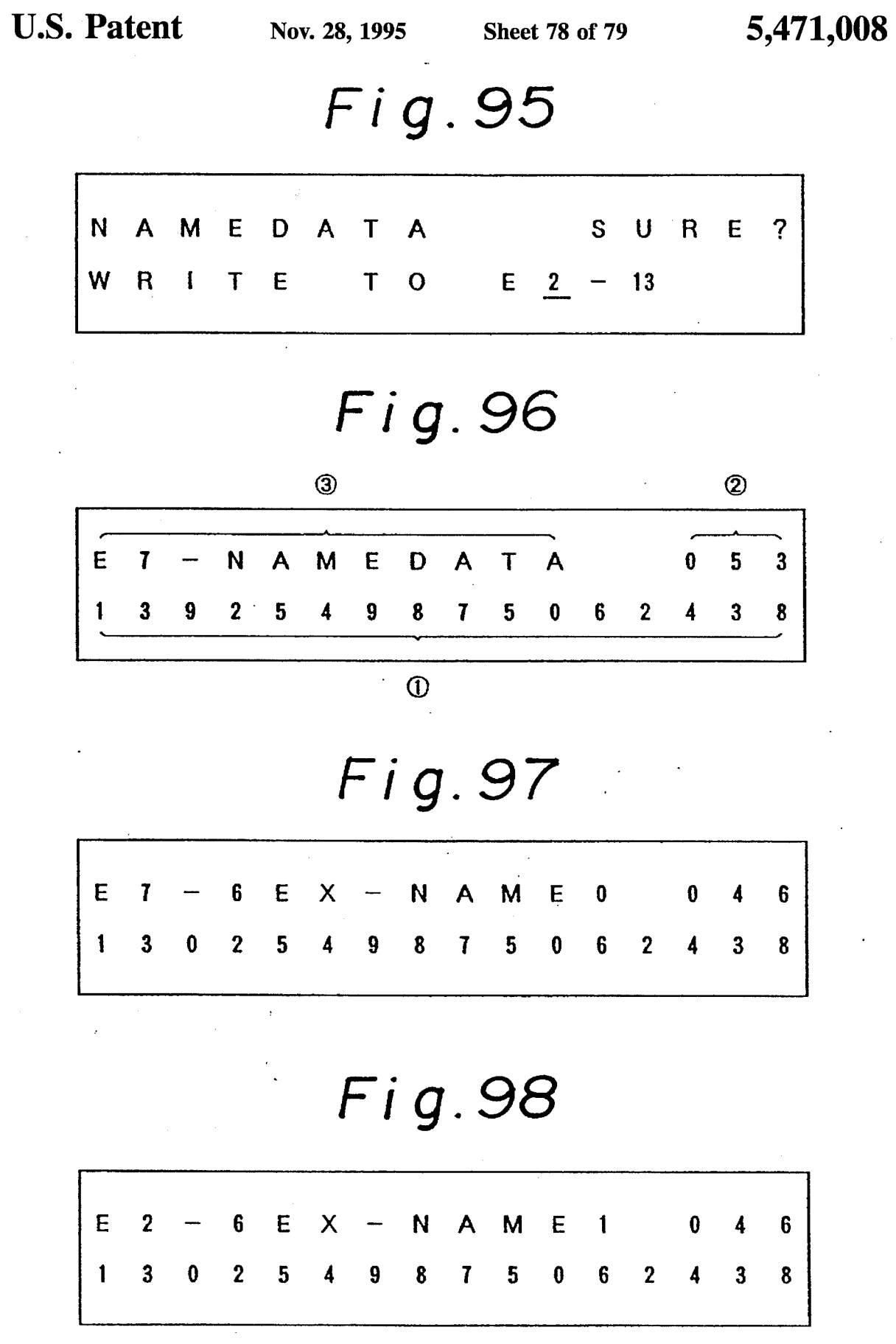

```
N A M E D A T A       S U R E ?
W R I T E   T O   E 2 - 13
```

Fig. 96

```
          ③                          ②
E 7 - N A M E D A T A     0 5 3
1 3 9 2 5 4 9 8 7 5 0 6 2 4 3 8
            ①
```

Fig. 97

```
E 7 - 6 E X - N A M E 0   0 4 6
1 3 0 2 5 4 9 8 7 5 0 6 2 4 3 8
```

Fig. 98

```
E 2 - 6 E X - N A M E 1   0 4 6
1 3 0 2 5 4 9 8 7 5 0 6 2 4 3 8
```

MIDI CONTROL APPARATUS

This is a continuation of copending application Ser. No. 07/849,038 filed Apr. 9, 1992 and now abandoned.

TECHNICAL FIELD

The present invention relates to an electronic musical instrument control apparatus which performs a predetermined process on, for example, MIDI (Musical Instrument Digital Interface) information supplied from a sequencer or produced in this apparatus, and supplies that information to a synthesizer (tone generator).

BACKGROUND ART

Conventionally, MIDI is specified as the international standard for musical tone information. In an electronic musical instrument or the like which is designed to be capable of dealing With MIDI information, therefore, a musical tone is generated by driving a tone generator in that instrument based on the MIDI information supplied from outside as well as by driving a tone generator based on tone information generated in the instrument itself.

Such electronic musical instruments are not adapted to process MIDI information, which differs depending on their classes. Nor do they have excellent machine operability. An electronic musical instrument control apparatus with excellent operability is therefore demanded so that a player can produce desirable and abundant musical tones according to the player's feeling.

A conventional electronic musical instrument designed to process MIDI information has various shortcomings as follows.

(1) Conventionally, a master keyboard which can control multiple MIDI devices as well as play by itself has been developed and put into a practical use. The master keyboard has a function for simultaneously outputting a previously stored program change signal for about four channels in order to change a timbre.

In the cases where one wants to control more channels, or output a volume signal at the same time, however, the same operation has to be repeated multiple times, thereby yielding lower operability.

(2) The technique for transferring and processing a MIDI signal of an electronic musical instrument has the following shortcoming.

In general, a sequencer includes a function for setting a MIDI output channel. Many synthesizers or the like are capable of setting a MIDI output channel and a MIDI input channel.

Conventionally, however, the MIDI signal sender side or MIDI signal receiver side simply acknowledges a MIDI channel and performs a channel switching process. In the case of controlling many MIDI devices by one apparatus, therefore, setup for an individual MIDI device is required, resulting in troublesome operation and low operability.

(3) An electronic musical instrument control apparatus as a MIDI information dividing apparatus is known, which divides MIDI information input from an electronic musical instrument, etc. according to predetermined conditions, outputs the MIDI information, and controls multiple tone generators.

Available in the market place are, for example, a MIDI patch bay which can select the destination to output MIDI information for each MIDI connector (16 channels) by switching the connection, and a synthesizer which can switch a timbre by a tone range and the degree of a velocity in the same tone generator.

A player, however, may wish to select the destination to output the MIDI information for every MIDI channel in order to generate a musical tone proper for a tone generator or to produce a musical tone using a tone generator desired by the player.

With the above structure where the output destination is selected by the units of connectors or a timbre is switched in the same tone generator, however, the output destination cannot be changed (a different tone generator cannot be driven) by the units of MIDI channels.

(4) While an electronic musical instrument control apparatus as the MIDI information dividing apparatus described in (3) above is conventionally known, some apparatuses have specifications that request that a channel message directly affecting tone generation be output from the first output terminal and other messages from the second output terminal.

Such a request cannot be satisfied with the above-described structure where the output destination is selected by the units of connectors or a timbre is changed in the same tone generator.

(5) While an electronic musical instrument control apparatus as the MIDI information dividing apparatus described in (3) above is conventionally known, a player want want to select the output destination by the magnitude of a note number in order to generate a musical tone adequate for a tone generator, or to generate a musical tone using a tone generator the player desires. The player may desire to use a musical tone of a low note number as bass and activate the first tone generator, and to activate the second tone generator for a musical tone of a high note number as a melody.

The desire to change the output destination by the magnitude of note number cannot be granted with the above-described structure where the output destination is selected by the units of connectors or a timbre is changed in the same tone generator.

(6) While electronic musical instrument control apparatus as the MIDI information dividing apparatus described in (3) above is conventionally known, an electronic musical instrument generally has a limited number of musical tones generated at a time because of the structure of the instrument. A single electronic musical instrument therefore cannot generate more than a predetermined number of musical tones at the same time.

On the contrary, an acoustic piano, for example, can simultaneously generate as many musical tones as the number of keys provided. There is a demand for an electronic musical instrument which, like the piano, can simultaneously generate as many more musical tones as possible to enable a variety of performances using more musical tones.

That demand cannot be fulfilled with the above-described structure where the output destination is selected by the unit of connectors or a timbre is changed in the same tone generator.

(7) While electronic musical instrument control apparatus as the MIDI information dividing apparatus described in (3) above is conventionally known, a player may want to select the output destination according to the velocity of a message having a note number in order to generate a musical tone adequate for a tone generator, or to generate a musical tone using a tone generator of the player's preference.

That desire to choose the output destination according to the velocity of a message having a note number however cannot be met with the above-described structure where the output destination is selected by the units of connectors or a timbre is changed in the same tone generator.

(8) A method of using volume information for volume change is known as a conventional method of changing a volume.

Generally, a musical instrument is adapted so that not only volume but also timbre are changed according to the strength of a key strike. The method of using volume information to change the volume can hardly vary the volume according to a change in the velocity of an input musical tone. In preparing automatic playing data, there is another demand to prepare the data which is given the same velocity.

(9) An electronic musical instrument control apparatus is conventionally known which has a device for displaying a negative fader value. This electronic musical instrument control apparatus generally has 16 (or 17) faders which are used for processing input MIDI information before outputting it. It is necessary for the electronic musical instrument control apparatus to express the individual fader values (normally 0 to 127) by one character (5×7) in order to display 16-channel fader values at a time on a 16-digit liquid crystal display device (hereafter referred to as "LCD"). To accomplish this, therefore, one may omit the first digit and express the fader values by 0 to 12 as shown in FIG. 50A or 50B, for example.

The fader values however have to be negative in mode where a fader value is added to the velocity of input MIDI information before the information is output (for example, "–64 to 63"). If these fader values are to be represented as ""–6 to 6" by omitting the first digit in the same manner as the above case, "–" in "–6," for example should be shown by one row if "6" is expressed by three rows, as shown in FIG. 56. Accordingly, the visual difference between the positive number and the negative number becomes slight, deteriorating the visual recognition. This tendency becomes stronger particularly when other numbers are displayed on both sides of that number. Further, since numerals are arranged by 16 digits, it is hard to distinguish, for example, "12" from "–2" as shown in FIG. 57.

It is therefore useless to display all the fader values by rearranging the values into 16-digit characters.

(10) An apparatus which outputs MIDI volume information by a sliding volume (fader) is conventionally known. In this apparatus, mode change on the sender side or the operation on the receiver side might change the relationship between the actual volume and the position of the fader.

In other words, if the volume of an associated apparatus is changed without notice, an apparatus which handles 16-channel volumes by 16 faders cannot match the position of the fader to the volume without moving the fader corresponding to the shifted channel.

Accordingly, all the faders have to be moved for complete matching. Since it cannot be judged at a glance whether mismatching has occurred, it may be uncertain which fader (channel) has been moved. Further, there are many cases where matching is desirably performed at a time if possible because moving a fader in the unmatched conditions suddenly changes the volume. Conventionally, however, that operation could not be done. Moreover, if one tries to match a fader to the actual volume, the fader moves, which gives rise to trouble when making the fader steady (not moving the fader) is desirable.

(11) Conventionally, there are a MIDI Volume controller (mixer) and a master keyboard which can output MIDI volume information.

The MIDI volume information however can be output only in, for example, mixer mode which changes the volume, and the volume cannot be altered in other modes. When the volume needs to be altered in a predetermined mode, therefore, the mode should temporarily be changed to the one which enables volume changing, resulting in poor operability.

(12) Conventionally, an apparatus, which assigns exclusive data to a sliding volume (fader) and outputs the exclusive data by moving the fader, employs a method of selecting the exclusive data from a fixed or predetermined repertory.

It is therefore difficult for a user to collect exclusive data about a desired apparatus or obtain exclusive data for a new apparatus.

(13) In general, to set parameters, such as timbre, an electronic musical instrument like a synthesizer has data input means such as one or more faders. Some electronic musical instruments comprise an exclusive remote controller.

Conventionally, however, a parameter to be altered is called by a mode switch or the like, and then data is changed by a fader, etc., yielding poor operability.

The present invention has been contrived to overcome the above-described shortcomings.

(1) It is a primary object to provide an electronic musical instrument control apparatus with excellent operability which can output program change signals and volume signals for 16 MIDI channels at the same time, and execute setup of many MIDI devices simultaneously.

(2) It is a second object to provide an electronic musical instrument control apparatus with excellent operability which converts channels between the output side of MIDI information and the receiver side of the MIDI information (on the way of transferring a MIDI signal) to collectively associate the channels of the output side of the MIDI information with those of the receiver side of the MIDI information, simplifying environmental setting or the like.

(3) It is a third object to provide an electronic musical instrument control apparatus as a MIDI information dividing apparatus which can permit an output terminal to be selected for every MIDI channel so that it can generate a musical tone from a tone generator of a player's preference or a musical tone proper for a tone generator.

(4) It is a fourth object to provide an electronic musical instrument control apparatus as a MIDI information dividing apparatus which can allow a channel message directly affecting tone generation to be output from a first output terminal and other messages to be output from a second output terminal so as to cope with the specifications of many devices.

(5) It is a fifth object to provide an electronic musical instrument control apparatus as a MIDI information dividing apparatus which can allow an output destination to be selected according to the magnitude of a note number so as to generate a musical tone from a tone generator of a player's preference or a musical tone proper for a tone generator.

(6) It is a sixth object to provide an electronic musical instrument control apparatus as a MIDI information dividing apparatus which can permit an output destination to be selected according to whether a note number is an odd number or even number so as to artificially increase the number of simultaneously generated tones by driving different tone generators for individual output destinations, thus ensuring a variety of performances that a player desires.

(7) It is a seventh object to provide an electronic musical instrument control apparatus as a MIDI information dividing apparatus which can permit an output destination to be selected according to the velocity of a message having a note number so as to generate a musical tone from a tone generator of a player's preference or a musical tone proper for a tone generator.

(8) It is an eighth object of the present invention to provide an electronic musical instrument control apparatus as a velocity manipulating apparatus which can not only change the volume by adding a volume signal to an input MIDI signal, but also directly manipulate velocity data.

(9) It is a ninth object of the present invention to provide an electronic musical instrument control apparatus having a display device which can improve the visibility of negative numerals by effectively displaying the negative numerals in limited space.

(10) It is a tenth object of the present invention to provide an electronic musical instrument control apparatus with excellent operability which can correct mismatching of volume to the positions of faders for all the channels simultaneously and without moving faders.

(11) It is an eleventh object of the present invention to provide an electronic musical instrument control apparatus as a volume information storing apparatus with excellent operability, which has a master volume valid in other modes than a mode that permits volume alteration, i.e., in other modes, and allows for a volume operation even in the other modes.

(12) It is a twelfth object of the present invention to provide an electronic musical instrument control apparatus as an exclusive editing apparatus which permits a user to freely prepare exclusive data.

(13) It is a thirteenth object of the present invention to provide an electronic musical instrument control apparatus with improved operability, which does not require selection of a parameter by means of a key switch or the like, and which can move a fader to which a parameter to be altered is assigned so as to change data.

DISCLOSURE OF THE INVENTION (1) To achieve the first object, an electronic musical instrument control apparatus according to the present invention is characterized by comprising storage means in which patch information including volume information for at least 16 channels and program change information are stored; instruction means for instructing to set an external device in a predetermined status; and output means for, when an instruction is given from the instruction means, reading the patch information from the storage means and outputting the patch information to an external device of 16 channels.

When an instruction is given, patch information is read out from the storage means, and volume information for 16 channels and program change information included in the patch information are output and set in an external device, all at one time. It is therefore possible to provide an electronic musical instrument control apparatus with excellent operability which can instantaneously perform setup for all the MIDI devices at a touch.

(2) To achieve the second object, an electronic musical instrument control apparatus according to the present invention is characterized by comprising input means for inputting MIDI information; a table in which channel information before conversion and channel information after conversion are stored in association with each other; processing means for, when MIDI information is input through the input means, searching the table using channel information included in the MIDI information as channel information before conversion to extract channel information after conversion and replacing the channel information after conversion with the channel information included in the MIDI information; and output means for outputting MIDI information processed by the processing means.

According to this invention, channel information included in input MIDI information is converted into a channel number based on a prestored table, and the number is output as new MIDI information.

With this structure, channel information included in input MIDI information can be converted by the units of channels, so that information of a specific channel can be converted into arbitrary channel information.

For instance, in the case where a request is made to use a keyboard instrument capable of outputting only MIDI information for one channel to activate two channels of another tone generator, this request can be easily fulfilled by designating a 1-channel input to a 2-channel output using the channel converting function of this invention.

(3) To achieve the third object, an electronic musical instrument control apparatus according to the present invention is characterized by comprising input means for inputting MIDI information; specifying means for specifying that an output destination of MIDI information is to be determined channel by channel; setting means for setting a parameter indicating an output destination for each channel when it is specified by the specifying means that an output destination of MIDI information is to be determined channel by channel; control means for, when MIDI information is input through the input means with determination of an output destination of MIDI information channel by channel being specified by the specifying means, referring to that parameter corresponding to channel information included in the MIDI information which is set by the setting means and determining the output destination of MIDI information based on the parameter; and a plurality of output means for outputting MIDI information whose output destination has been determined by the control means.

According to this invention, an output destination is determined in advance for each channel, and the output destination for input MIDI information is determined by referring to channel information included in this input MIDI information.

Accordingly, a player can output MIDI information of each channel to an arbitrary output destination or to an arbitrary tone generator, so that a musical tone of the tone generator the player desires or a musical tone suitable for a tone generator can be generated.

(4) To achieve the fourth object, an electronic musical instrument control apparatus according to the present invention is characterized by comprising input means for inputting MIDI information; specifying means for specifying that an output destination of MIDI information is to be determined in accordance with the type of the MIDI information; control means for, when MIDI information is input through the input means with determination of an output destination of MIDI information in accordance with the type of the MIDI information being specified by the specifying means, determining an output destination in accordance with the type of the MIDI information; and a plurality of output means for outputting MIDI information whose output destination has been determined by the control means.

According to this invention, an output destination is determined in advance for each type of input MIDI information, and the type of the MIDI information is discriminated to determine the output destination.

Accordingly, for example, a channel message is output from the first output terminal and other messages are output from the second output terminal so as to ensure distribution of those messages to separate output destinations. It is therefore possible to accomplish division of MIDI information that can cope with the specifications of many different devices.

(5) To achieve the fifth object, an electronic musical instrument control apparatus according to the present invention is characterized by comprising input means for inputting MIDI information; specifying means for specifying that an output destination of MIDI information is to be determined by the magnitude of a note number; setting means for setting a threshold value for discrimination of the magnitude of a note number and a parameter indicating an output destination for each channel in accordance with the threshold value when it is specified by the specifying means that an output destination of MIDI information is to be determined by the magnitude of a note number; control means for, when MIDI information is input through the input means with determination of an output destination of MIDI information by the magnitude of a note number being specified by the specifying means, referring to those threshold values and parameters corresponding to channel information included in the MIDI information which are set by the setting means to thereby determine the output destination of MIDI information; and a plurality of output means for outputting MIDI information whose output destination has been determined by the control means.

According to this invention, an output destination is determined in accordance with the magnitude of a note number, and the output destination for input MIDI information is determined referring to a note number included in this input MIDI information.

Accordingly, a player can output MIDI information of each channel to an arbitrary output destination or to an arbitrary tone generator in accordance with the magnitude of a note number, so that a musical tone of the tone generator the player desires or a musical tone suitable for a tone generator can be generated.

(6) To achieve the sixth object, an electronic musical instrument control apparatus according to the present invention is characterized by comprising input means for inputting MIDI information; specifying means for specifying that an output destination of MIDI information is to be determined in accordance with whether a note number is an odd number or an even number; setting means for setting a parameter indicating an output destination for each channel in accordance with whether a note number is an odd number or an even number when it is specified by the specifying means that an output destination of MIDI information is to be determined in accordance with whether a note number is an odd number or an even number; control means for, when MIDI information is input through the input means in a case where it is specified by the specifying means that an output destination of MIDI information is to be determined in accordance with whether a note number is an odd number or an even number, referring to that parameter corresponding to channel information included in the MIDI information which is set by the setting means to thereby determine the output destination of MIDI information; and a plurality of output means for outputting MIDI information whose output destination has been determined by-the control means.

According to this invention, an output destination is determined in accordance with whether a note number is an odd number or an even number, and the output destination for input MIDI information is determined referring to a note number included in this input MIDI information.

Accordingly, a player can output MIDI information of each channel to an arbitrary output destination or to an arbitrary tone generator in accordance with whether a note number is an even number or an odd number, so that the number of simultaneously generated tones is increased artificially by driving different tone generators for individual output destinations, thus ensuring a variety of performances that the player desires.

(7) To achieve the seventh object, an electronic musical instrument control apparatus according to the present invention is characterized by comprising input means for inputting MIDI information; specifying means for specifying that an output destination of MIDI information is to be determined by a velocity; setting means for setting a threshold value for discrimination of the degree of a velocity and a parameter indicating an output destination for each channel in accordance with the threshold value when it is specified by the specifying means that an output destination of MIDI information is to be determined by a velocity; control means for, when MIDI information is input through the input means with determination of an output destination of MIDI information by a velocity being specified by the specifying means, referring to those threshold values and parameters corresponding to channel information included in the MIDI information which are set by the setting means to thereby determine the output destination of MIDI information; and a plurality of output means for outputting MIDI information whose output destination has been determined by the control means.

According to this invention, an output destination is determined in accordance with a velocity, and the output destination for input MIDI information is determined referring to a velocity included in this input MIDI information.

Accordingly, a player can output MIDI information of each channel to an arbitrary output destination or to an arbitrary tone generator in accordance with the value of a velocity, so that a musical tone of the tone generator the player desires or a musical tone suitable for a tone generator can be generated.

(8) To achieve the eighth object, an electronic musical instrument control apparatus according to the present invention is characterized by comprising input means for inputting MIDI information; instruction means for instructing alteration of a velocity of MIDI information input through the input means; velocity imparting means for giving velocity information to be changed; control means for, when velocity alteration is instructed by the instruction means, altering a velocity of MIDI information input through the input means in accordance with the velocity information given by the velocity imparting means; and a plurality of output means for outputting MIDI information whose velocity has been changed by the control means.

According to this invention, the velocity of input MIDI information is processed in accordance with velocity information given by the velocity imparting means and is output as new MIDI information.

It is therefore possible to provide an electronic musical instrument control apparatus as a velocity manipulating apparatus which can not only change the volume by adding a volume signal to an input MIDI signal, but which can also directly manipulate velocity data.

(9) To achieve the ninth object, according to the present invention, an electronic musical instrument control apparatus for subjecting input MIDI information to a predetermined processing before outputting the information, is characterized by comprising display means for displaying a positive number or a negative number, the negative number highlighted when displayed by the display means.

(10) To achieve the tenth object, an electronic musical instrument control apparatus according to the present invention is characterized by comprising instruction means for instructing outputting of predetermined control information; storage means for storing positional information of a plurality of manipulators; producing means for producing plural pieces of control information including the positional information of a plurality of manipulators stored in the storage means; and output means for outputting the plural pieces of control information produced by the producing means.

According to this invention, when one switch, for example, as the instruction means is depressed, plural pieces of control information including position information corresponding to the positions of manipulators at that time, e.g. a plural pieces of MIDI volume information, are produced and are output simultaneously.

Even when the positions of manipulators, for example, differ from control information which should actually correspond to the positions of those manipulators, therefore, the differences can be corrected at a touch.

(11) To achieve the eleventh object, an electronic musical instrument control apparatus according to the present invention is characterized by comprising a plurality of manipulators for designating volume information in a volume change mode and designating different information in other modes; storage means for storing the volume information designated by the plurality of first manipulators; a second manipulator for instructing relative alteration of all the pieces of volume information designated by the plurality of first manipulators; producing means for, when the second manipulator is manipulated, processing the volume information stored in the storage means in accordance with the amount of manipulation of the second manipulator irrespective of modes to produce new volume information; and output means for outputting the volume information produced by the producing means.

According to this embodiment, with the positions of multiple first manipulators, e.g., faders, in volume change mode stored in the storage means, when the second manipulator, e.g., a master volume, is operated, a new volume value is computed in accordance with the amount of manipulation of the master volume referring to the contents of the storage means, regardless of the mode of this apparatus, and this new value is then output.

Even in modes other than the volume change mode, therefore, the volume can be altered while keeping the volume balance by manipulating the master volume.

(12) To achieve the twelfth object, an electronic musical instrument control apparatus according to the present invention is characterized by comprising instruction means for instructing effecting of an exclusive edit mode; input means for inputting predetermined data; producing means for producing exclusive information in accordance with an input from the input means when effecting of the exclusive edit mode is instructed by the instruction means; and storage means for storing the exclusive information produced by the producing means.

According to this invention, the exclusive mode for producing exclusive information is provided in addition to a mode for manipulating exclusive information, so that a user can produce exclusive information as desired. It is therefore possible to easily execute production, alteration, copying, etc. of exclusive data, permitting a player to make a performance according to the player's preference by producing the desirable exclusive information and using it as desired.

(13) To achieve the thirteenth object, an electronic musical instrument control apparatus according to the present invention is characterized by comprising storage means for storing exclusive information; a manipulator for inputting information; producing means for reading out the exclusive information stored in the storage means and altering the exclusive information by manipulation of the manipulator to produce new exclusive information; and outputting means for outputting the exclusive information produced by the producing means.

According to this invention, one parameter information is assigned to one fader as a manipulator using an MIDI exclusive message as exclusive information, and the fader is moved, thus ensuring a MIDI output while changing data. When this output is input to a musical instrument whose parameter is to be changed, that parameter is altered in accordance with the fader. This structure can allow for simultaneous alteration of a plurality of parameters.

BRIEF DESCRIPTION OF THE DRAWINGS

FIG. 3B is the second half of said memory map;

FIG. 72 is a diagram showing another example of the channel separate screen in the third embodiment;

FIG. 73 is a diagram exemplifying a real time separate screen in the fourth embodiment;

FIG. 74 is a diagram exemplifying a note number separate screen in the fifth embodiment;

FIG. 75 is a diagram showing another example of the note number separate screen in the fifth embodiment;

FIG. 76 is a diagram exemplifying an odd/even separate screen in the sixth embodiment;

FIG. 77 is a diagram showing another example of the odd/even separate screen in the sixth embodiment;

FIG. 78 is a diagram exemplifying a velocity separate screen in the seventh embodiment;

FIG. 79 is a diagram showing another example of the velocity separate screen in the seventh embodiment;

FIG. 87 is a diagram showing a further example of the exclusive data edit screen in the twelfth embodiment;

FIG. 88 is a diagram showing a still further example of the exclusive data edit screen in the twelfth embodiment;

FIG. 89 is a diagram showing a still further example of the exclusive data edit screen in the twelfth embodiment;

FIG. 90 is a diagram showing a still further example of the exclusive data edit screen in the twelfth embodiment;

FIG. 95 is a diagram showing another example of the exclusive write screen in the twelfth embodiment;

FIG. 96 is a diagram exemplifying an exclusive fader screen in the thirteenth embodiment;

FIG. 97 is a diagram showing another example of the exclusive fader screen in the thirteenth embodiment;

FIG. 98 is a diagram showing a different example of the exclusive fader screen in the thirteenth embodiment;

BEST MODE OF CARRYING OUT THE INVENTION

Figure 1:
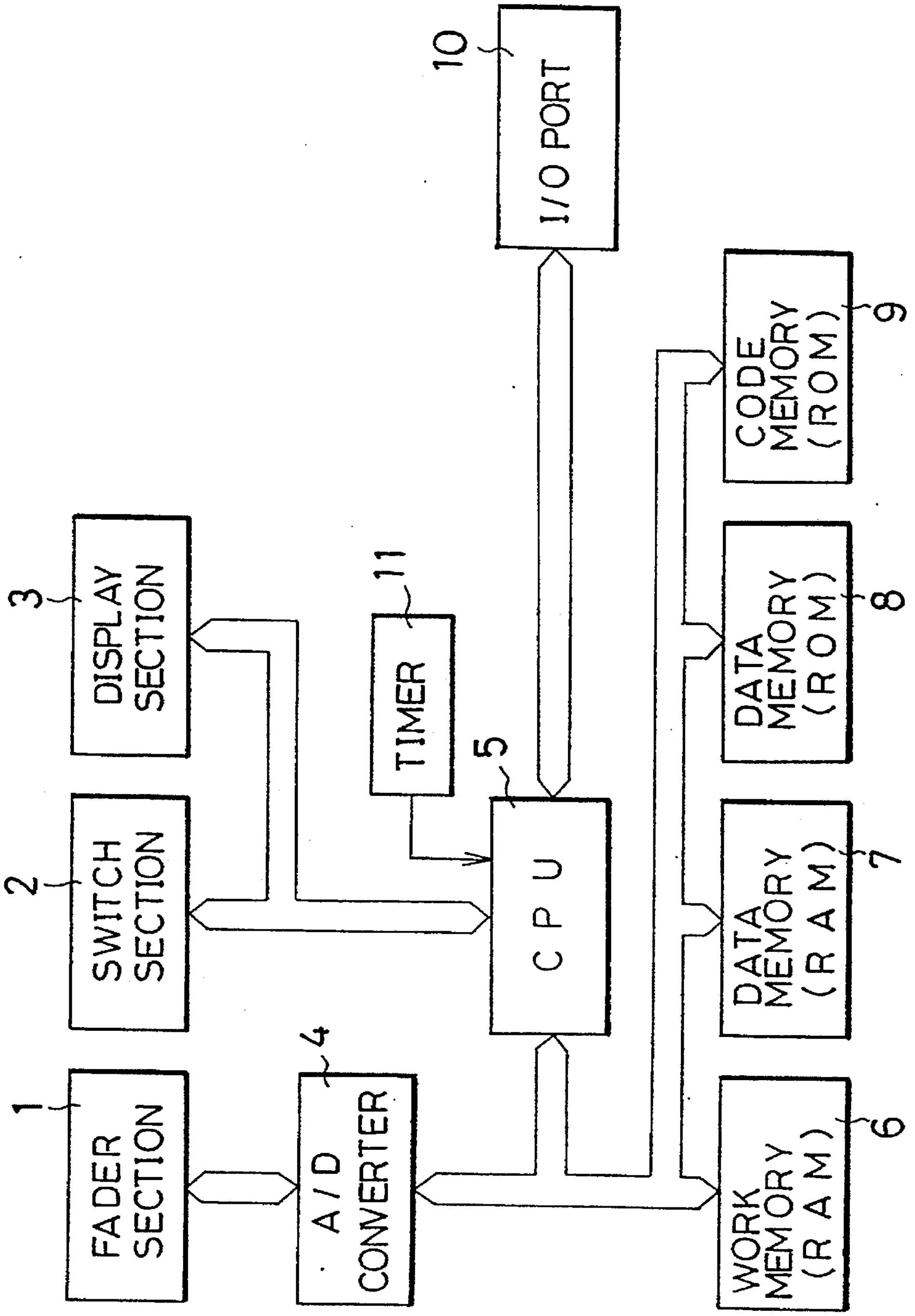
FIG. 1 is a block diagram schematically illustrating the general structure of an electronic musical instrument control apparatus according to the present invention.

A structure common to the individual embodiment to be explained below will be described first. FIG. 1 is a schematic block diagram illustrating the structure of an electronic instrument control apparatus according to the prevent embodiment.

Since the MIDI standards are well known, they will not be described specifically.

In this diagram, reference numeral "1" denotes a fader section comprising 17 slide switches operable by a player. Sixteen switches out of the 17 slide switches correspond to 16 channels under the MIDI standards, respectively, permitting various designations (changes) channel by channel. The remaining one switch is a master volume which permits various designations (changes) for all the 16 channels at the same time. The output of the fader section 1 is sent to an A/D converter 4.

Reference numeral "2" is a switch section comprising various switches for performing mode control, cursor movement, data entry, etc. The setting statuses of the individual switches in the switch section 2 are supplied to a CPU 5.

Reference numeral "3" is a display section constituted of, for example, an LCD or the like, which can display numbers and characters in 2 rows by 16 columns. Data displayed on the display section 3 is supplied from the CPU 5.

The fader section 1, the switch section 2 and the display section 3 are provided on an operation panel, so that a player can freely operate or view them. The detailed explanation of the operation panel will be given later.

Reference numeral "4" is the A/D converter which converts an analog signal associated with a switch-set position sent from the fader section 1 into a digital signal. Information from the fader section 1, after being converted into the digital signal by this A/D converter, is sent to the CPU 5.

Reference numeral "5" is the CPU which performs the general control of the apparatus. The CPU 5 is constituted of, for example, a microcomputer.

Reference numeral "6" is a work memory, including a random access memory (hereafter referred to as "RAM"). When power is supplied, this work memory is initialized and predetermined initial data is written in said work memory.

Figure 3A:
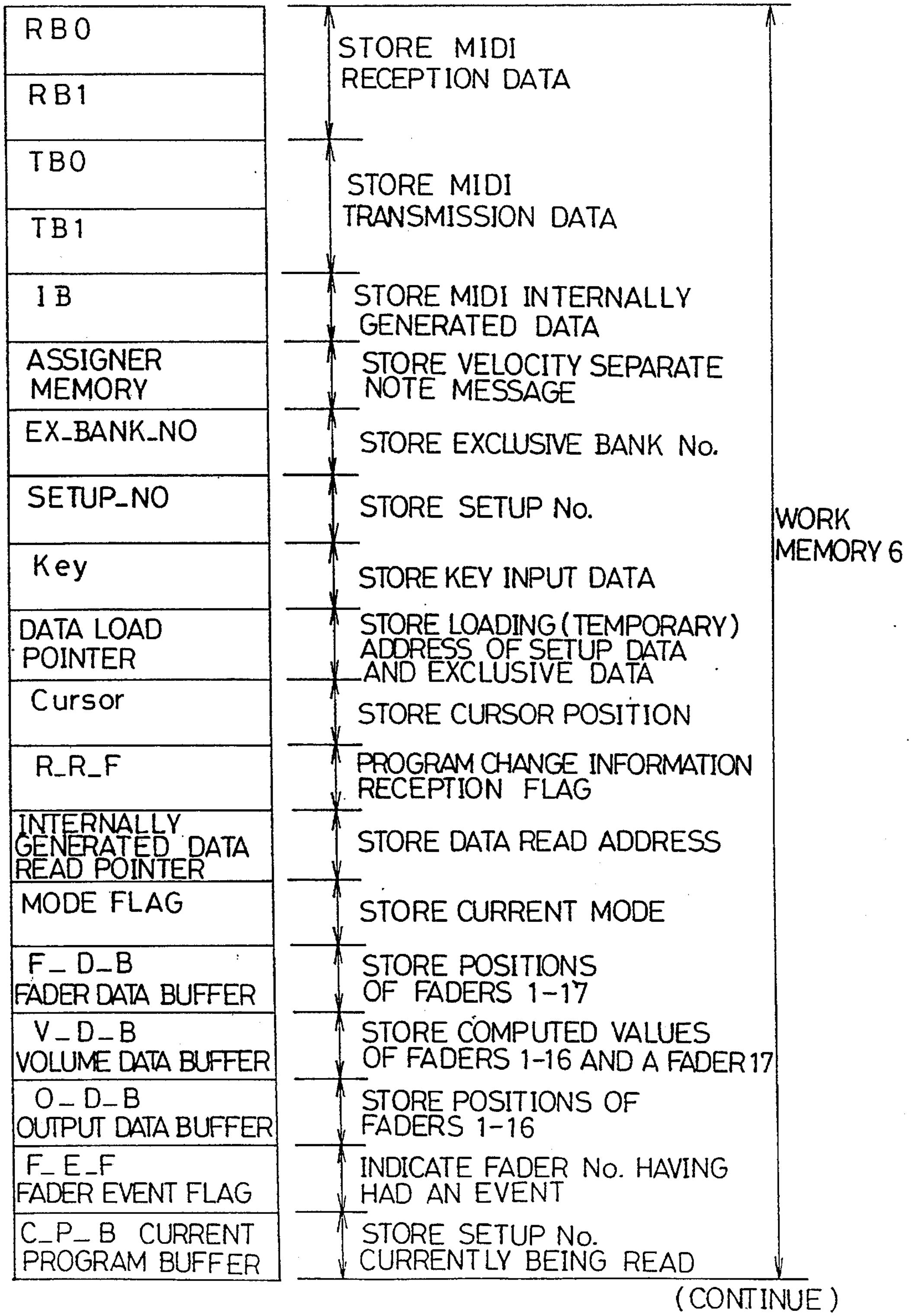
FIG. 3A is the first half of a memory map showing allocation of a work memory.

The allocation (memory map) of the work memory 6 is shown in detail in FIGS. 3A and 3B. The sizes and functions of the individual areas will be described below as needed.

Reference numeral "7" is a data memory also constituted of a RAM. The data memory 7 is not initialized, but is set by a system, and is used for various purposes. The detailed illustration of the allocation (memory map) of the data memory 7 is given in FIG. 4. The sizes and functions of the individual areas will be described hereinafter as needed.

Reference numeral "8" is a data memory constituted of a read only memory (hereafter referred to as "ROM"). Various kinds of data provided from a maker are stored in the data memory 8 to be used for many purposes. The allocation (memory map) of the data memory 8 is shown in detail in FIG. 4. The sizes and functions of the individual areas will be described later as needed.

Reference numeral "9" is a code memory also constituted of a ROM. The ROM 9 stores a program for controlling the CPU 5. The contents of processes executed by this program will be described later in detail.

The work memory 6, the data memories 7 and 8 and the code memory 9 are all accessed by the CPU 5.

Reference numeral "10" is an I/O port which controls the signal inputs and outputs of two sets of MIDI terminals. In other words, the I/O port 10 controls information exchange between the CPU 5 and two sets of input terminals, output terminals, and through terminals which only pass signals. Reception of MIDI information by the I/O port 10 generates an interrupt to the CPU 5 (MIDI reception interrupt 0 (see FIG. 5) and MIDI reception interrupt 1 (see FIG. 6)). In response to the interrupt, the CPU 5 fetches data.

Reference numeral "11" is a timer which generates an interrupt in the CPU 5 at predetermined intervals. In response to an interrupt signal from the timer 11, the CPU performs a predetermined process.

Figure 2:
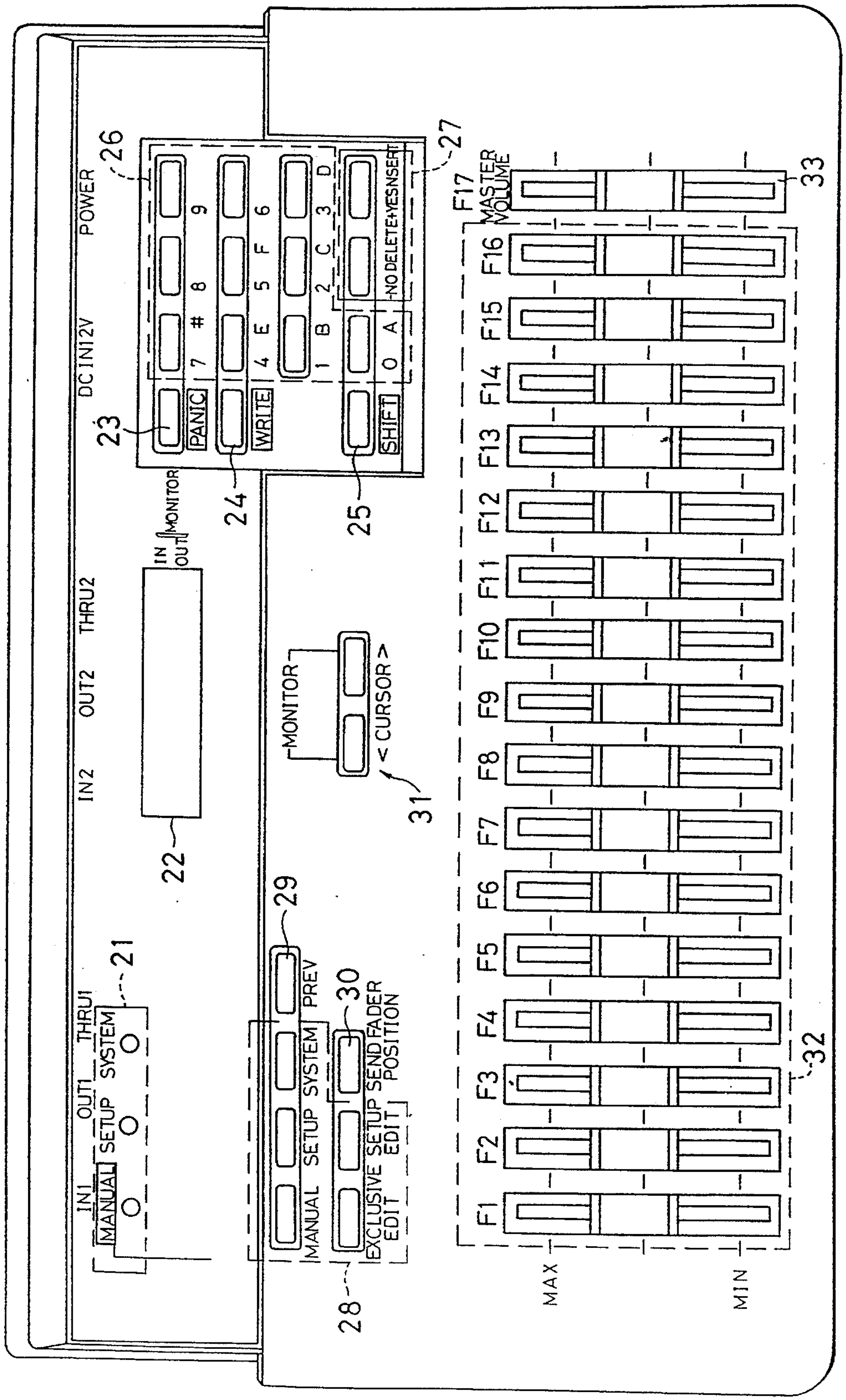
FIG. 2 is a front, elevation view showing the structure of an operation panel.

FIG. 2 is a front elevational view of the operation panel.

Reference numeral "21" denotes mode indicator lamps which indicate a current operation mode ("MANUAL", "SETUP" or "SYSTEM").

Reference numeral "22" is a display constituting the display section 3 shown in FIG. 1, which displays a currently running function, the values of the individual faders, etc.

Reference numeral "23" is a panic switch (PANIC) constituting the switch section 2 shown in FIG. 2. When this switch is depressed, MIDI signals given below-are output (each of the signals output for MIDI 1 to 16 channels).

① All note off information

② Reset all controller information

③ Bend reset information

④ Hold off information

Reference numeral "24" is a write key ("WRITE"), and with this key depressed exclusive patch and setup patch can be stored.

Reference numeral "25" is a shift key ("SHIFT") which is used to input numbers for program change, alphabets and symbols of ten keys, and temporary alteration of the functions of switch 27.

Reference numeral "26" denotes ten keys to be used for inputting data below.

① MIDI channels

② Patch numbers

③ Exclusive data

④ Numbers for program change

⑤ Note numbers of key splits

⑥ Velocity values of velocity splits

Reference numeral "27" denotes value switches ("–NO DELETE" and "+YES INSERT") to be used for the following purposes.

① Fine control of volume information

② Fine control of velocity offset

③ Fine control of velocity values

④ Fine control of program change number information

⑤ Fine control of exclusive data

⑥ Input patch names

⑦ Set execution and stop of patch writing

⑧ ON/OFF of functions

⑨ Set MIDI channels

⑩ Set parameters for separate menu function

⑪ Set execution and stop of transmission of exclusive data

Reference numeral "28" denotes mode select keys which are used to select the following five modes.

⑫ Manual mode ("MANUAL")

⑬ Exclusive edit mode ("EXCLUSIVE EDIT")

⑭ Setup mode ("SETUP")

⑮ Setup edit mode ("SETUP EDIT")

⑯ System mode ("SYSTEM")

Reference numeral "29" is a previous switch ("PREV") which calls a function preceding by one upon each depression.

Reference numeral "30" is a send fader position key ("SEND FADER POSITION"); when this switch is depressed, MIDI volume information corresponding to the positions of faders are output.

Reference numeral "31" denotes cursor keys by which a cursor displayed on the display 22 can be moved. With both switches depressed at the same time, a MIDI channel currently effecting transmission/reception is displayed on the display 22.

Reference numeral "32" denotes faders (F1 to F16) which are used as follows.

① Output volume information

② Set a velocity offset value

③ Set a velocity value

④ Output modulation information

⑤ Output bender information

⑥ Output breath control information

⑦ Output foot control information

⑧ Output portamento speed information

⑨ Output balance information

⑩ Output pan-pot information

⑪ Output expression information

⑫ Output damper information

⑬ Output pressure information

⑭ Output program change information

⑮ Output pitch bend sensitivity information

⑯ Output fine tuning information

⑰ Output coarse tuning information

⑱ Output reserve (fourth registered parameter) information

⑲ Output exclusive data

The faders F1 to F16 are designed to be slidable in up and down directions in the diagram, and yields a great value when shifted upward and a small value when shifted downward. The slide switches F1 to F16 corresponding to the MIDI channels 1 to 16, respectively.

Reference numeral "33" is a master volume fader which controls volumes for the 16 MIDI channels. To be more specific, with the fader F17 operated, a value acquired by this movement is multiplied by a value obtained by the movements of the faders F1 to F16, and the resultant value is then output. In other words, the fader F17 serves as the master volume, and the movement of the fader F17 influences all of the remaining faders F1 to F16.

This electronic instrument control apparatus has MIDI terminals for two systems or six terminals: input terminals (IN1 and IN2), output terminals (OUT1 and OUT2) and through terminals (THRU1 and THRU2).

Figure 4:
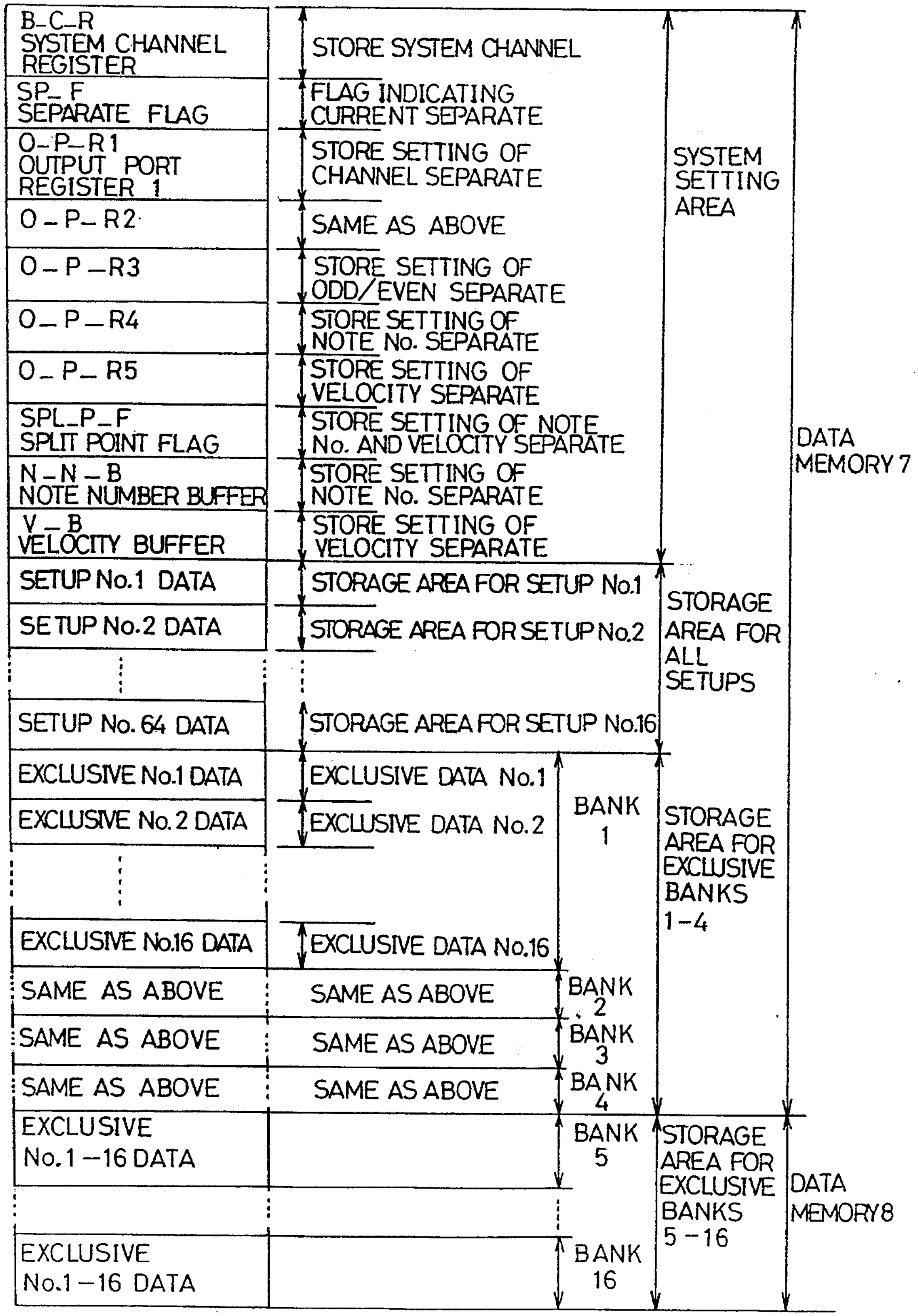
FIG. 4 is a memory map showing allocation of a data memory.

FIGS. 3A and 3B show a memory map for the work memory 6, and FIG. 4 shows a memory map for the data memories 7 and 8. In the diagram, titles or abbreviated names of the individual areas, or both are shown on the left-hand side, while brief descriptions of the individual areas are given on the right-hand side.

FIGS. 5 to 49 present flowcharts illustrating the operation of the electronic instrument control apparatus.

The flowcharts will be explained briefly for now, and their detailed descriptions will be given as needed in the following description of embodiments.

Figure 5:
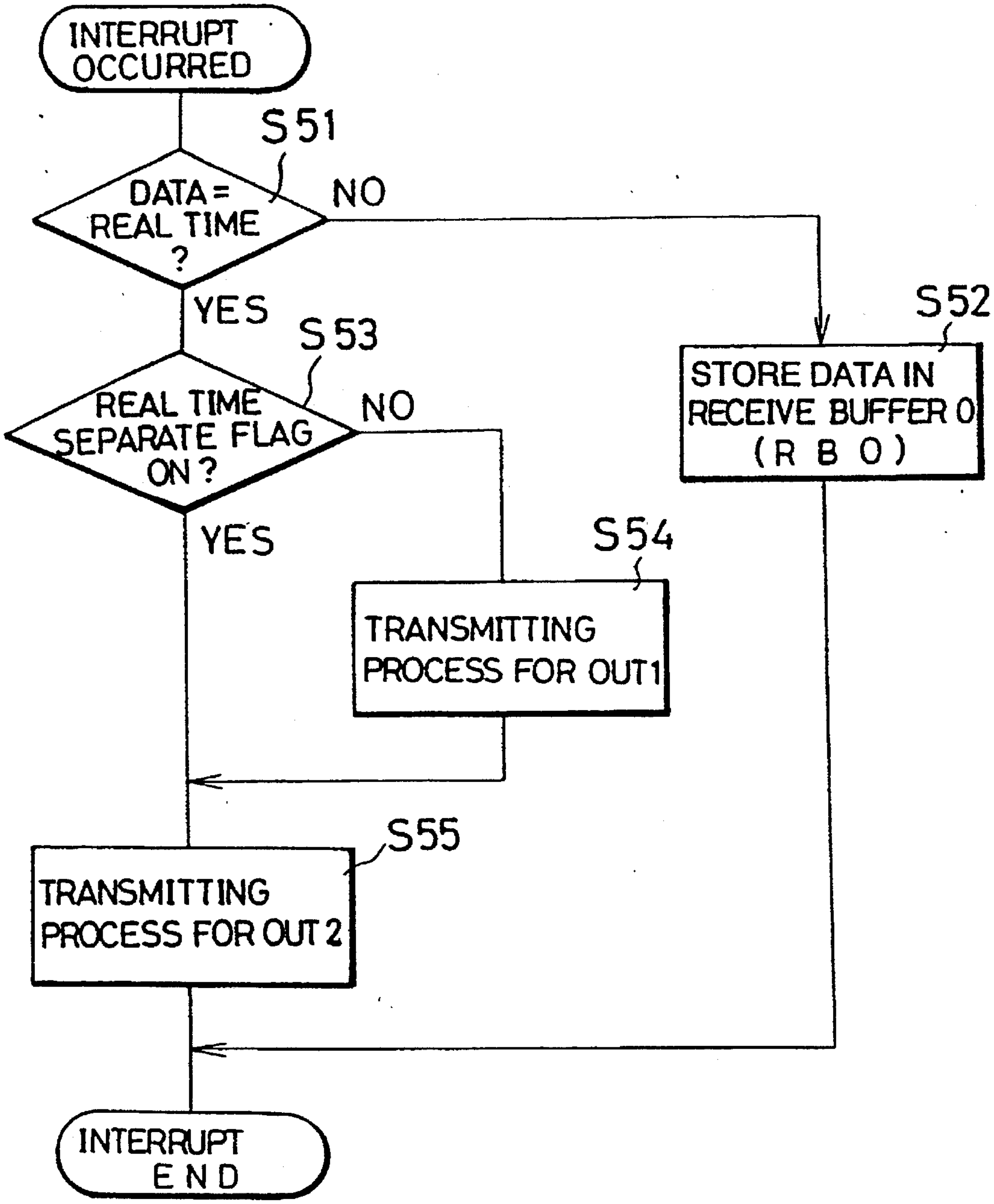
FIG. 5 is a flowchart illustrating a MIDI reception interrupt process 0.

FIG. 5 shows a routine for processing the MIDI reception interrupt 0 (interrupt generated by reception from the input terminal IN1). This routine is invoked by an interrupt signal generated by data reception from the input terminal IN1 in order to write received data into a reception buffer RB0.

Figure 6:
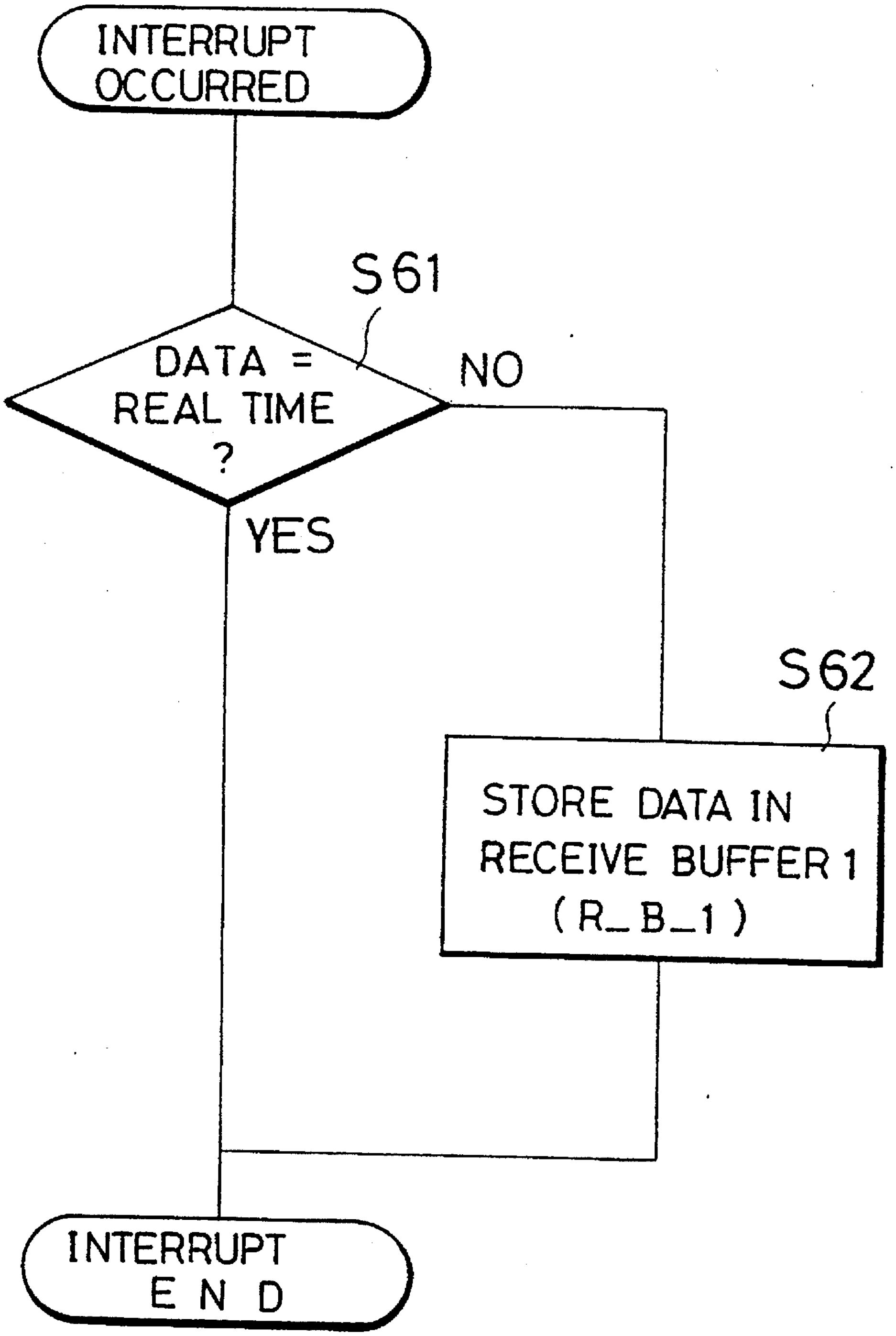
FIG. 6 is a flowchart illustrating a MIDI reception interrupt process 1.

FIG. 6 shows a processing routine for the MIDI reception interrupt 1 (interrupt generated by reception from the input terminal IN2). This routine is invoked by an interrupt signal generated by data reception from the input terminal IN2 in order to write received data into a reception buffer RB1.

Figure 7:
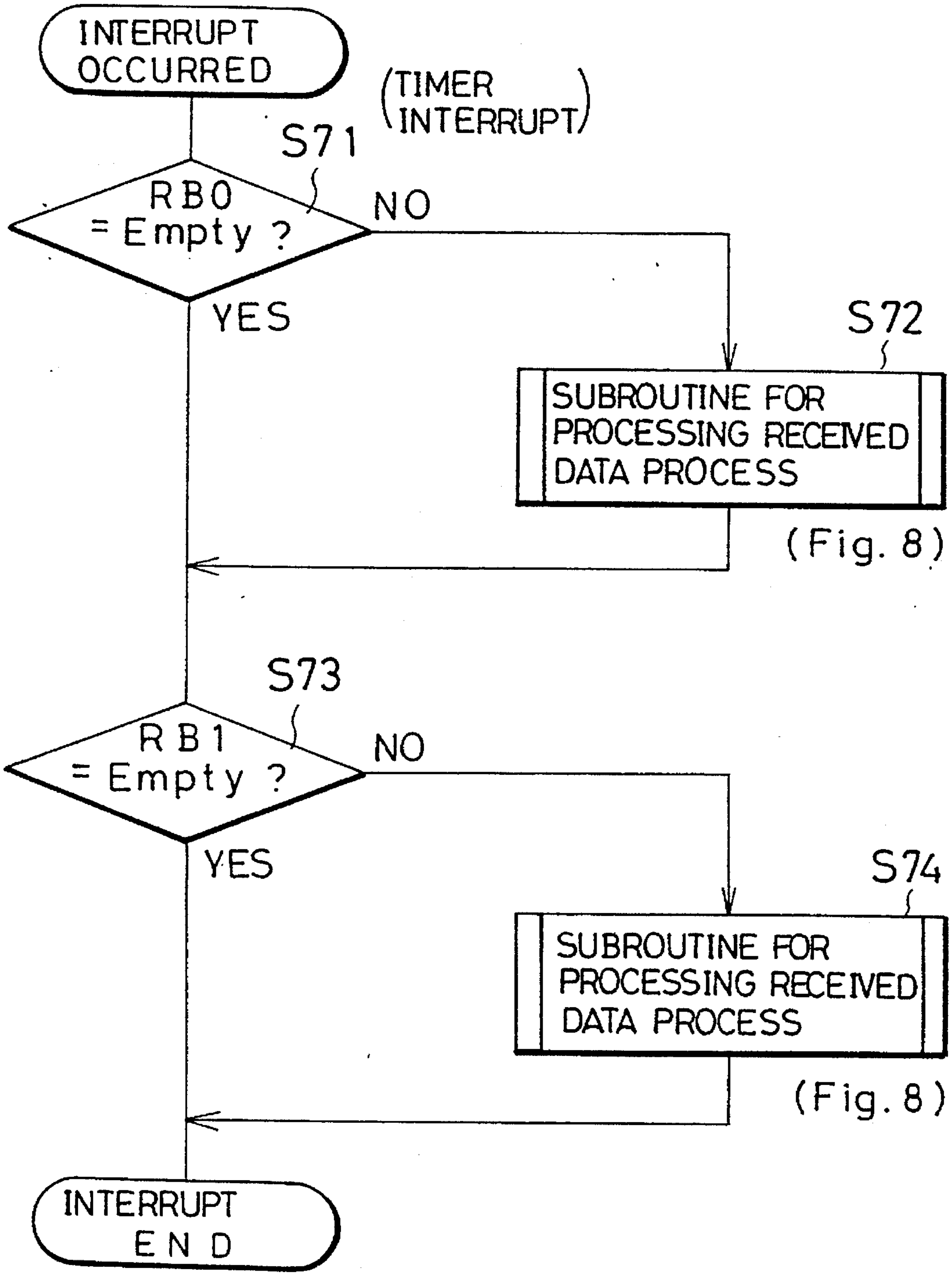
FIG. 7 is a flowchart illustrating interruption of a reception data process.

FIG. 7 shows an interrupt processing routine to process received data (RB0 and RB1). The received data processing routine is invoked by an interrupt from the timer to call a received data processing subroutine if the received data is present in the RB0 or RB1. The RB0 and RB1 are buffers designed to serve as an FIFO.

Figure 8A:
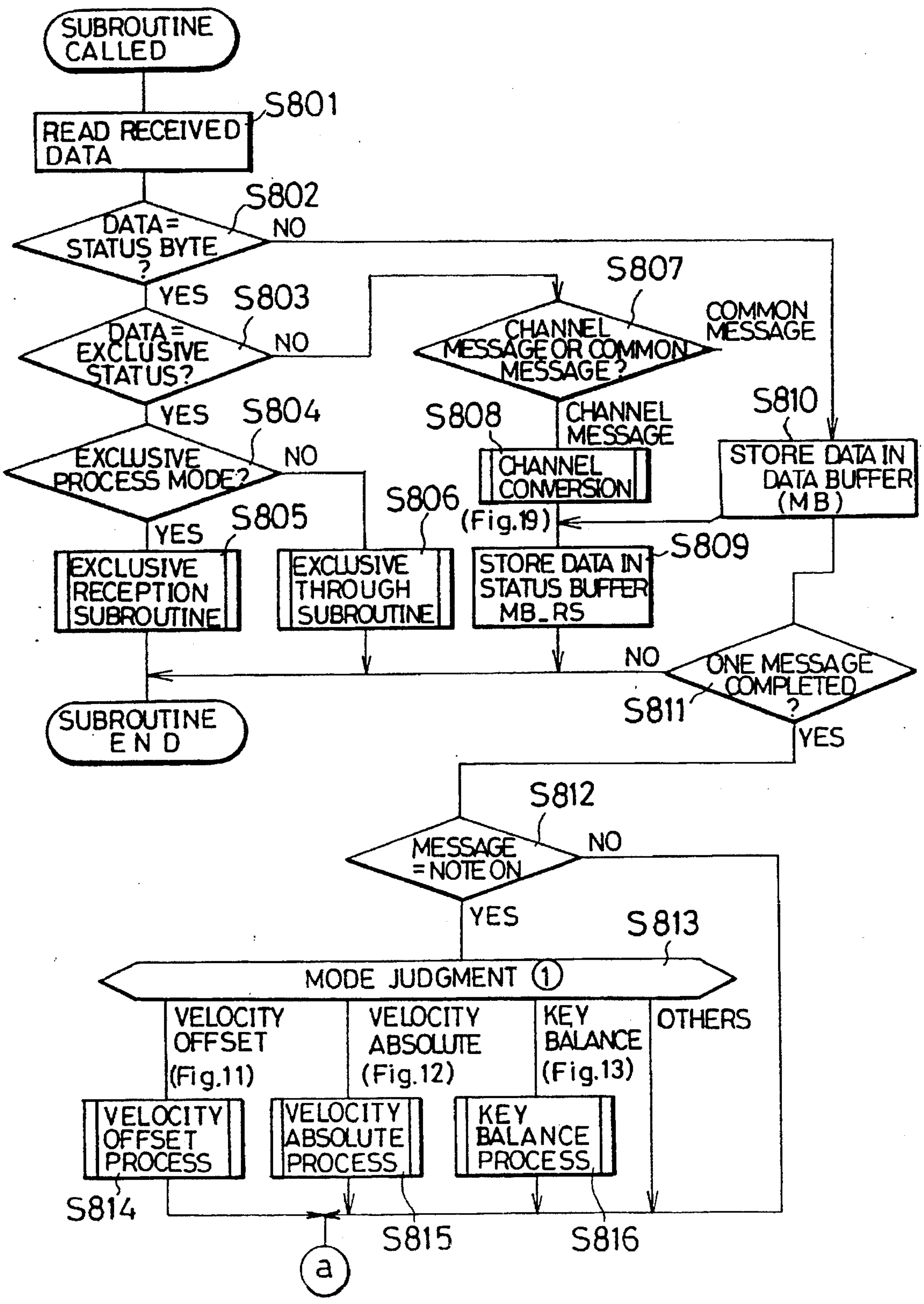
FIG. 8A is the first half of a subroutine for processing received data, which is called from FIG. 7.
Figure 8B:
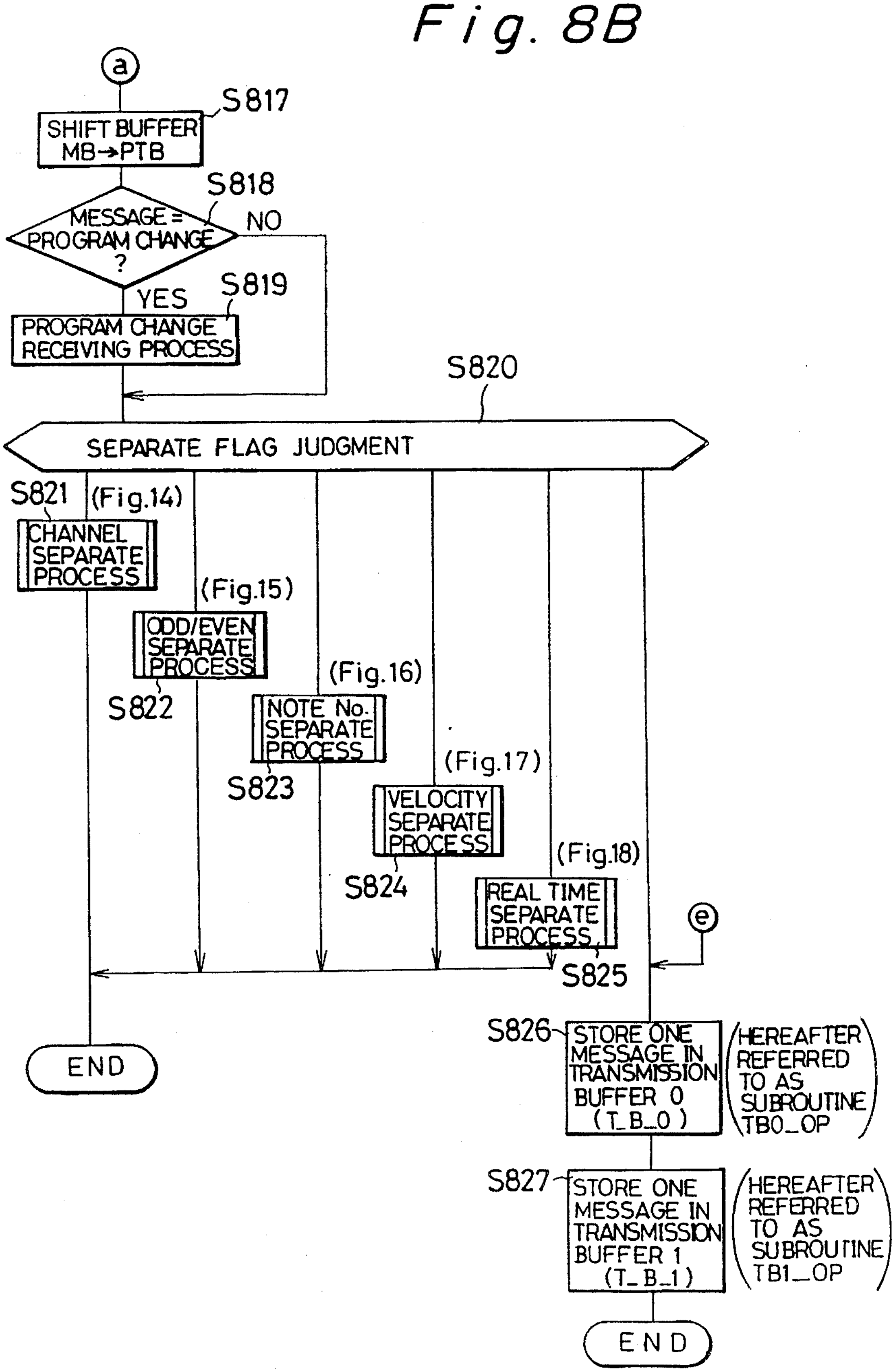
FIG. 8B is the second half of said subroutine.

FIGS. 8A and 8B represent the received data processing subroutine which is called from FIG. 7; this subroutine reads data from the RB0 and the RB1, determines the types of the read data, and performs various processes according to the decision result.

For instance, this subroutine writes the data read from the RB0 and RB1 into a merge buffer MB to reproduce a message, and calls subroutines for exclusive reception and exclusive through or a subroutine for a channel conversion.

When the message is completed, the type of the message and the mode are also determined and an associated process is performed. The message is transmitted from the MB to a pretransmit buffer PTB to carry out a separate process according to a separate flag. Further, other various processes, such as writing the message to transmission buffers TB0 and TB1, are performed.

Figure 9:
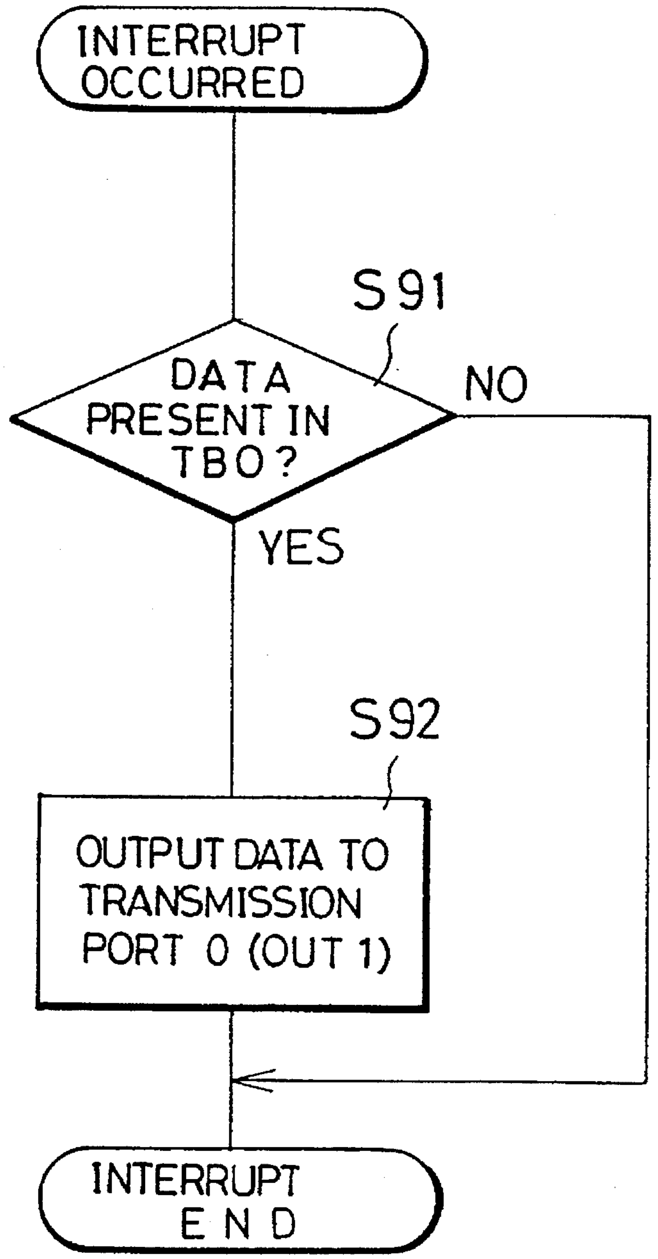
FIG. 9 is a flowchart illustrating a MIDI transmission interrupt process 0.

FIG. 9 shows a routine for processing the MIDI reception interrupt 0 which is invoked upon Completion of the transmission of one message to output data to the output terminal 1 (OUT1).

Figure 10:
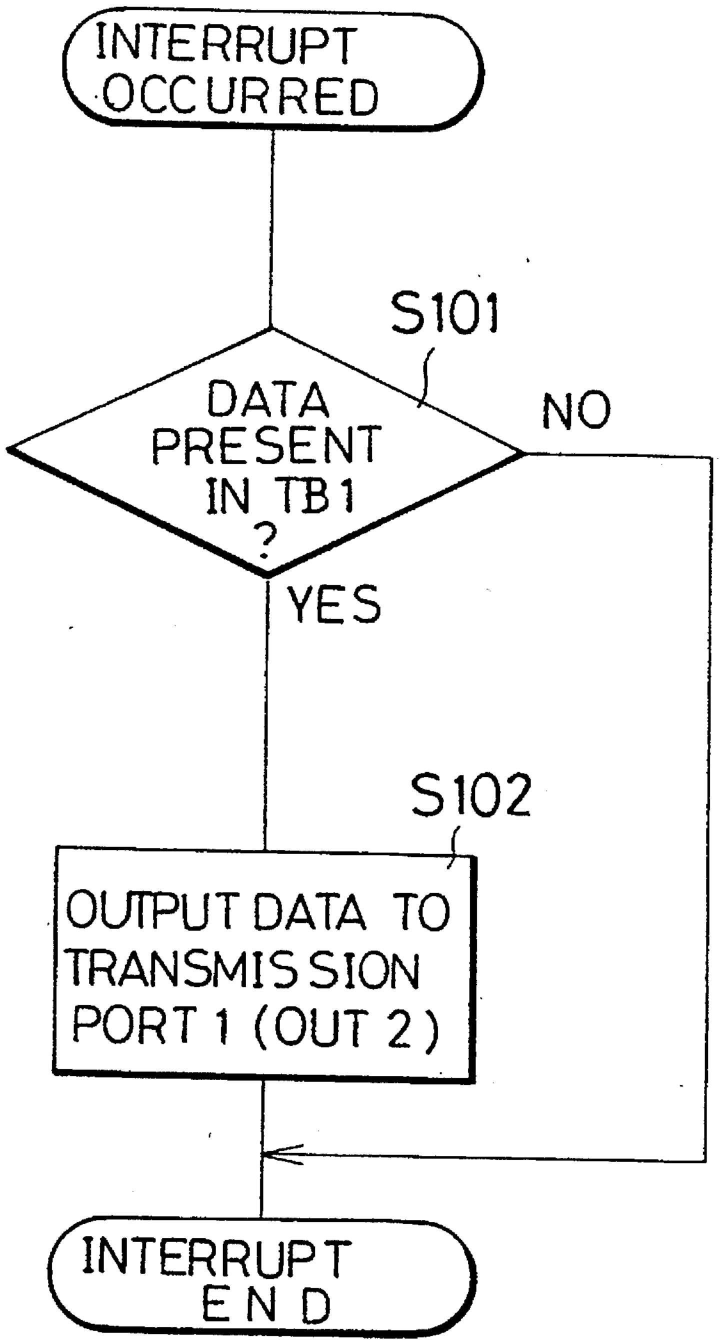
FIG. 10 is a flowchart illustrating a MIDI transmission interrupt process 1.

FIG. 10 shows a routine for processing the MIDI reception interrupt 1 which is invoked upon completion of the transmission of one message to output data to the output terminal 2 (OUT2).

Figure 11:
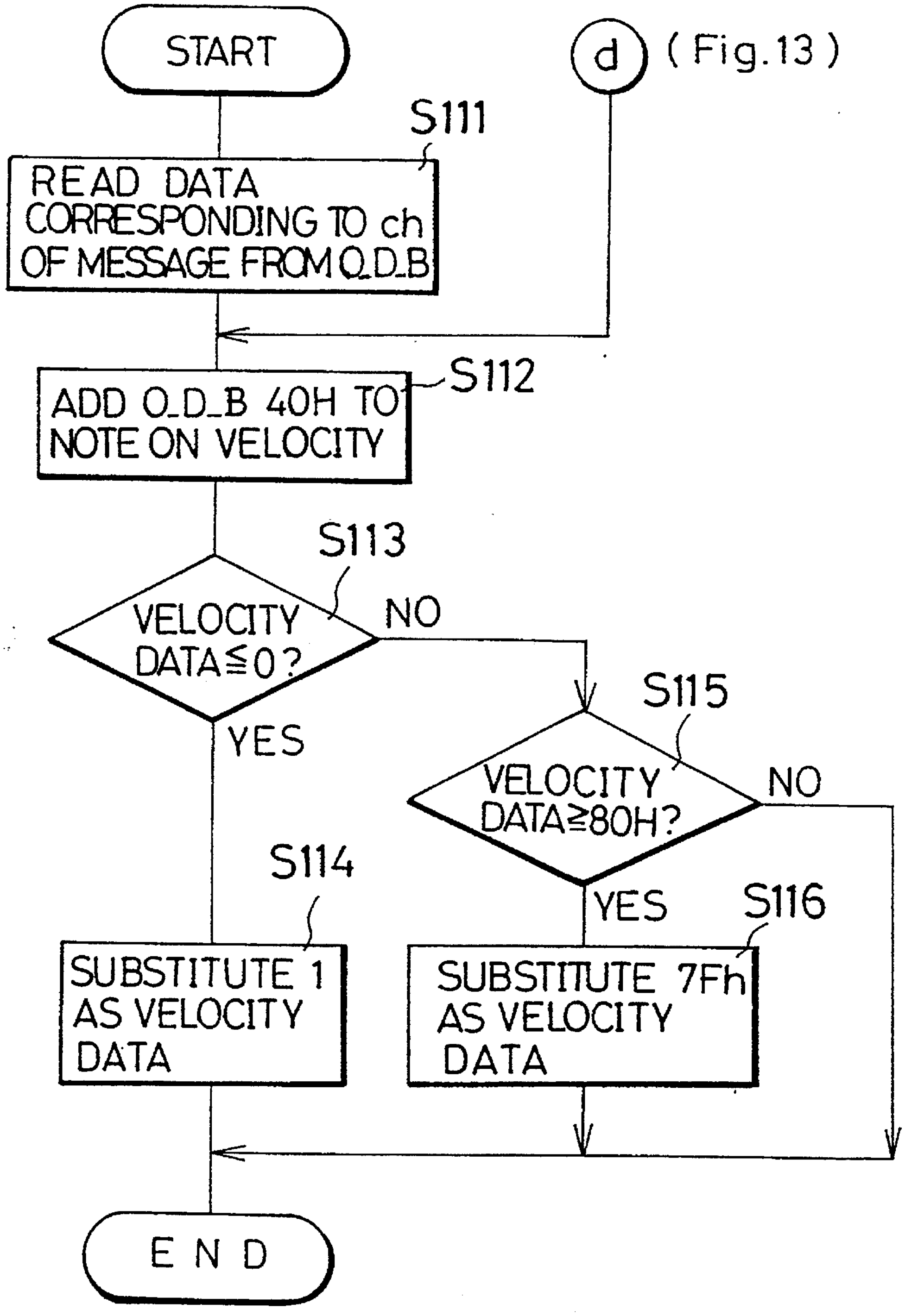
FIG. 11 is a flowchart illustrating a velocity offset (VELOCITY OFFSET) process.

FIG. 11 represents a velocity offset (VELOCITY OFFSET) process routine add information about the position of the fader corresponding to a channel for the message, to the velocity of the received note-ON message. The value of an output data buffer O_D_B indicated by a fader event flag F_E_F is added to a velocity in the MB. This routine is called also from a key balance processing routine.

Figure 12:
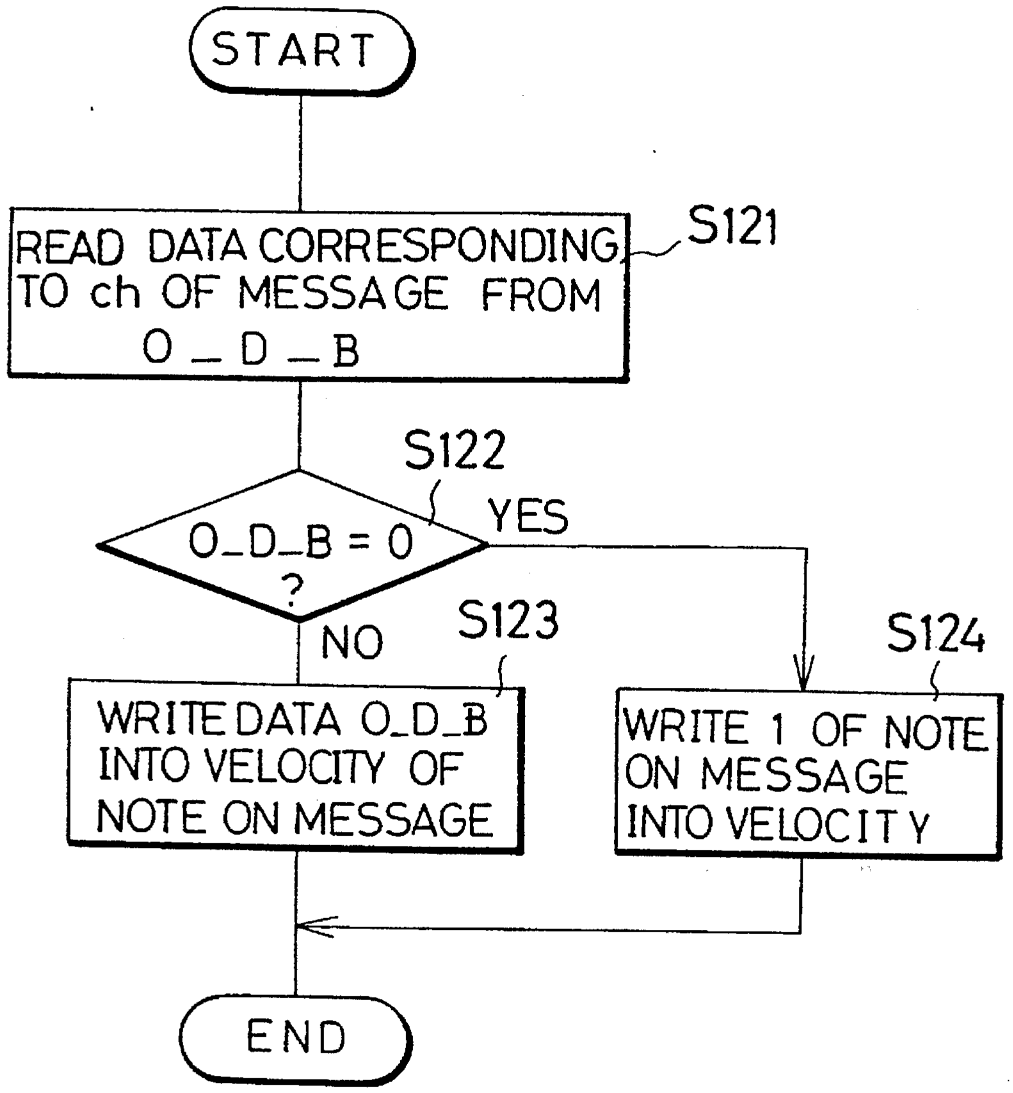
FIG. 12 is a flowchart illustrating a velocity absolute (VELOCITY ABSOLUTE) process.

FIG. 12 shows a velocity absolute (VELOCITY ABSOLUTE) process routine where the value of the O_D_B indicated by the F_E_F is written into a velocity in the MB.

Figure 13:
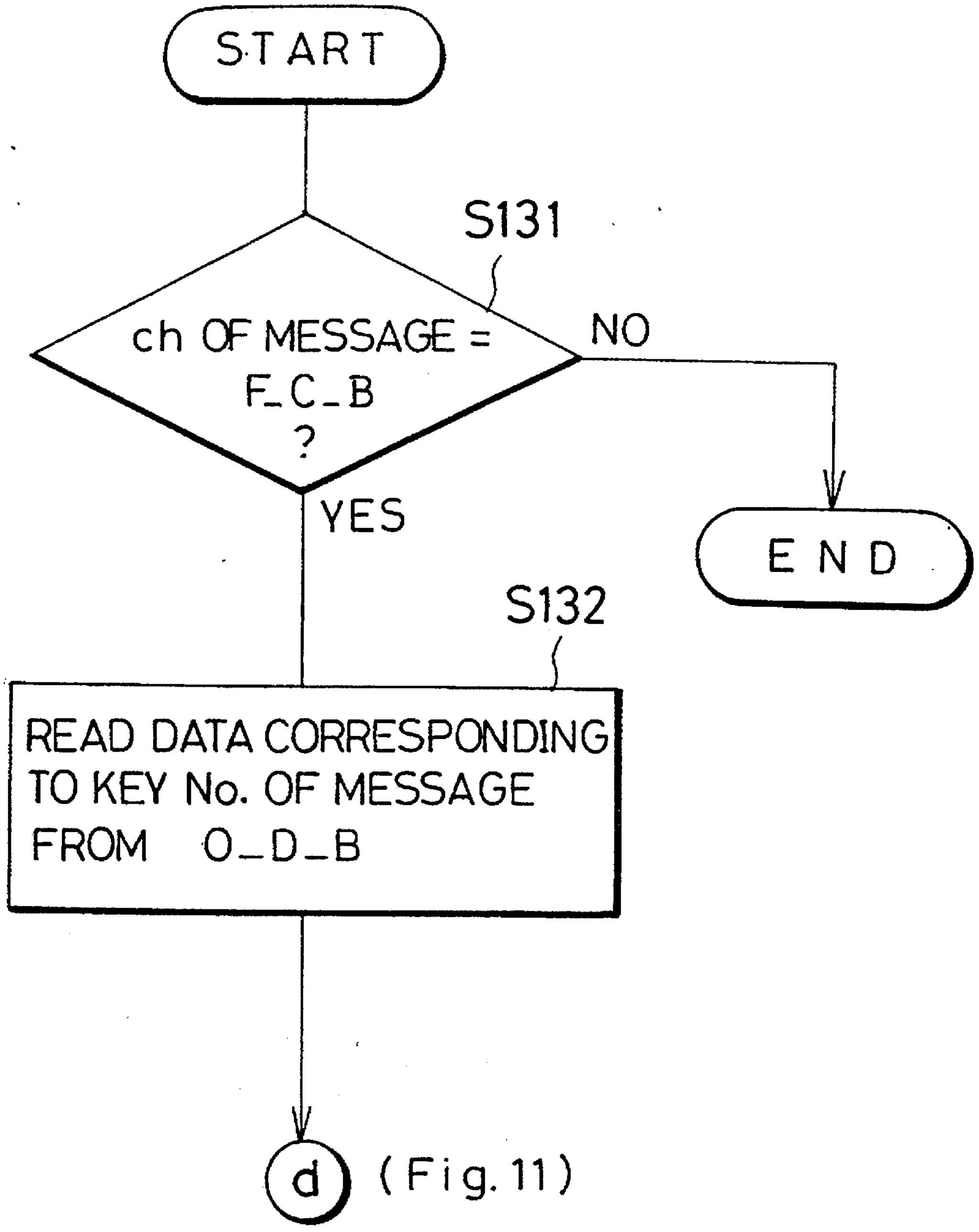
FIG. 13 is a flowchart illustrating a key balance (KEY BALANCE) process.

FIG. 13 illustrates a routine for a key balance (KEY BALANCE) process where the value of the O_D_B designated in the MB is added to data in the MB if the channel for the message in the MB matches with the contents of a fader channel buffer F_C_B.

Figure 14:
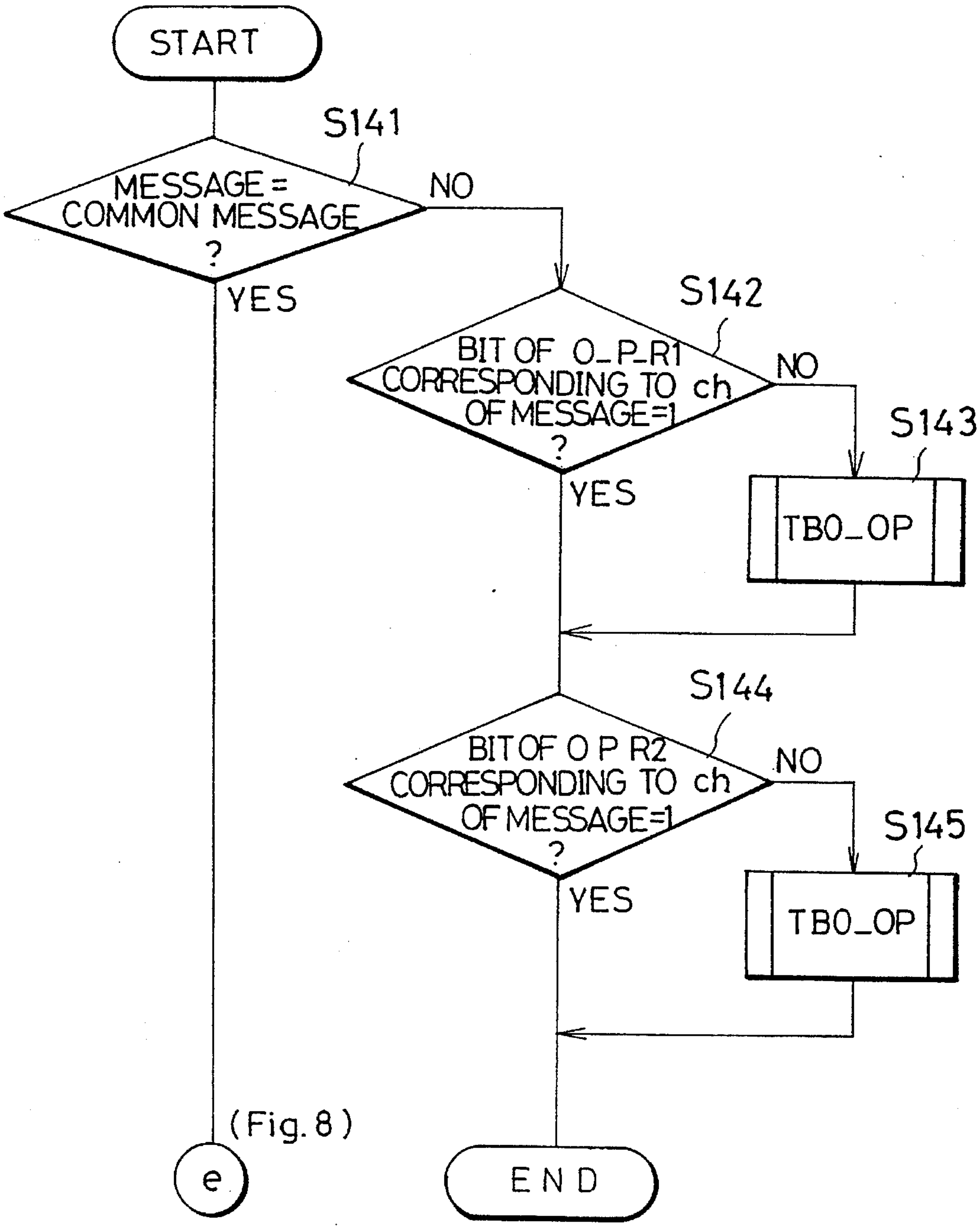
FIG. 14 is a flowchart illustrating a channel separate process.

FIG. 14 shows a routine for a channel separate process for determining bits of output port registers O_P_R1 and O_P_R2 indicated by the contents of the PTB, and calling the TBO_OP and the TB1_OP accordingly.

Figure 15:
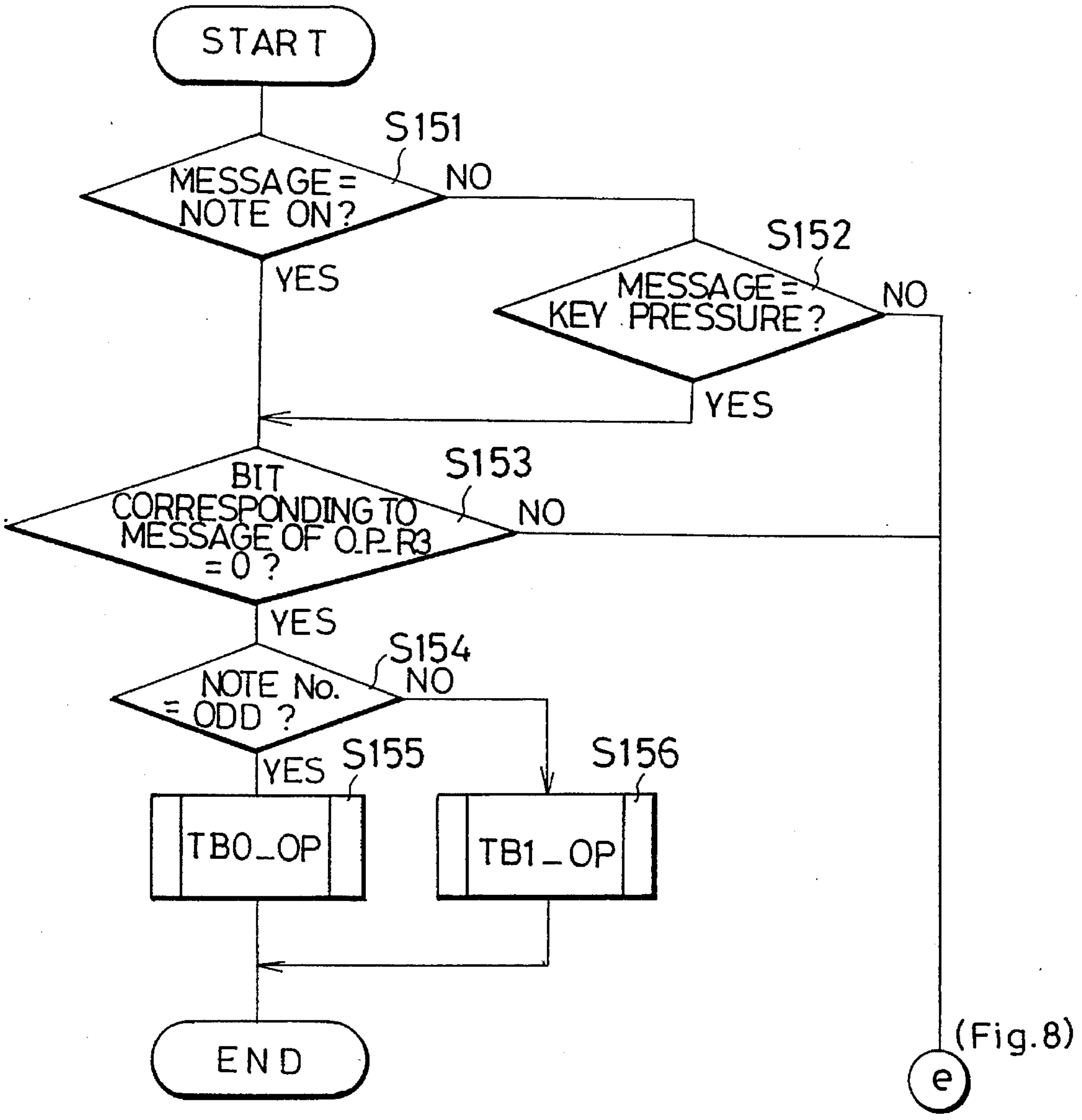
FIG. 15 is a flowchart illustrating an odd/even (ODD/EVEN) separate process.

FIG. 15 shows a routine for an odd/even odd/Even) separate process for determining the contents of the PTB and also the bit of an output port register O_P_R3 defined by the contents of the PTB, and calling the TB0_OP or the TB1_OP according to the determination.

Figure 16:
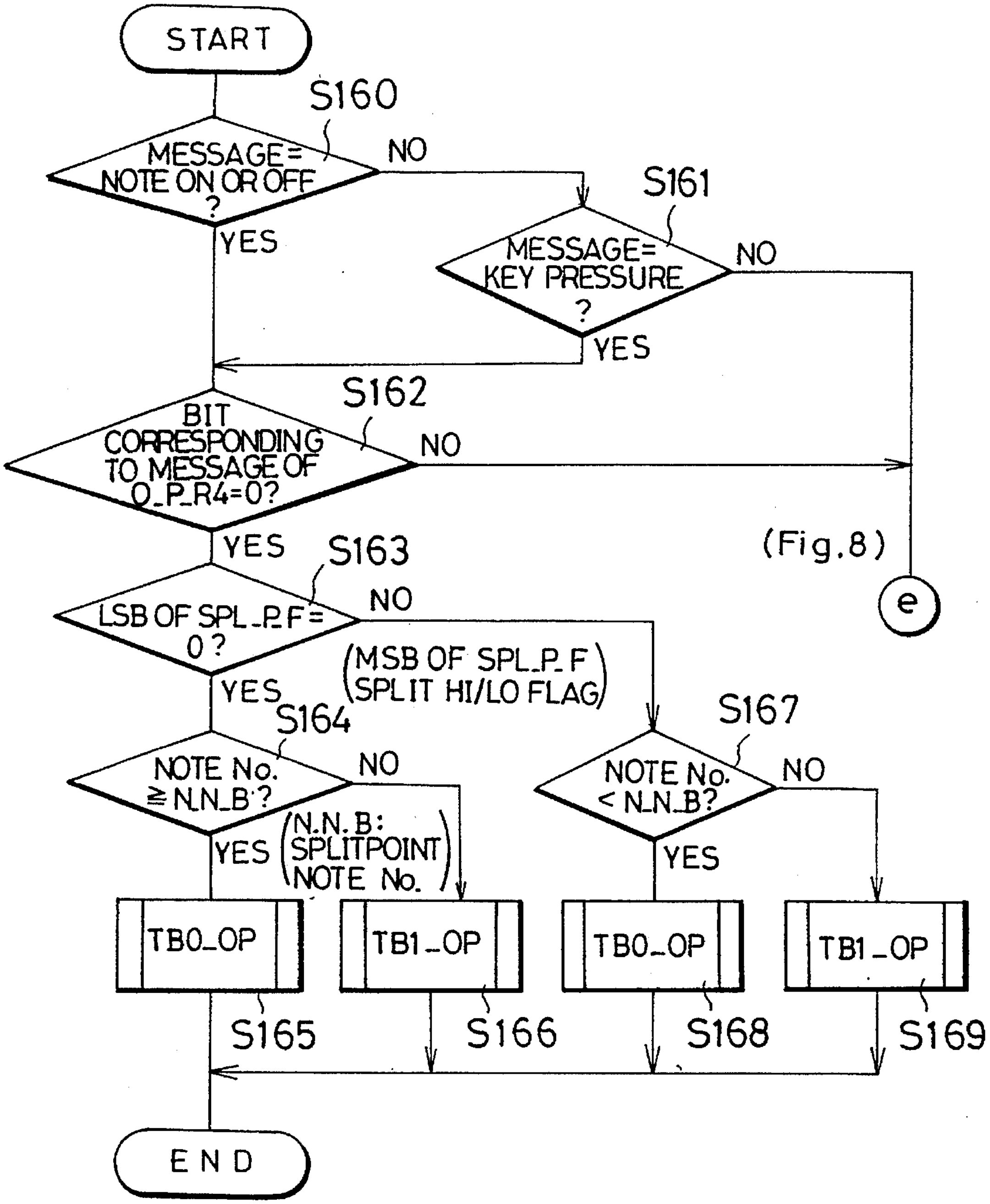
FIG. 16 is a flowchart illustrating a note number (Note No.) separate process.

FIG. 16 is a routine for a note-number (Note No.) separate process routine for selecting and then calling the TB0_OP or the TB1_OP in accordance with the contents of the PTB, a split point flag SPL_P_F, a note number buffer N_N_B, and an output port register O_P_R4.

Figure 17A:
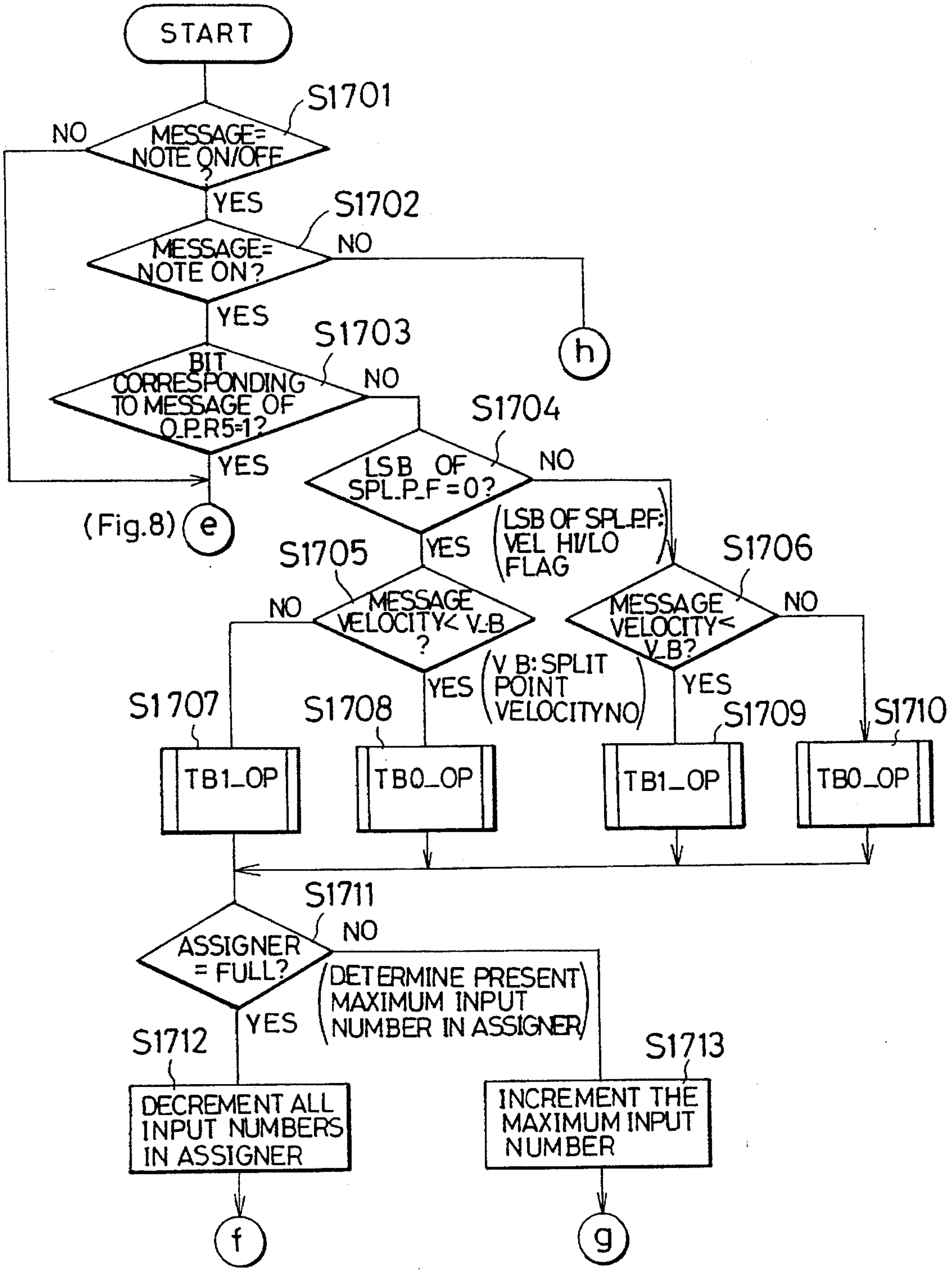
FIG. 17A is the first half of a flowchart illustrating a velocity separate process.
Figure 17B:
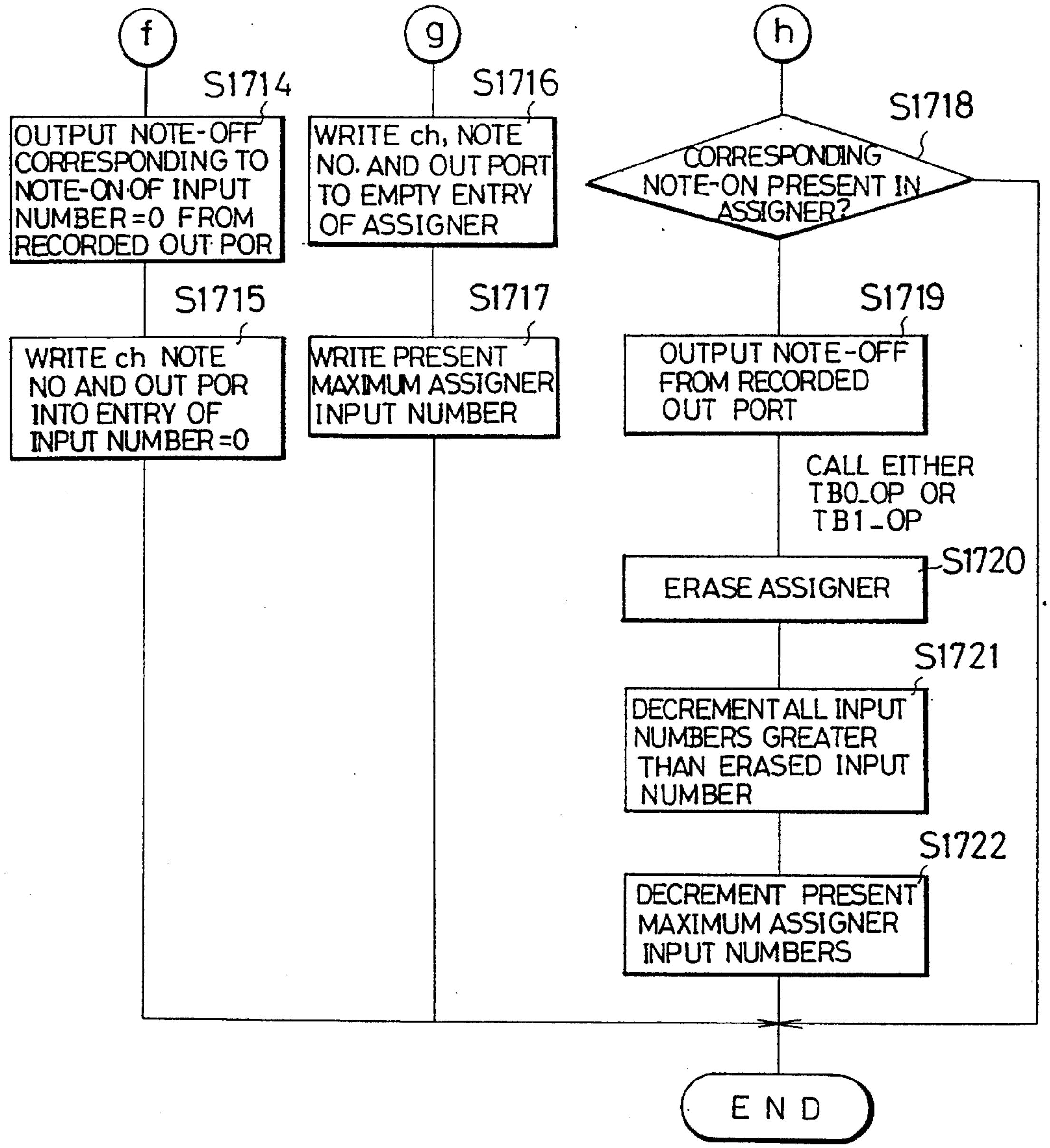
FIG. 17B is the second half of said flowchart.

FIGS. 17A and 17B show a routine for a velocity separate process where the following processes are performed.

That is, in the case of the PTB=Note On, the TBO_OP or the TB1_OP is called after being selected according to the contents of the PTB, an output port registers O_P_R5, the SPL_P_F and a velocity buffer V_B. The contents of the PTB, the result of selecting the TB0/TB1 and the assign writing order are recorded in an assigner. If the assigner is full at this time, one piece of information of the assigner is erased and an associated note-off is written selectively into the TB1 or the TB0 (erasing is performed after the note-off is written therein).

If the PTB=Note Off, the TB0_OP or the TB1_OP is called according to the information in the assigner corresponding to the PTB, and that information is erased.

Figure 18:
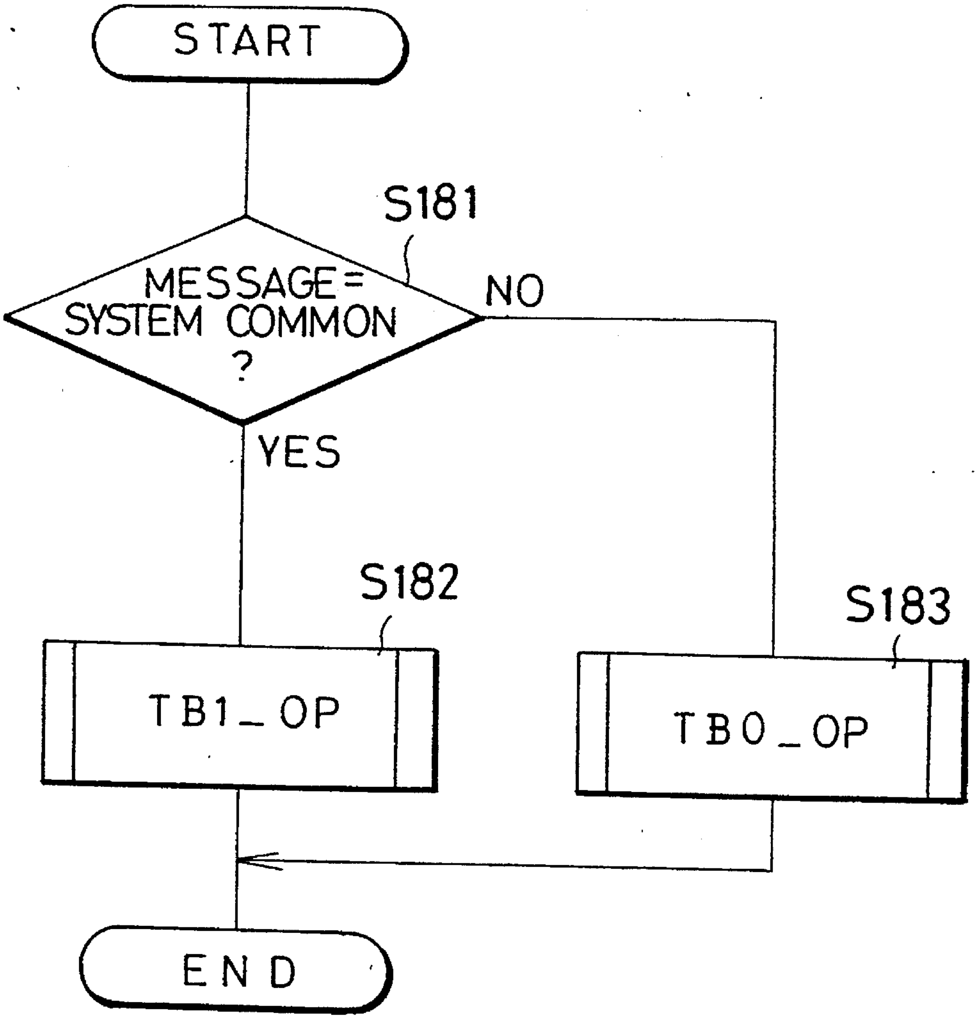
FIG. 18 is a flowchart illustrating a real time separate process.

FIG. 18 shows a routine for a real time separate process to select the TB0_OP or the TB1_OP is selected in accordance with the contents of the PTB before calling it.

Figure 19:
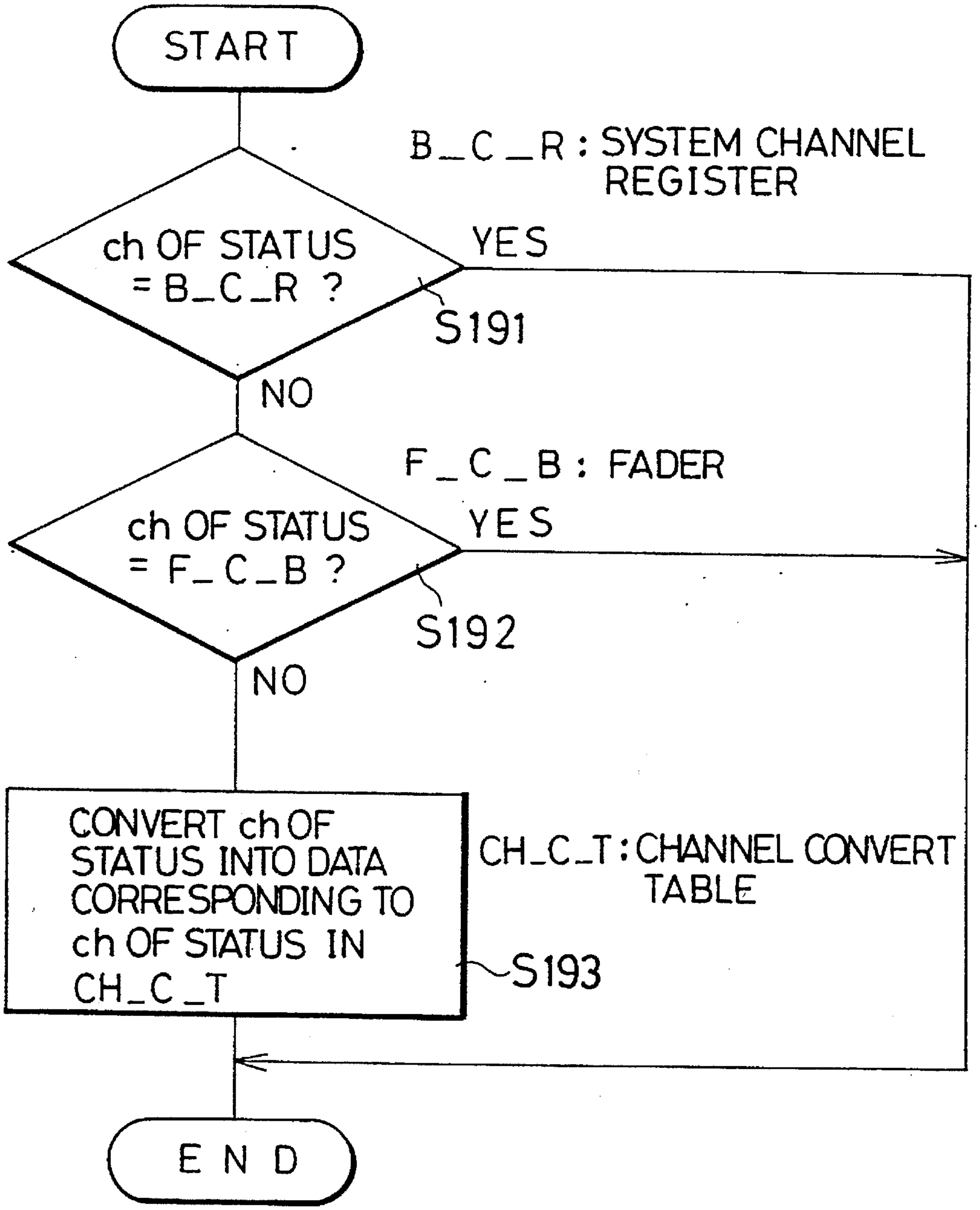
FIG. 19 is a flowchart illustrating a channel conversion process.

FIG. 19 shows a routine for a channel convert process where the lower four bits of data read from the RB0 and the RB1 are replaced with the contents of a channel convert table CH_C_T if that data does not match the contents of system channel buffers B_C_R and F_C_B.

Figure 20:
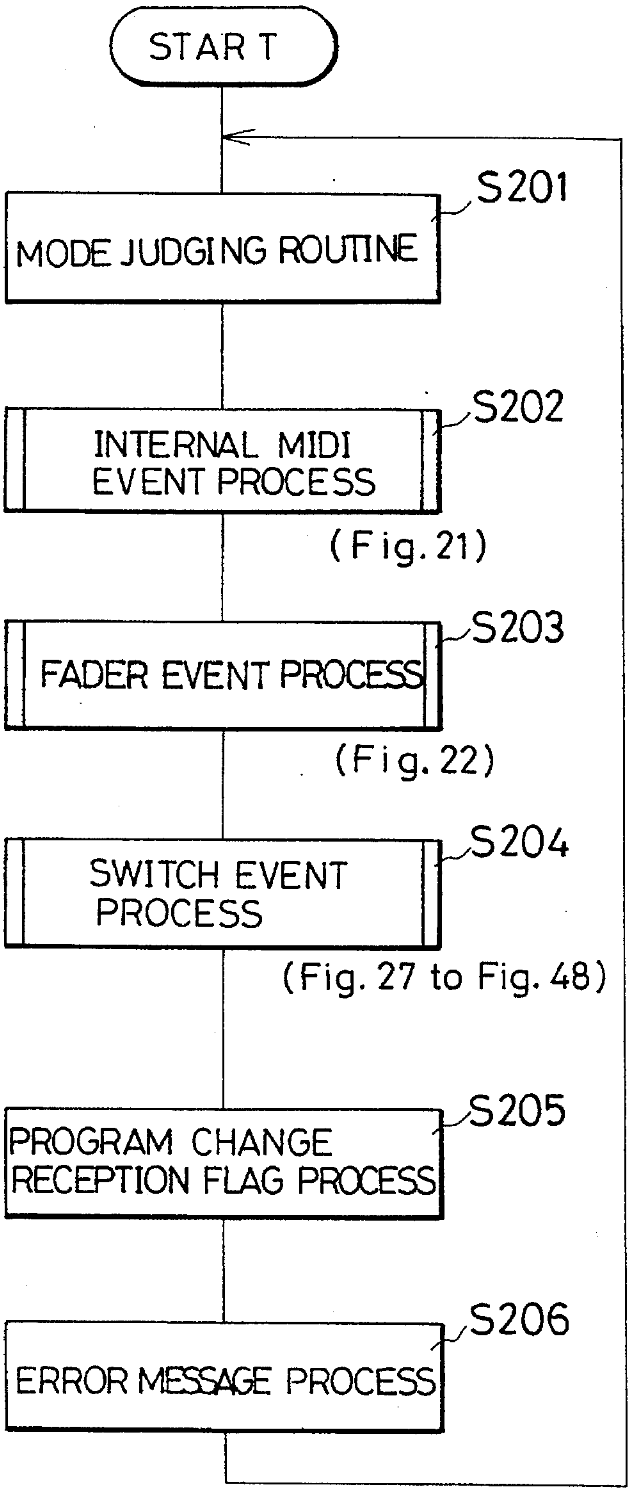
FIG. 20 is a flowchart illustrating the main routine of this electronic musical instrument control apparatus.

FIG. 20 shows the main routine of this electronic musical instrument, where a series of steps shown in this diagram are repeatedly performed in the normal status except for an interrupt process.

First, a mode judging routine is executed (step S201). A flag set process is performed in the mode judging routine to judge the mode set by a key input (see mode judgment ① in FIG. 8) (step S202). Next, a fader event process (see FIG. 22 for details) is performed (step S203). A switch event process (see FIGS. 27 to 48) is then executed (step S204).

Then, a program change reception flag process is performed (step S205). In this process data in a setup storage area (see FIG. 4) is transmitted to a setup data load area (see FIG. 3). Finally, an error message process is executed (step S206). An error in MIMI transmission/reception is displayed on a display 22 in this process. When the error message process is completed, the routine returns to the beginning, and the above-described series of processes are repeatedly performed.

Figure 21A:
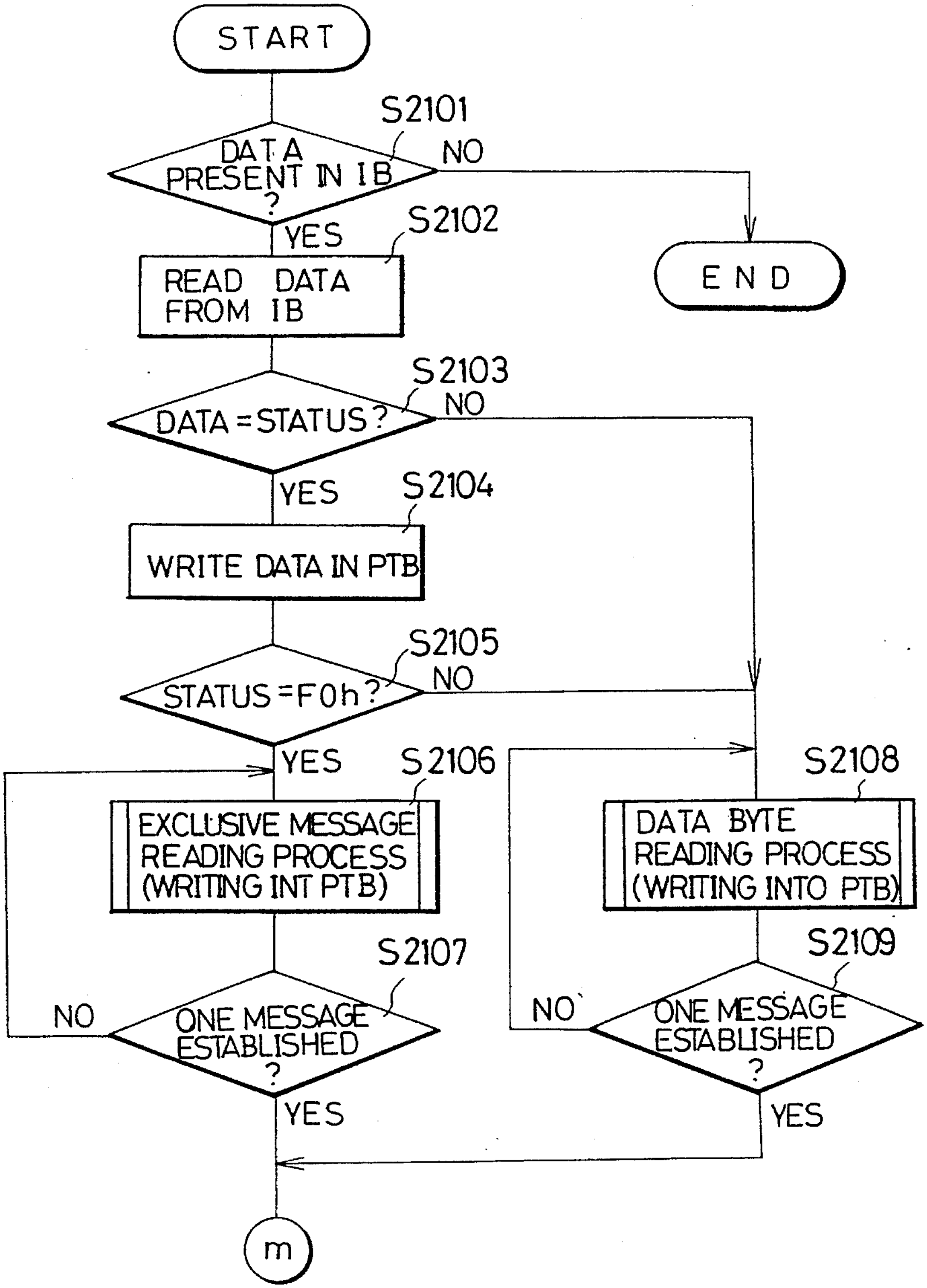
FIG. 21A is the first half of a flowchart illustrating an internal MIDI event process.
Figure 21B:
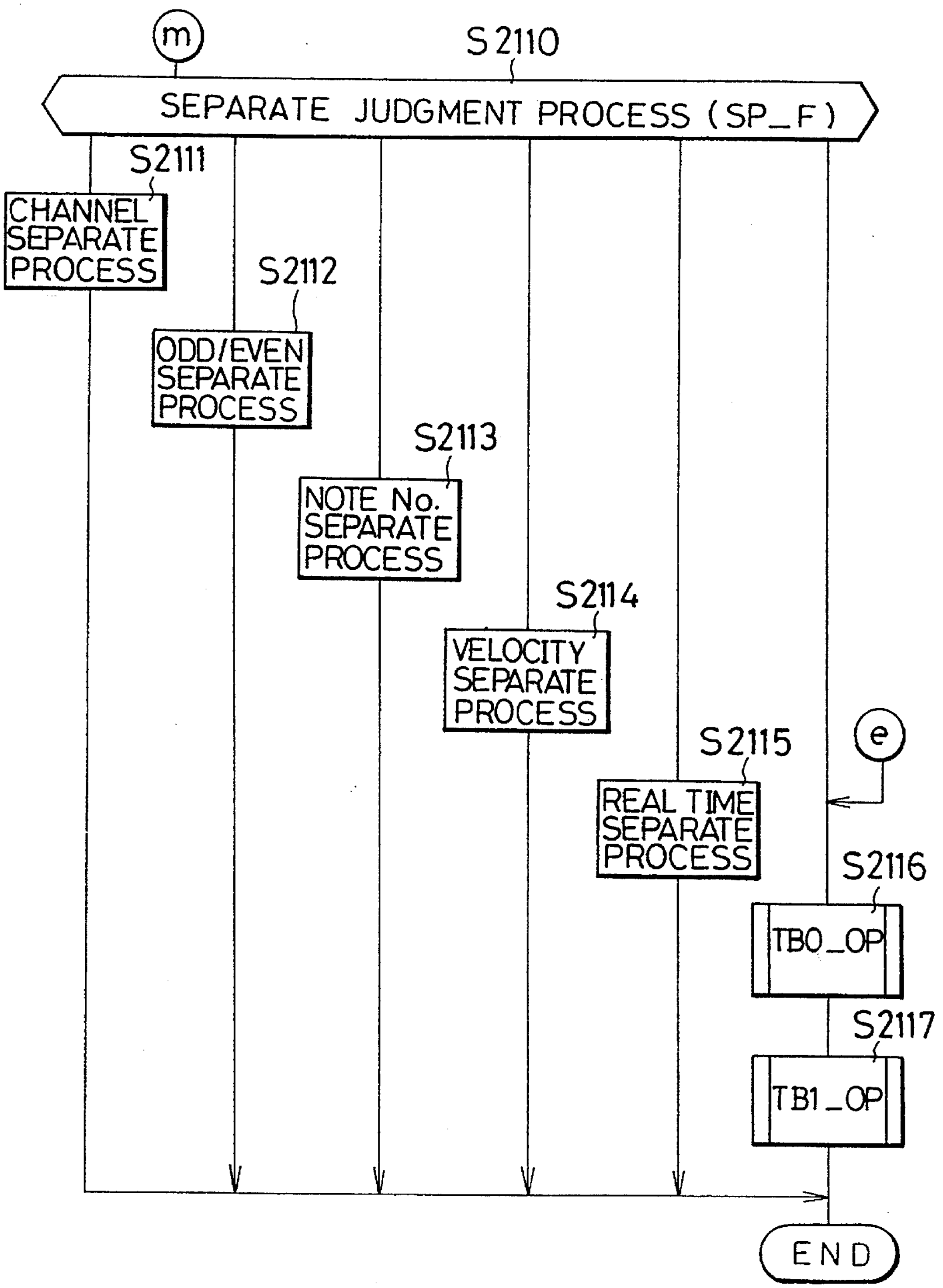
FIG. 21B is the second half of the flowchart.

FIGS. 21A and 21B illustrate a routine for an internal MIDI event process in which data of one message is written from the internal buffer IB to the PTB. Then, in accordance with the PTB data or the separate judgment, TBO_OP or TB1_OP is selected and called.

Figure 22A:
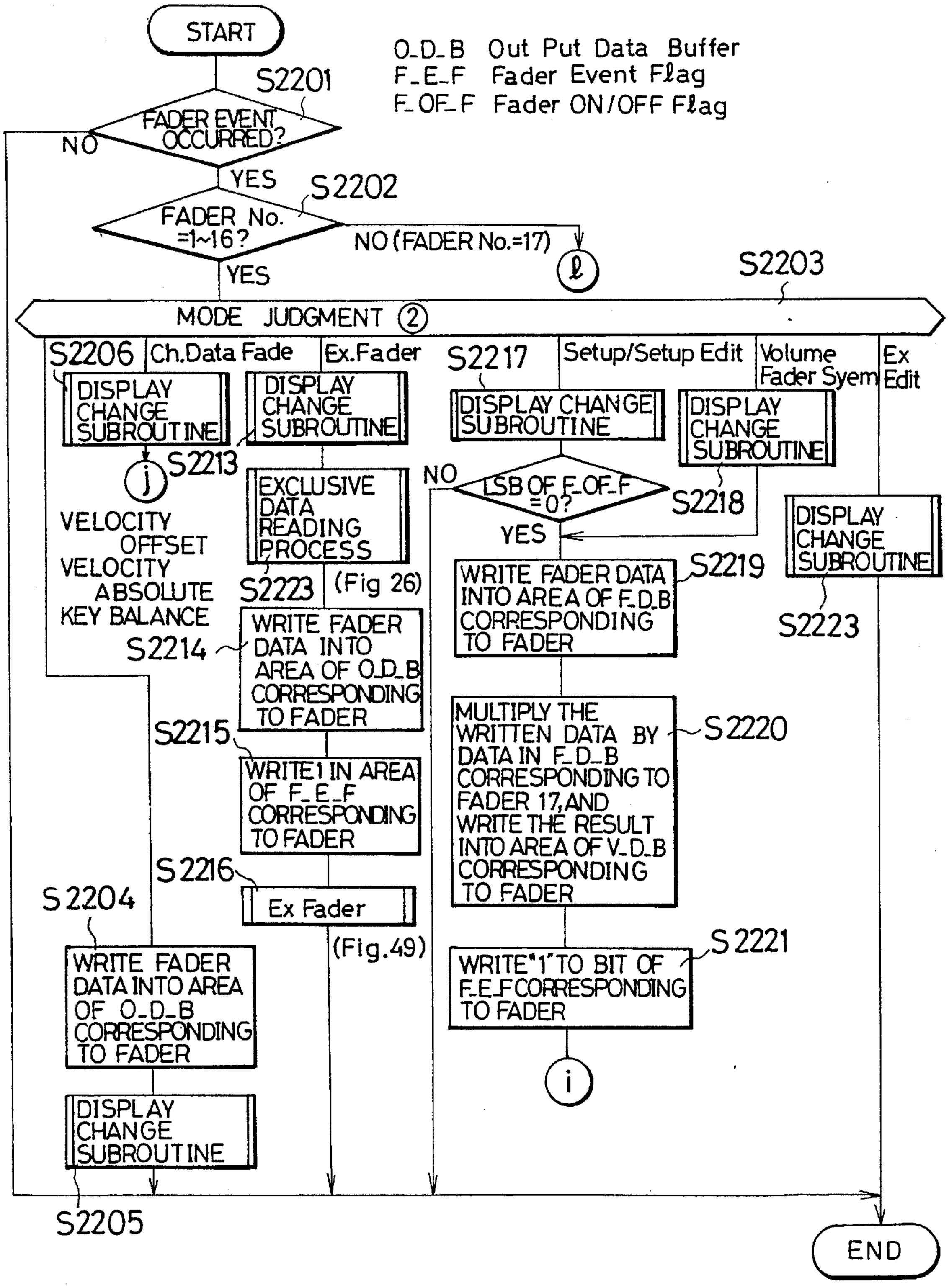
FIG. 22A is the first half of a flowchart illustrating a fader event process.
Figure 22B:
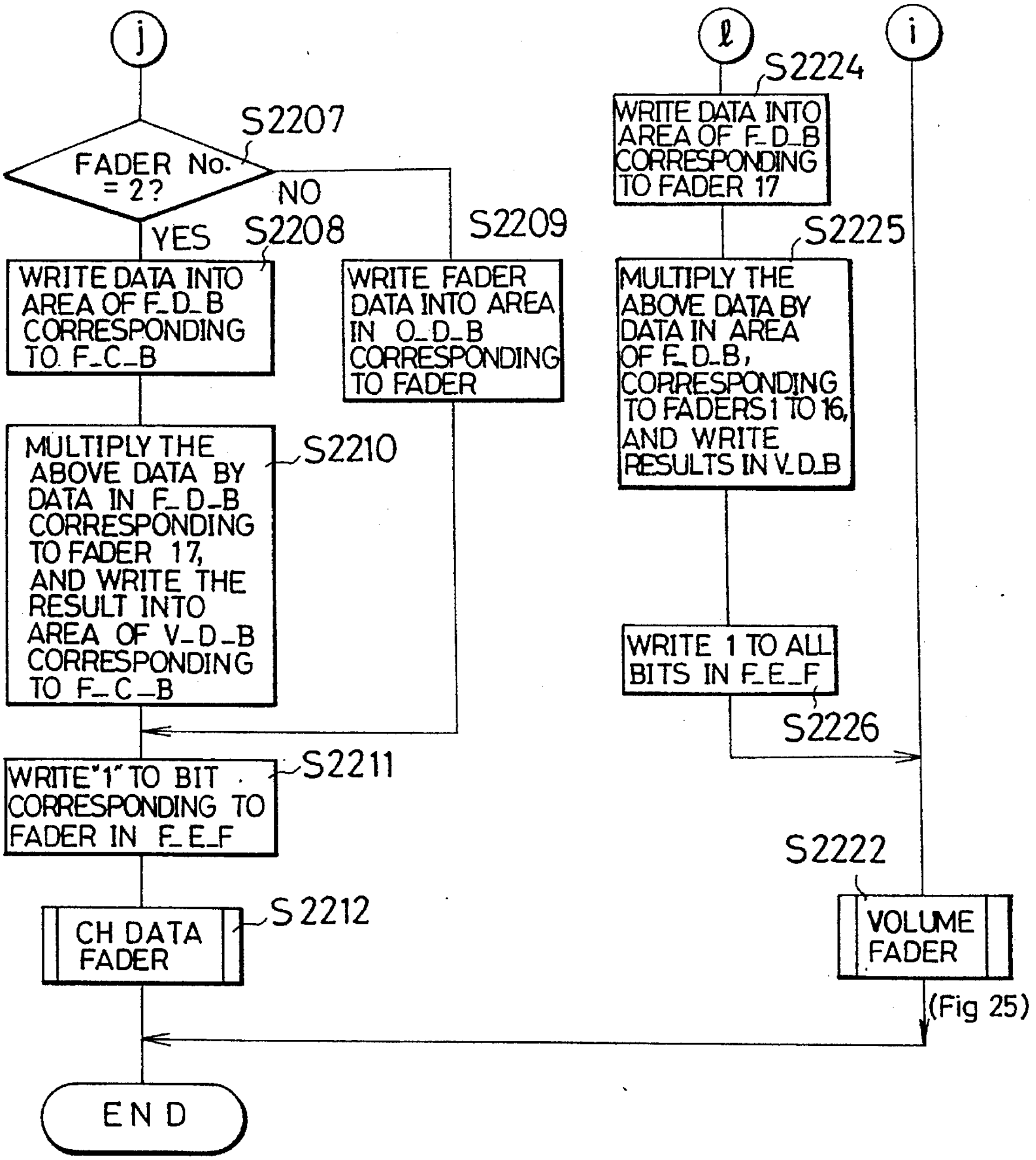
FIG. 22B is the second half of the flowchart.

FIGS. 22A and 22B disclose a routine for a fader event process, in which when a fader event is detected, an O_D_B/fader data buffer F_D_B or a volume data buffer V_D_B is selected in association with the mode then, in use and data associated with the event is written. Further, in this routine, "1" is set to a bit corresponding to the fader number of an F_E_F.

Figure 49:
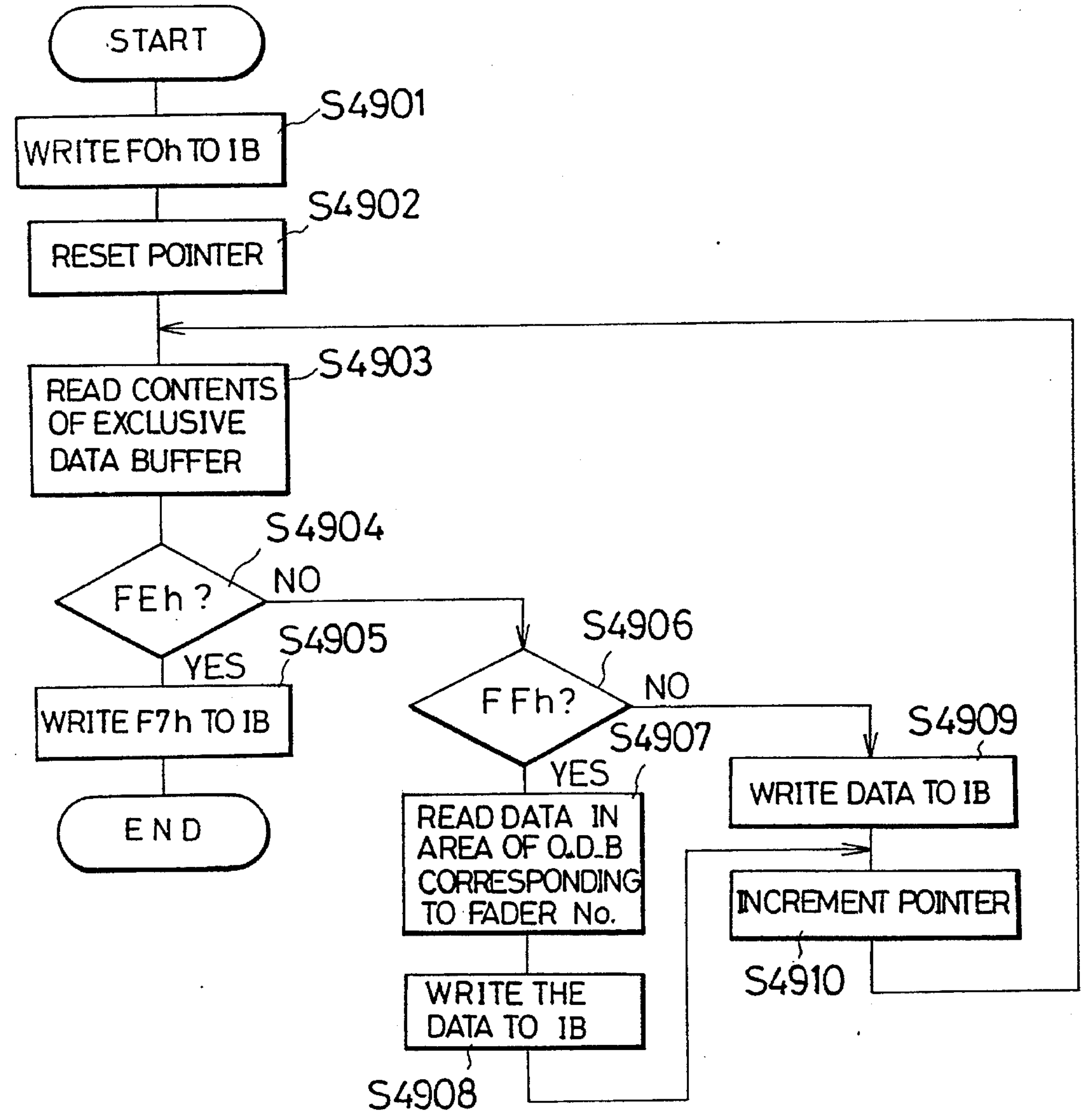
FIG. 49 is a flowchart illustrating an exclusive fader process.

A channel data fader (CH.DATA FADER) process is performed to generate MIDI data to be output. A routine for an exclusive fader (EX.Fader) process is shown in FIG. 49, and a routine for a VOLUME FADER process is shown in FIG. 25.

Figure 23:
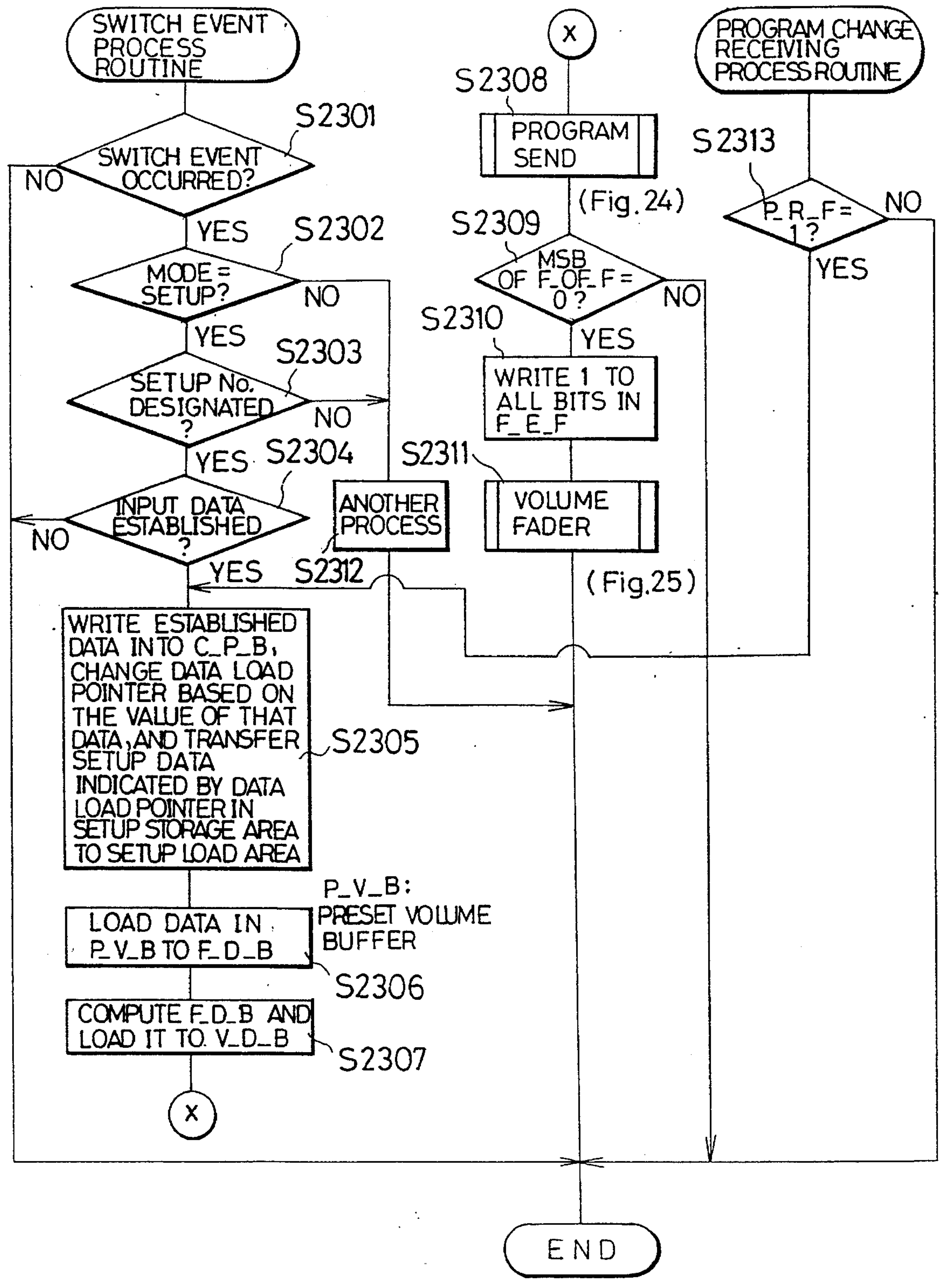
FIG. 23 is a flowchart illustrating a setup process.

FIG. 23 is a routine for a setup process where data for a setup No. corresponding to a current program buffer C_P_B is transmitted from the setup storage area to the setup load area. This setup process is performed as a switch event process in association with a key operation or as a program change reception process according to received MIDI information.

Figure 24:
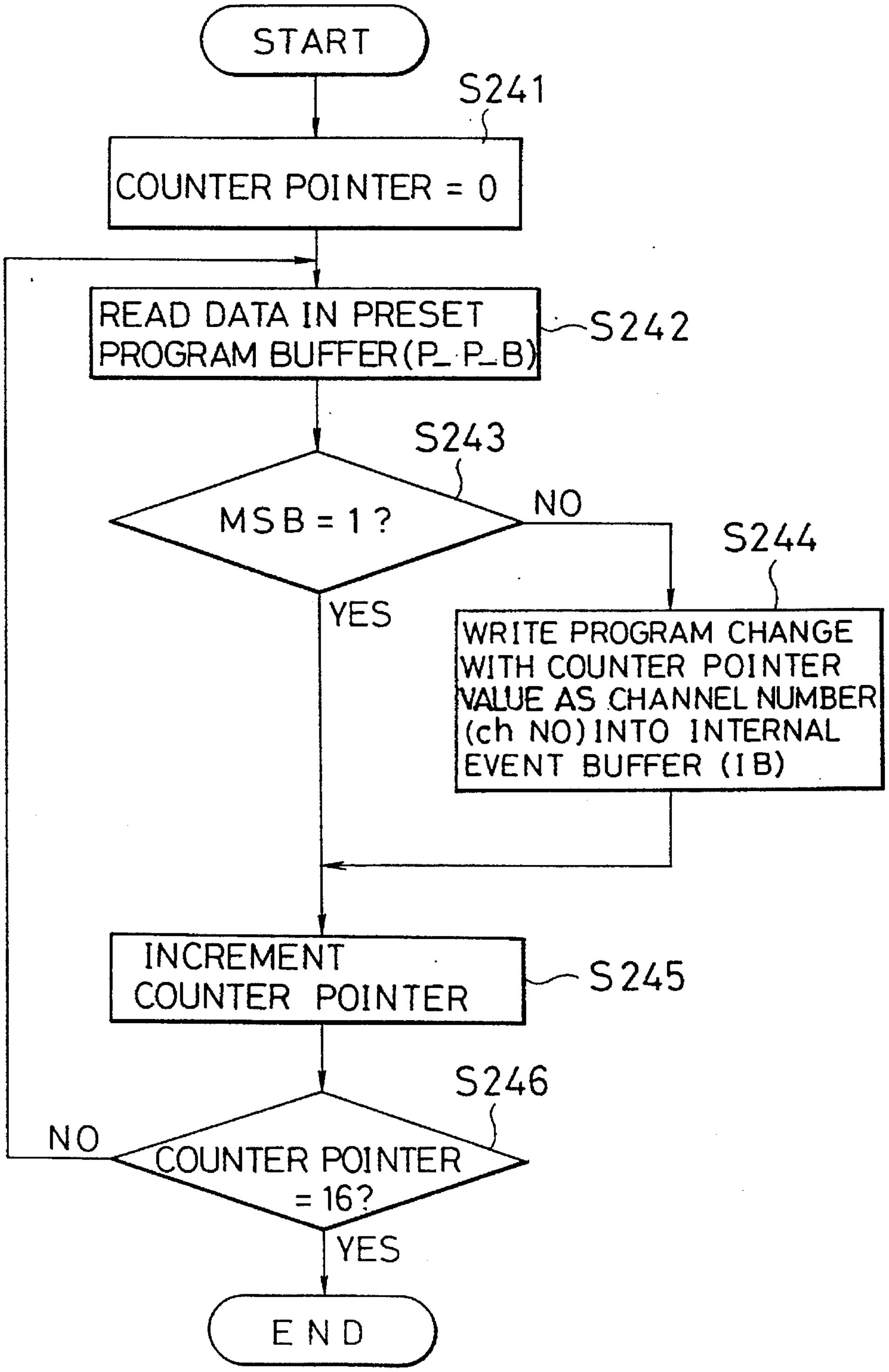
FIG. 24 is a flowchart illustrating a program send (PROGRAM SEND) process.
Figure 25:
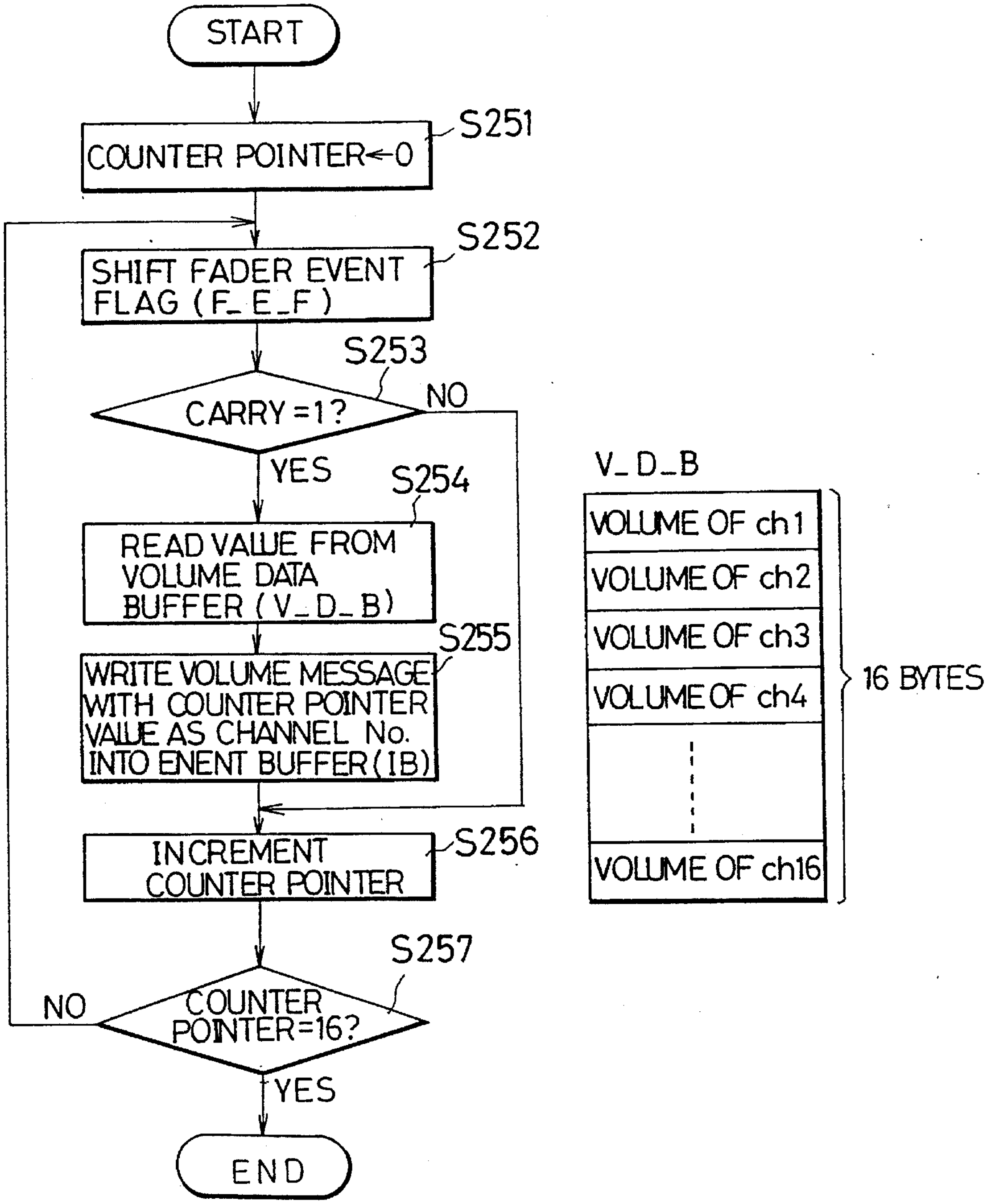
FIG. 25 is a flowchart illustrating a volume fader (VOLE FADER) process.

FIG. 24 is a routine for a program send process, and FIG. 25 shows a routine for the volume fader process.

Figure 26:
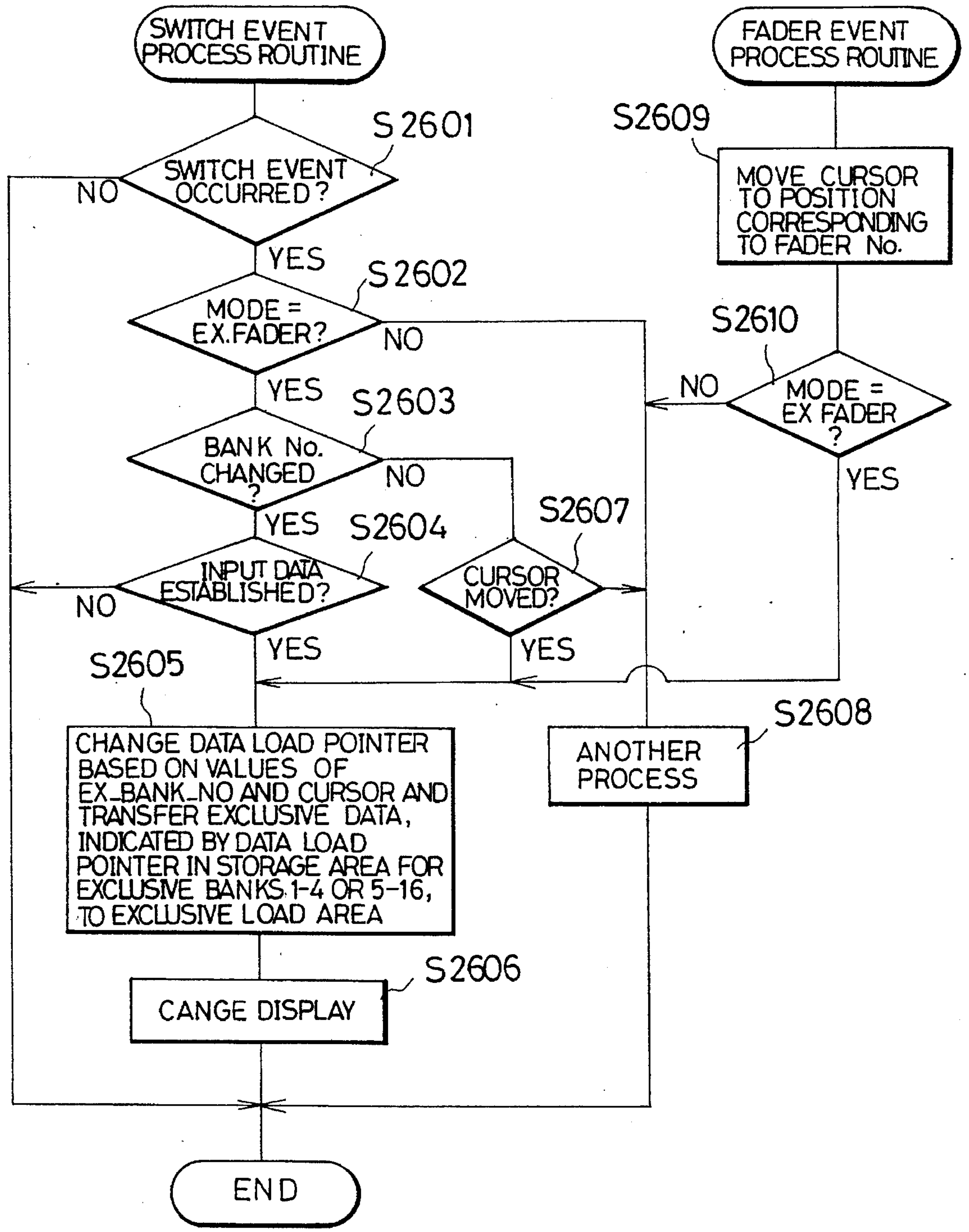
FIG. 26 is a flowchart illustrating an exclusive data reading process.

FIG. 26 is an exclusive data reading process where an exclusive bank is indicated by an exclusive bank number EX_BANK_NO., an exclusive No. is indicated by a cursor, and the indicated data is transmitted to an exclusive load area.

Figure 27:
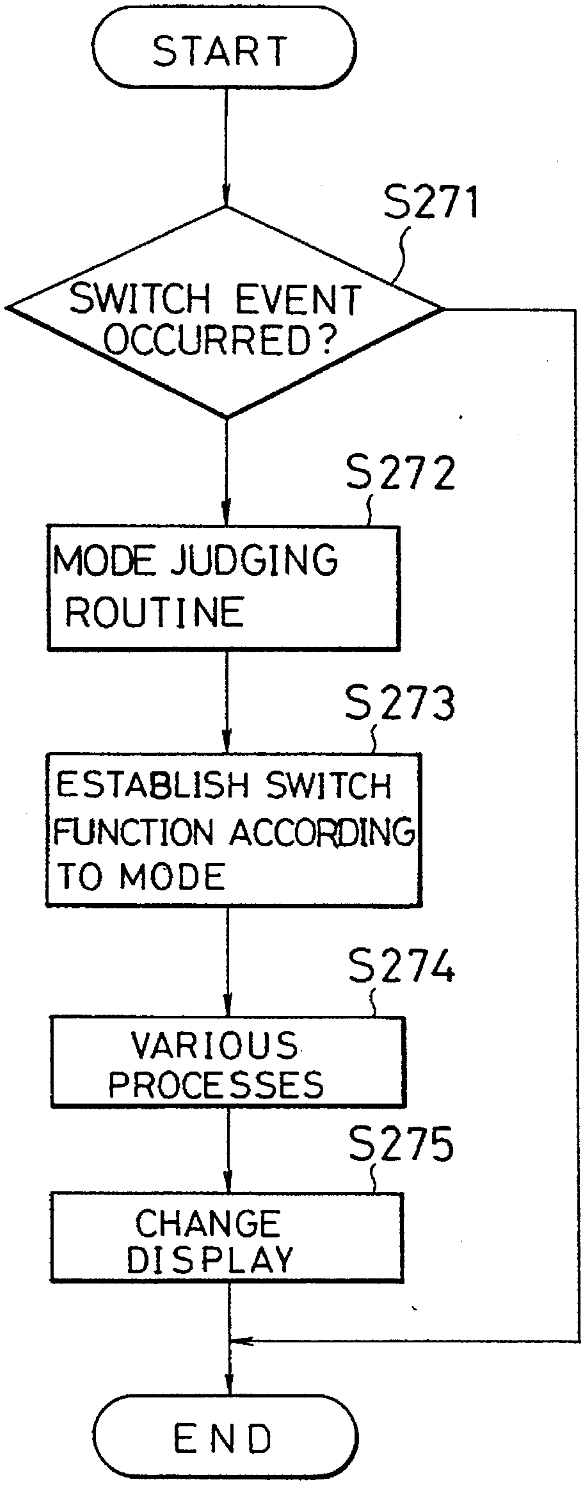
FIG. 27 is a flowchart presenting the schematic illustration of a switch event process.

FIG. 27 shows a general flow of the switch event process, and the switch event processes for the individual switches shown in FIGS. 28 to 48 are done according to the procedures in this flow.

Figure 28:
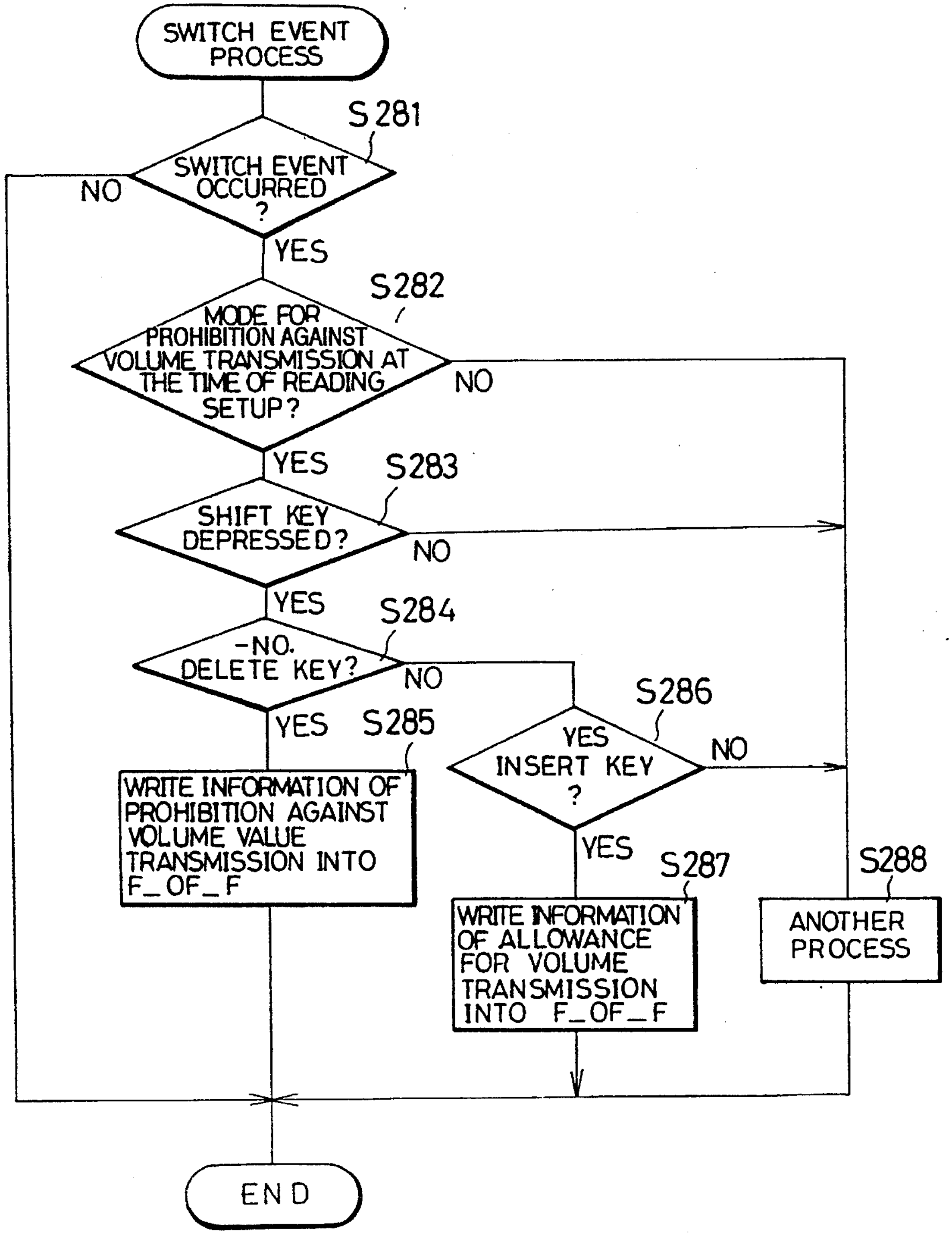
FIG. 28 is a flowchart illustrating a setup setting process (1)

FIG. 28 shows a routine for a setup process (1) in which a volume transmission prohibition setting mode process is performed in setup edit mode. Information about prohibiting/allowing volume transmission which is determined in this process is written by a fader ON/OFF flag F_OF_F.

Figure 29:
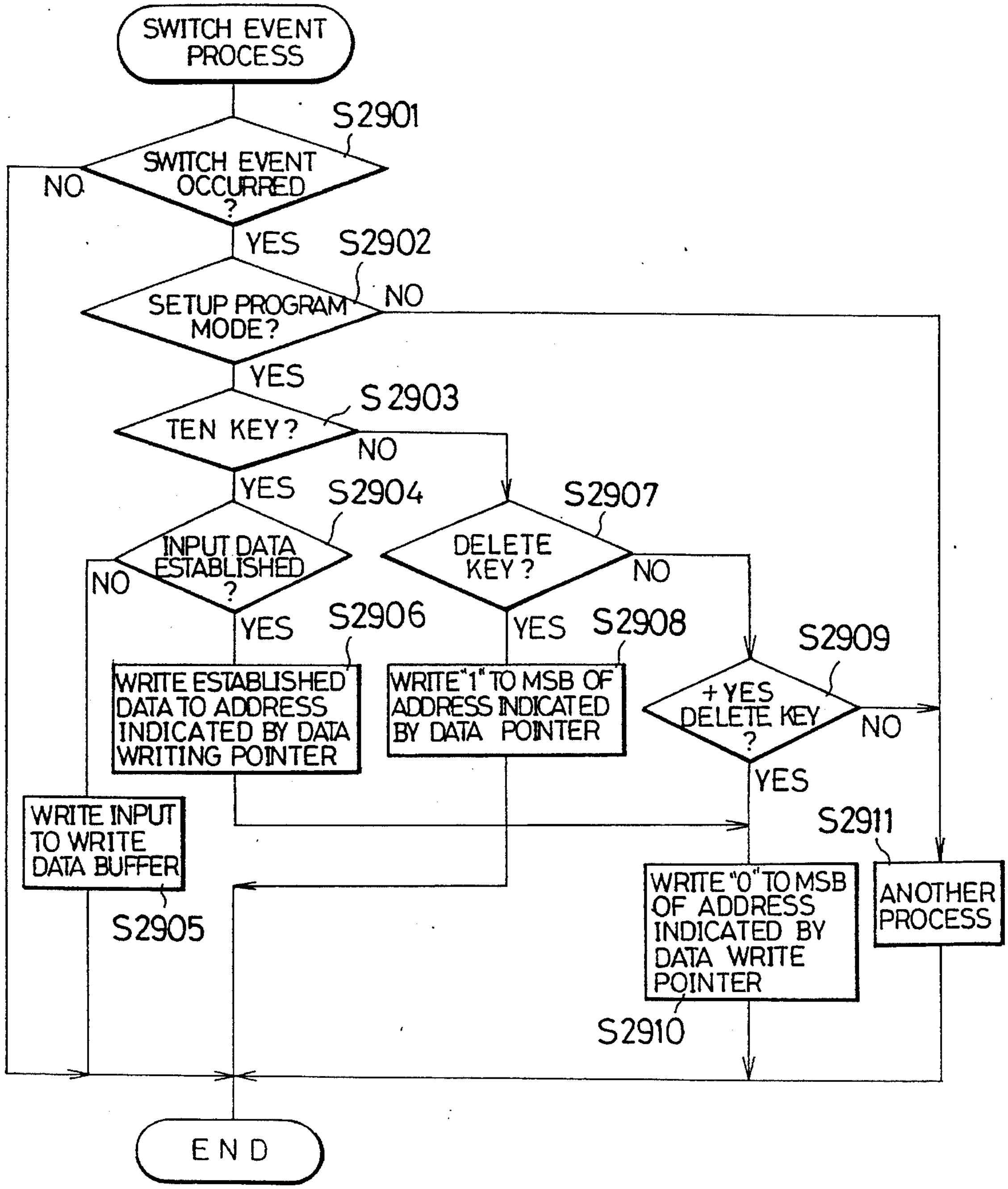
FIG. 29 is a flowchart illustrating a setup setting process (2)

FIG. 29 shows a routine for a setup setting process (2) to execute a setup program setting mode process. In this process data is written in a preset program buffer P_P_B.

Figure 30:
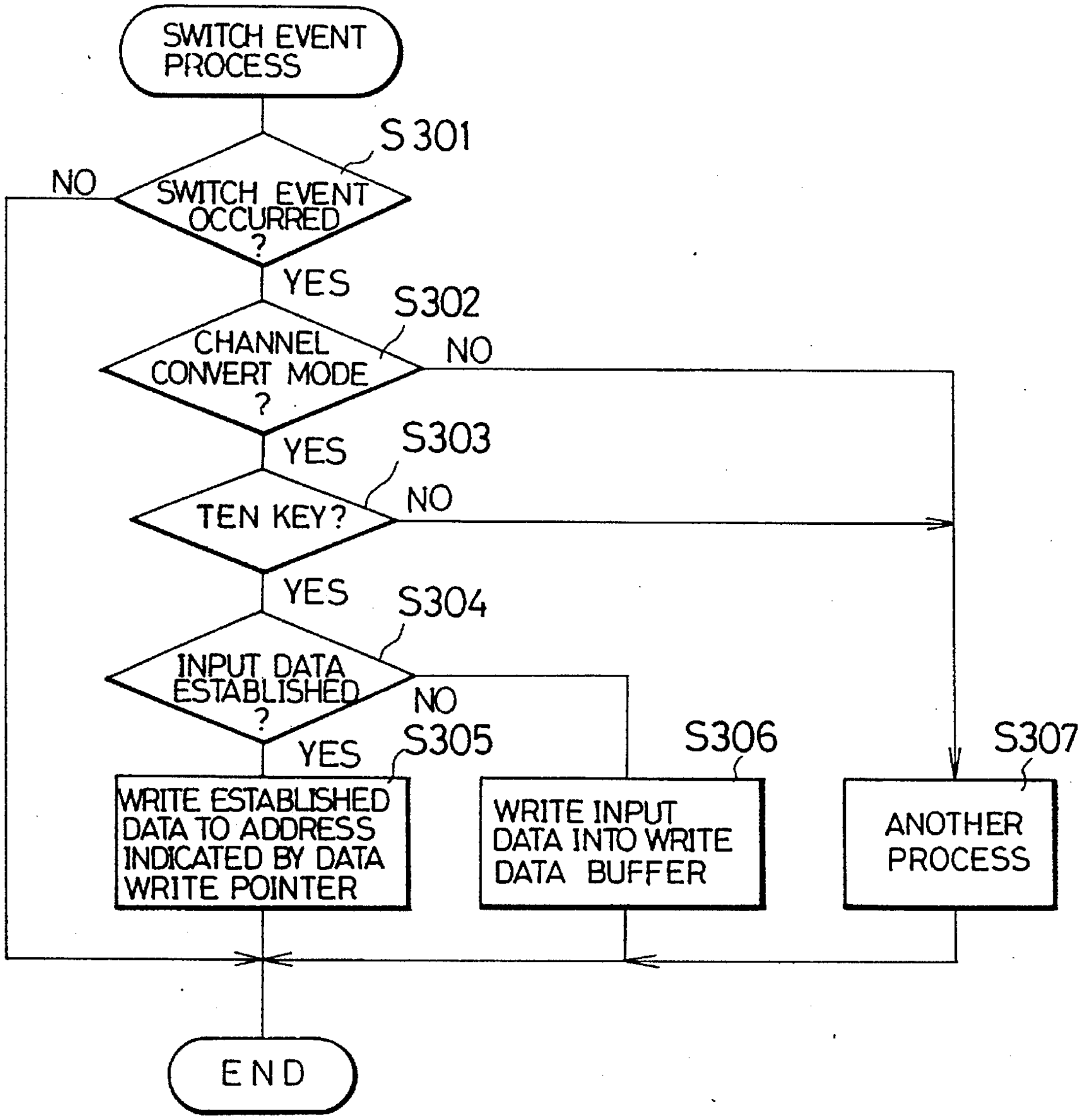
FIG. 30 is a flowchart illustrating a setup setting process (3)

FIG. 30 shows a routine for a setup setting process (3) to execute a channel convert setting mode process. In this process data is written in a CH_C_T.

Figure 31:
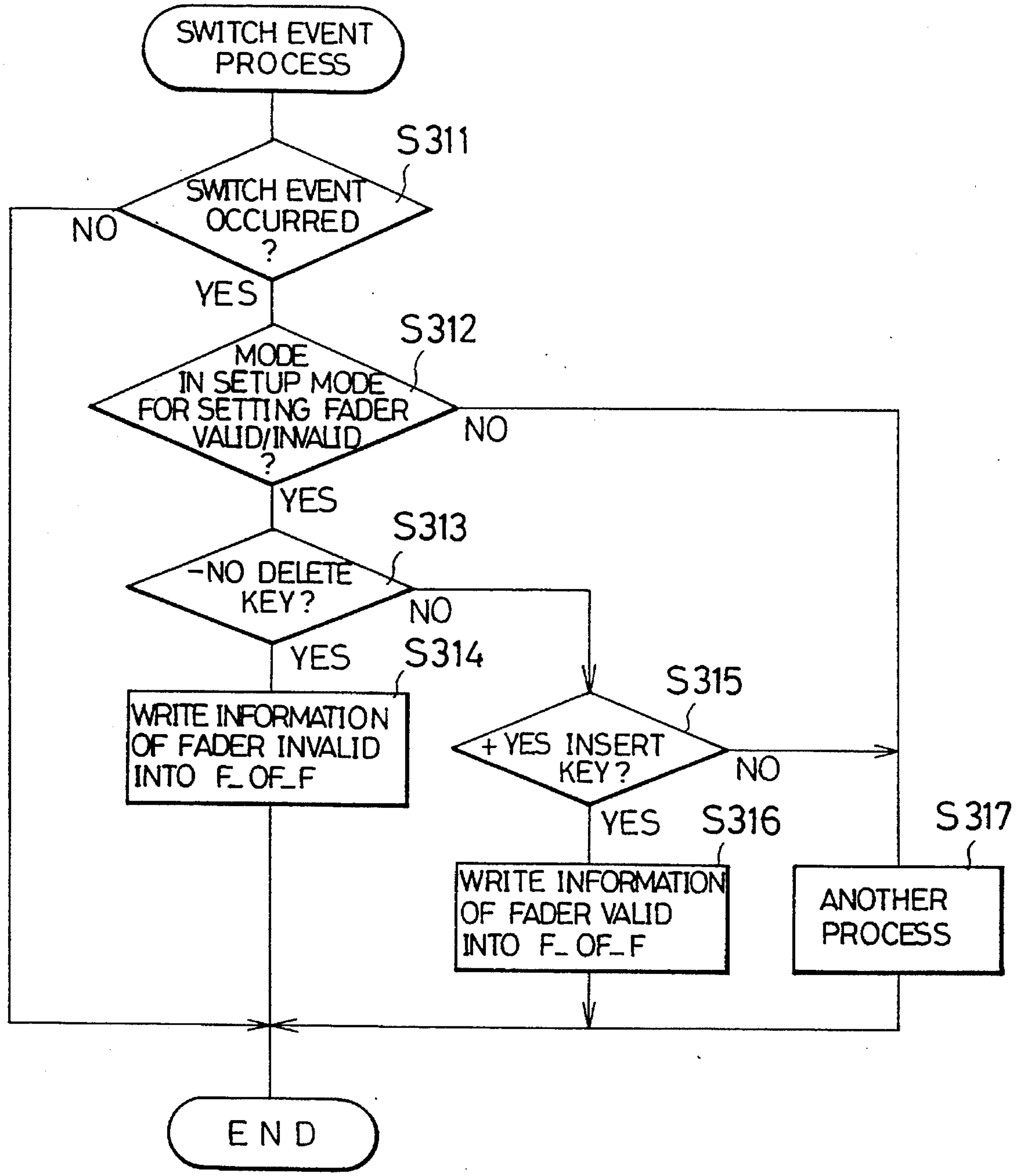
FIG. 31 is a flowchart illustrating a setup setting process (4)

FIG. 31 shows a routine for a setup setting process (4) where a process for a mode to set fader validation/invalidation is performed in setup mode. In this process data is written in F_OF_F.

Figure 32:
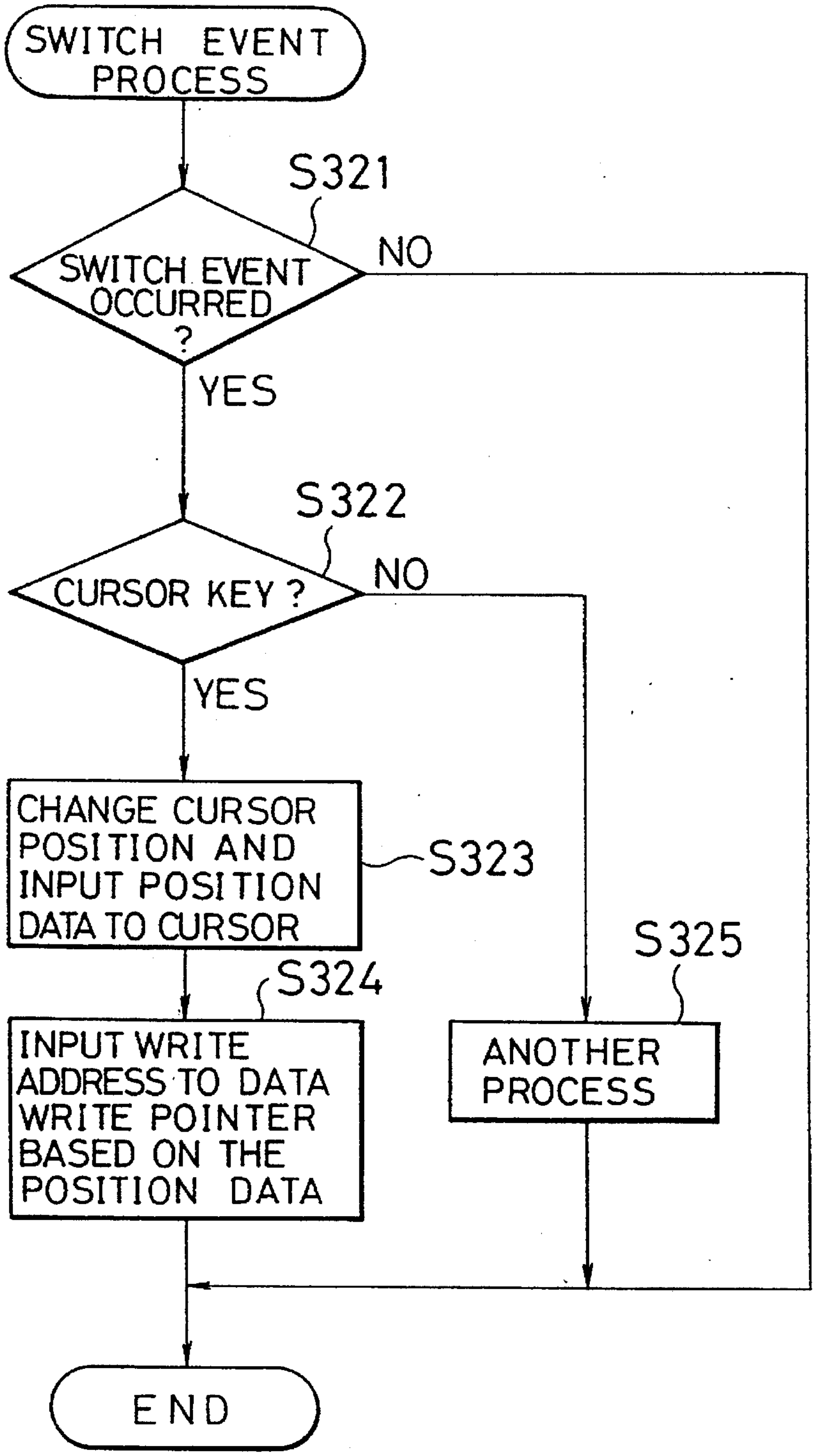
FIG. 32 is a flowchart illustrating a cursor moving process.

FIG. 32 shows a routine for a setup data memory writing process (1) to execute a process of transferring data from the setup data load area of the-work memory 6 to the setup storage area in the data memory 7. Further, the address of transfer designation in the setup data load area is written in a data load pointer.

Figure 33:
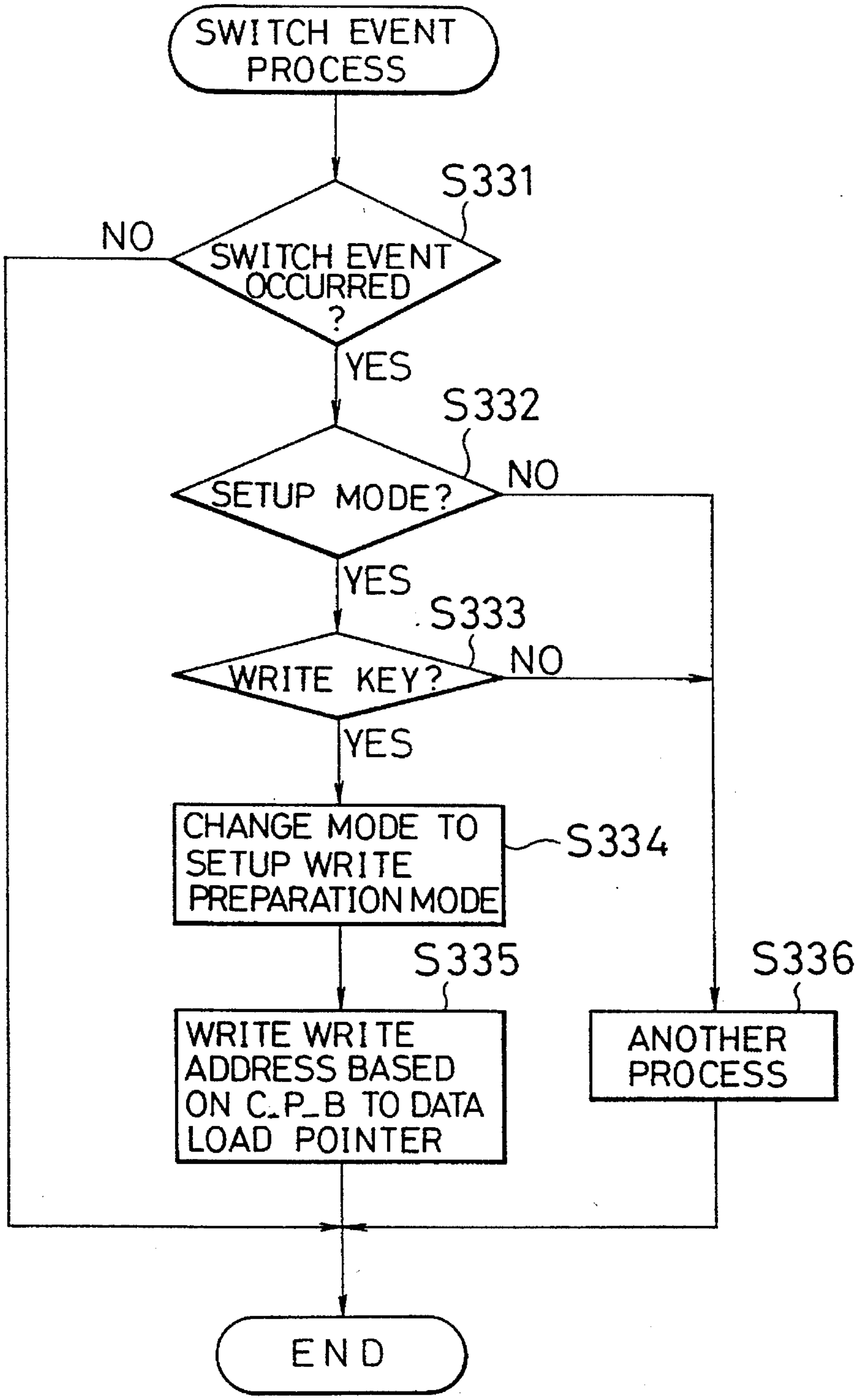
FIG. 33 is a flowchart illustrating a setup data memory writing process (1)

FIG. 33 shows a routine for a setup data memory writing process (1) for writing the contents of C_P_B to the data loan pointer.

Figure 34:
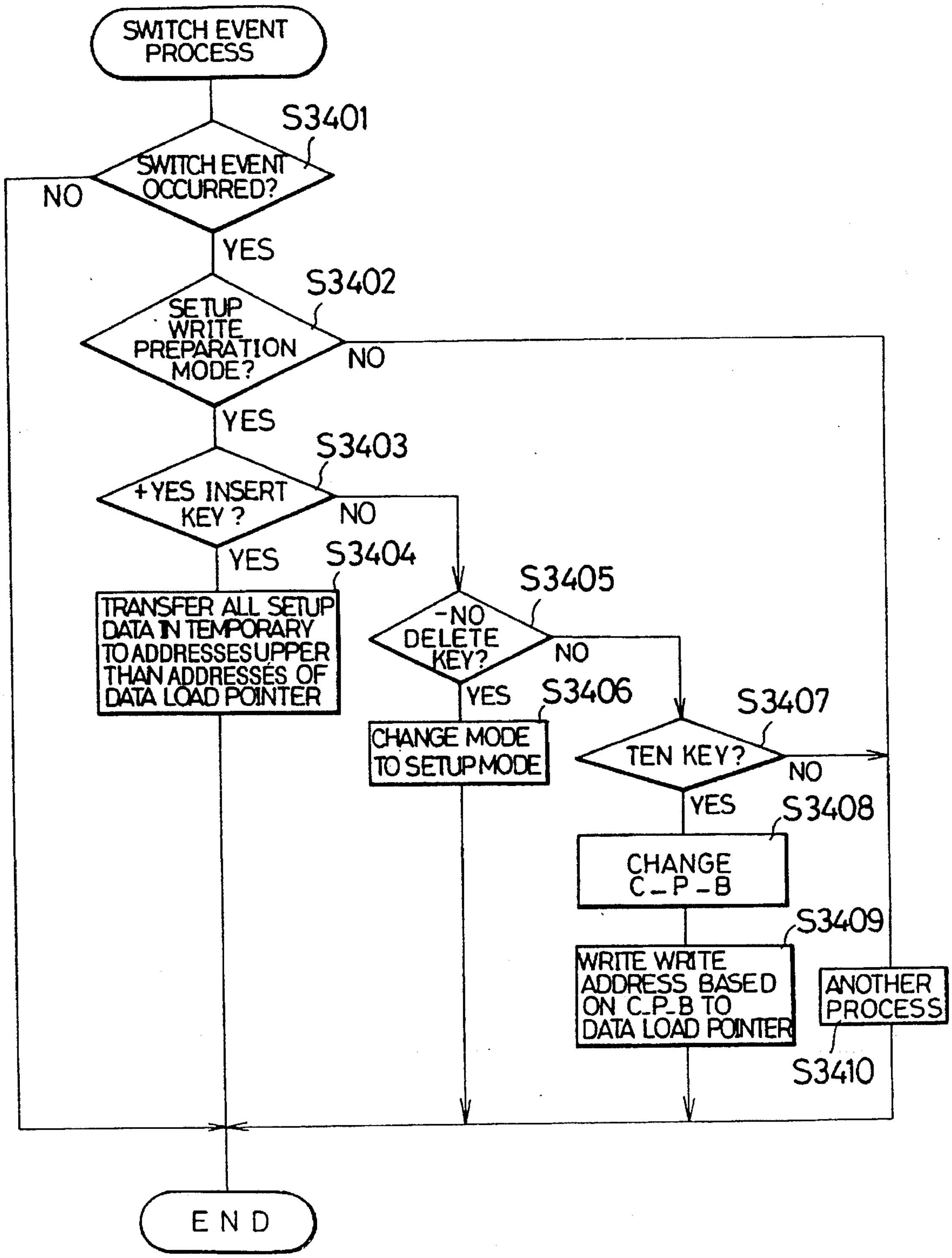
FIG. 34 is a flowchart illustrating a setup data memory writing process (2)

FIG. 34 shows a routine for a setup data memory writing process (2) to execute a process of transferring the contents of the setup data load area of the work memory 6 to the setup storage area in the data memory 7. Further, alteration of the data load pointer is carried out.

Figure 35:
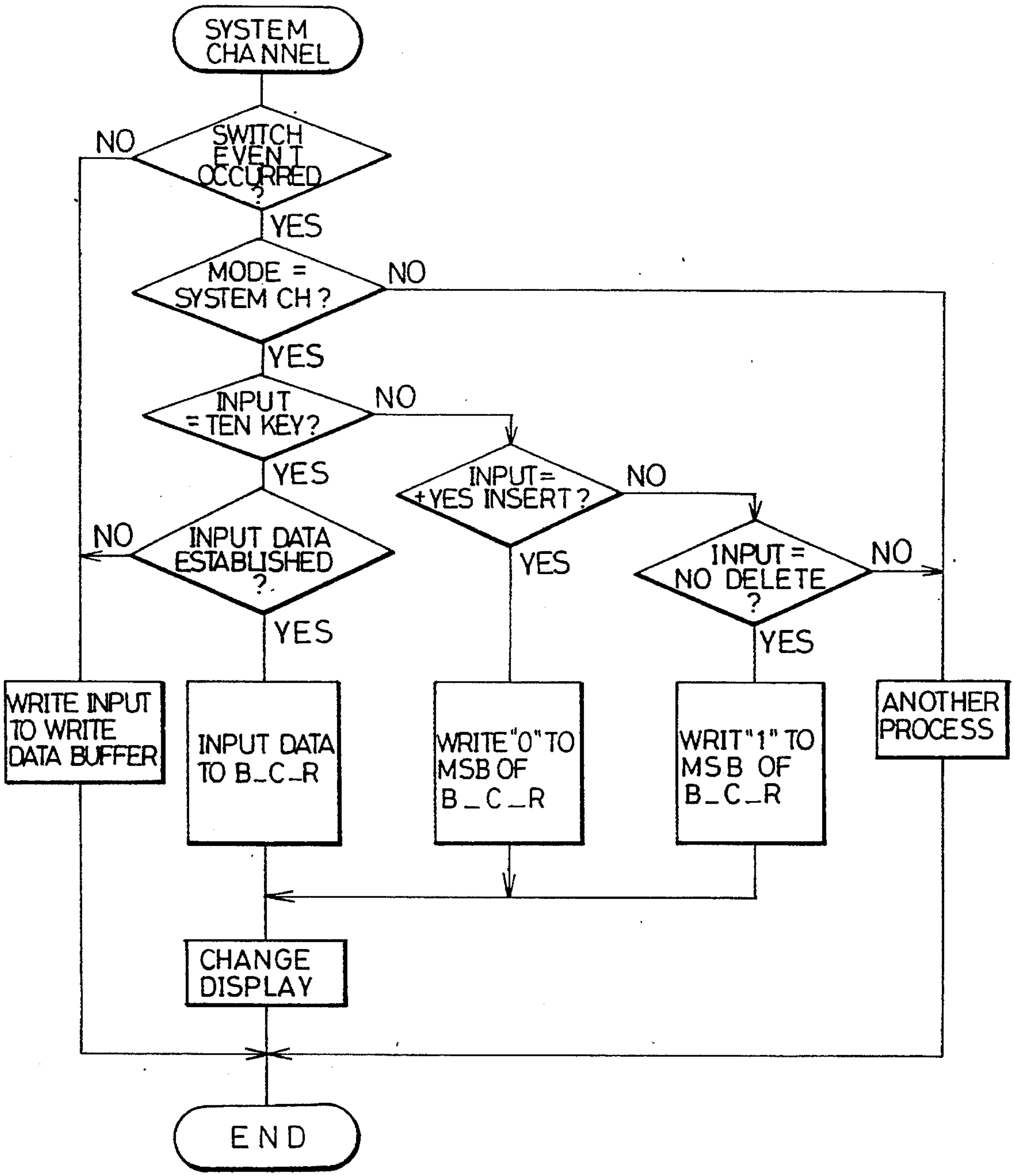
FIG. 35 is a flowchart illustrating a system channel process.

FIG. 35 shows a routine for a system channel process where the contents of the B_C_R are changed in accordance with a key operation.

Figure 36:
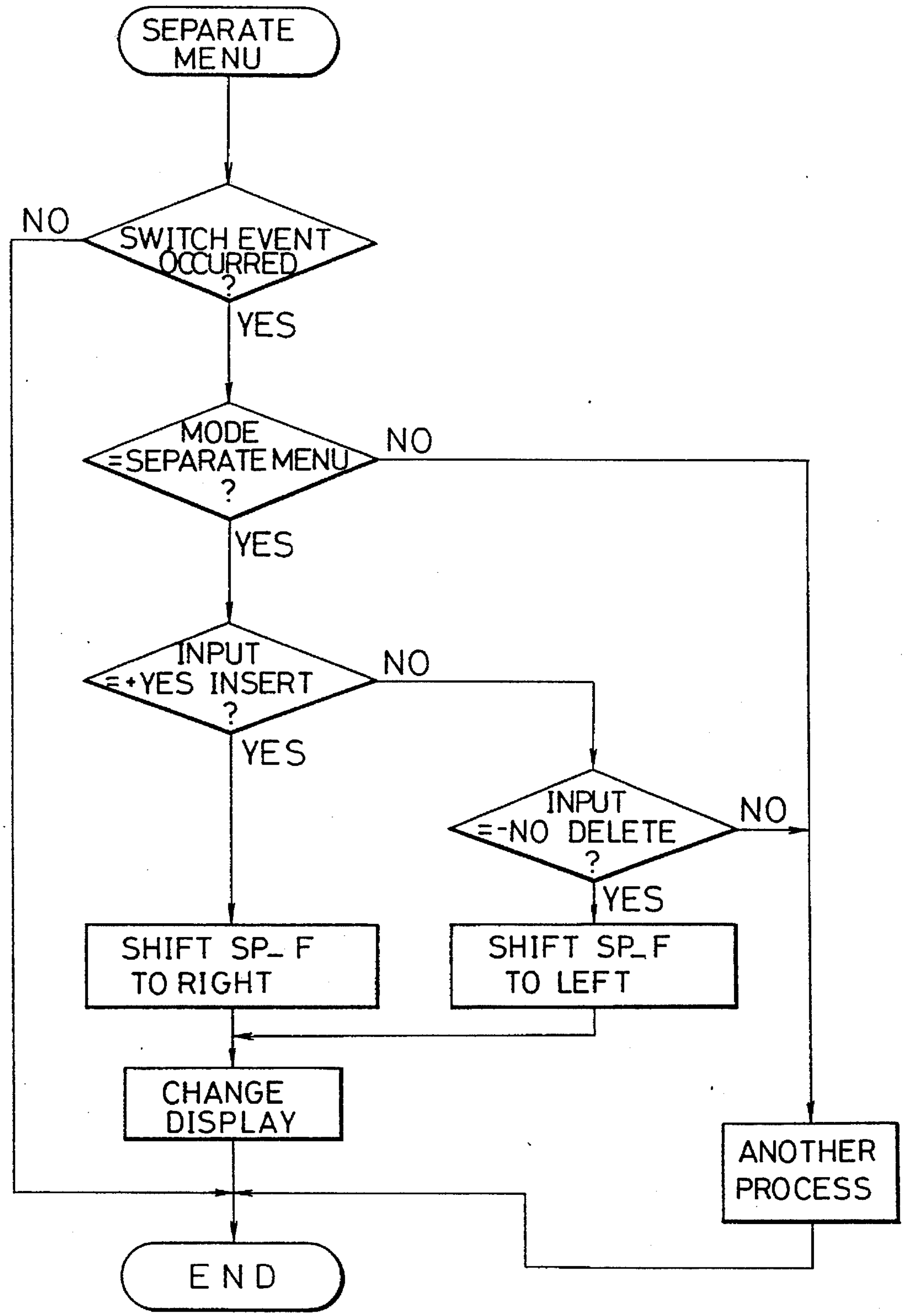
FIG. 36 is a flowchart illustrating a separate menu process.

FIG. 36 shows a routine for a separate menu process where the contents of a separate flag SP_F are changed in accordance with a key operation.

Figure 37:
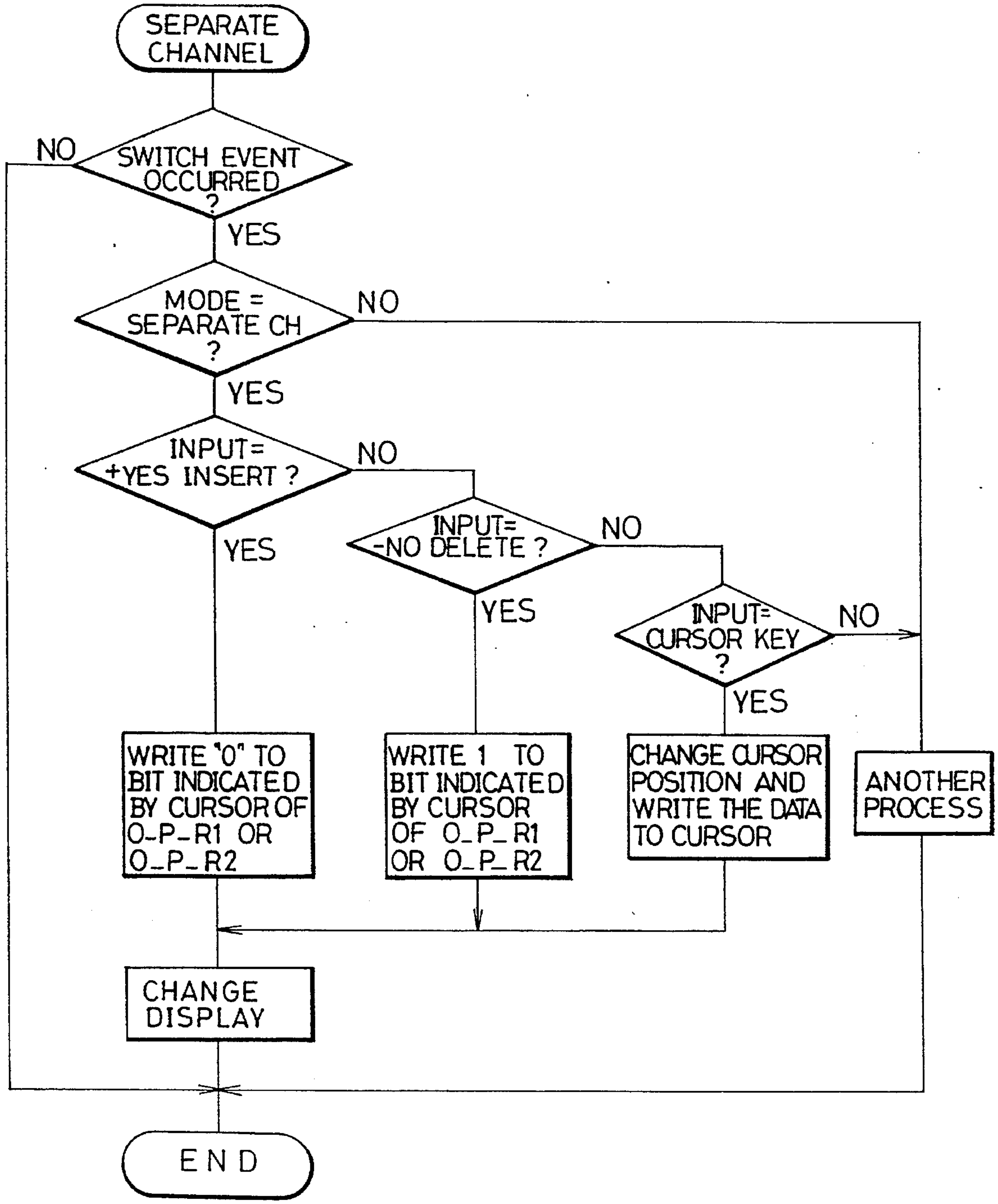
FIG. 37 is a flowchart illustrating a separate channel process.

FIG. 37 shows a routine for a separate channel process where the contents of the O_P_R1 and O_P_R2 are changed in accordance with a key operation.

Figure 38:
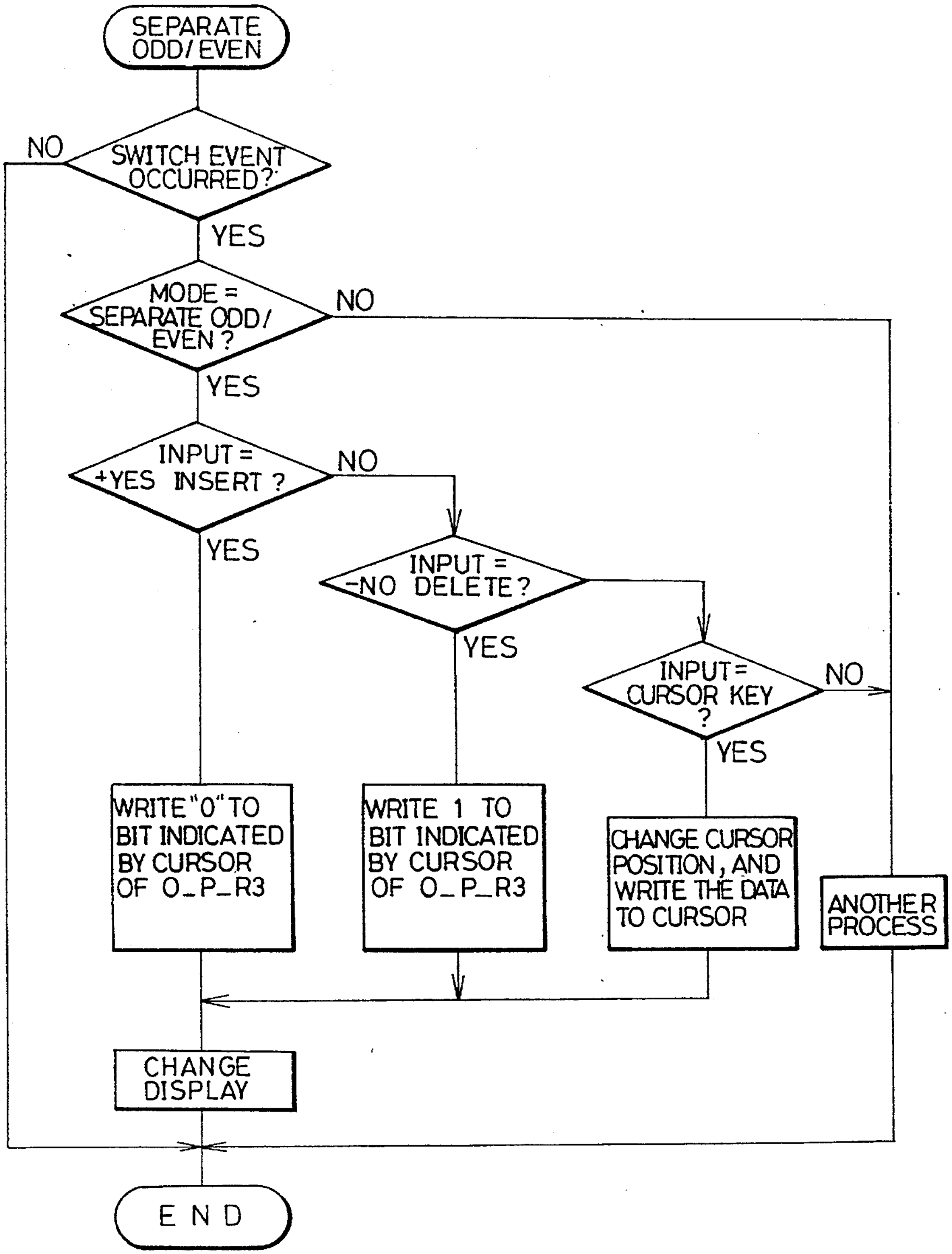
FIG. 38 is a flowchart illustrating a separate odd/even process.

FIG. 38 shows a routine for a separate odd/even process where the contents of the O_P_R3 are changed in accordance with a key operation.

Figure 39:
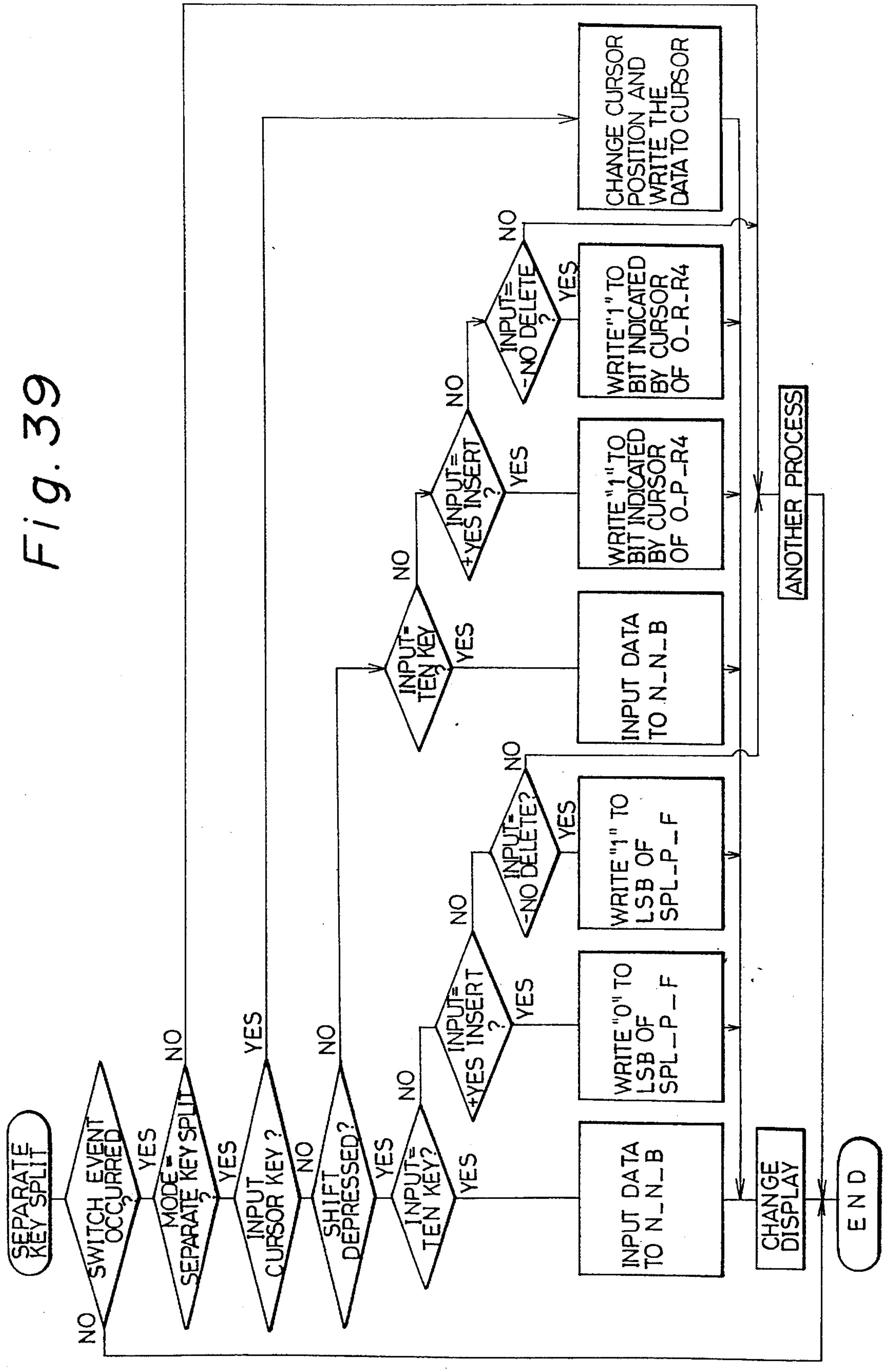
FIG. 39 is a flowchart illustrating a separate key split process.

FIG. 39 shows a routine for a separate key split process where the contents of the N_N_B, SPL_P_F and O_P_R4 are changed in accordance with a key operation.

Figure 40:
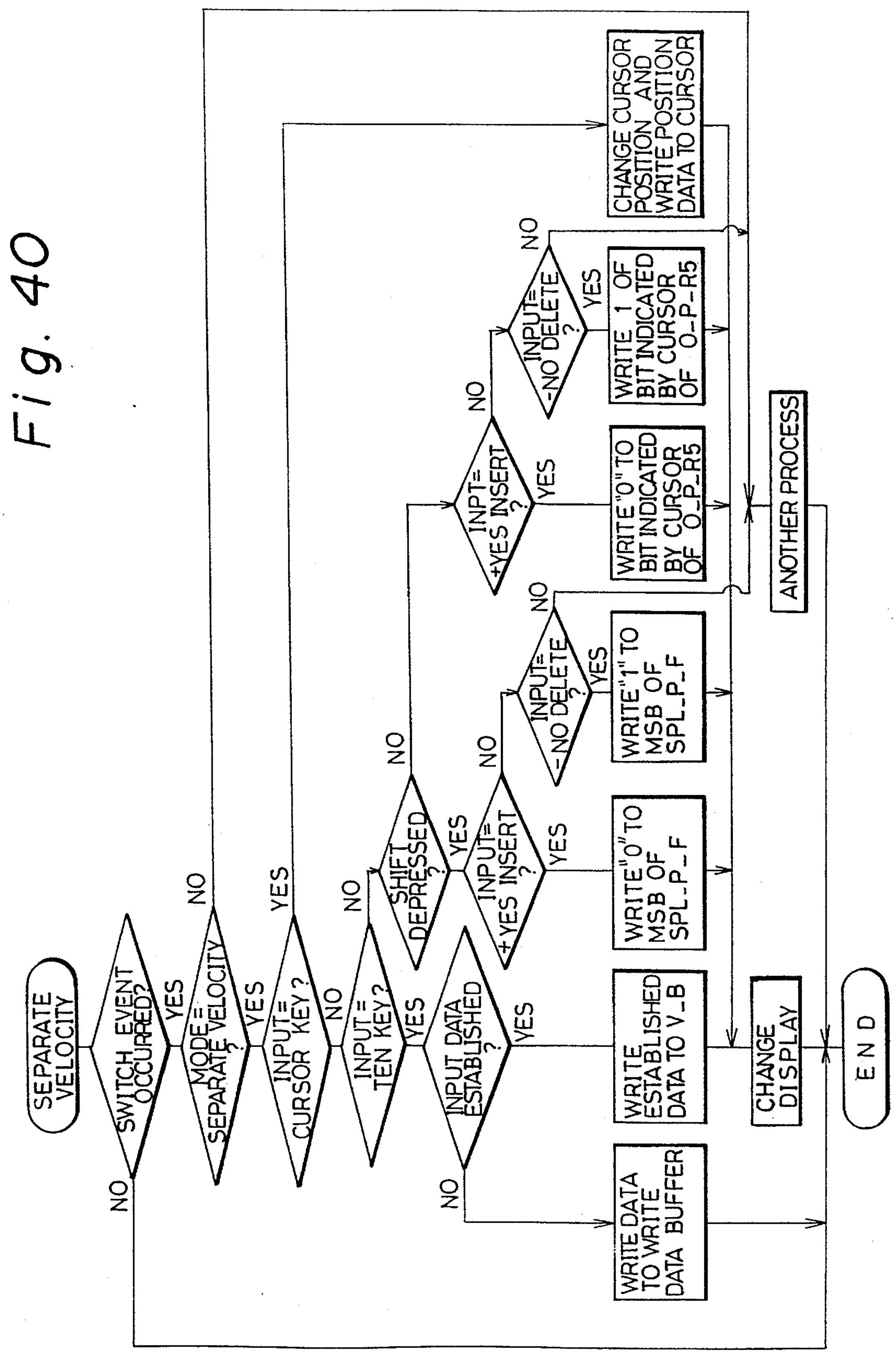
FIG. 40 is a flowchart illustrating a separate velocity process.

FIG. 40 shows, a routine for a separate velocity process where the contents of the velocity buffer V_B, SPL_P_F and O_P_R5 are changed in accordance with a key operation.

Figure 41:
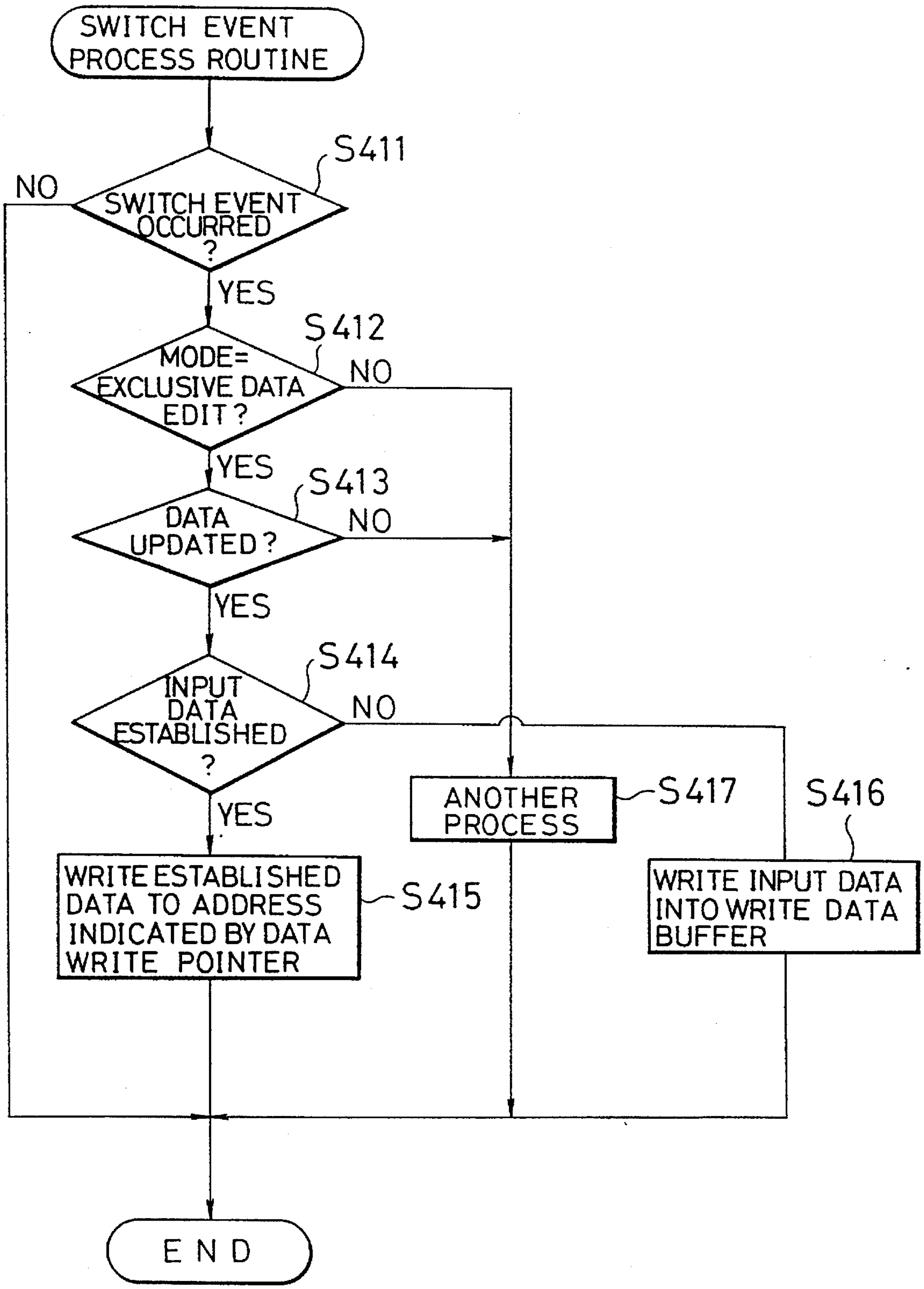
FIG. 41 is a flowchart illustrating an exclusive edit process (data edit process)

FIG. 41 shows a routine for an exclusive edit process (data edit) where the contents of an exclusive data buffer EX_DB are changed.

Figure 42:
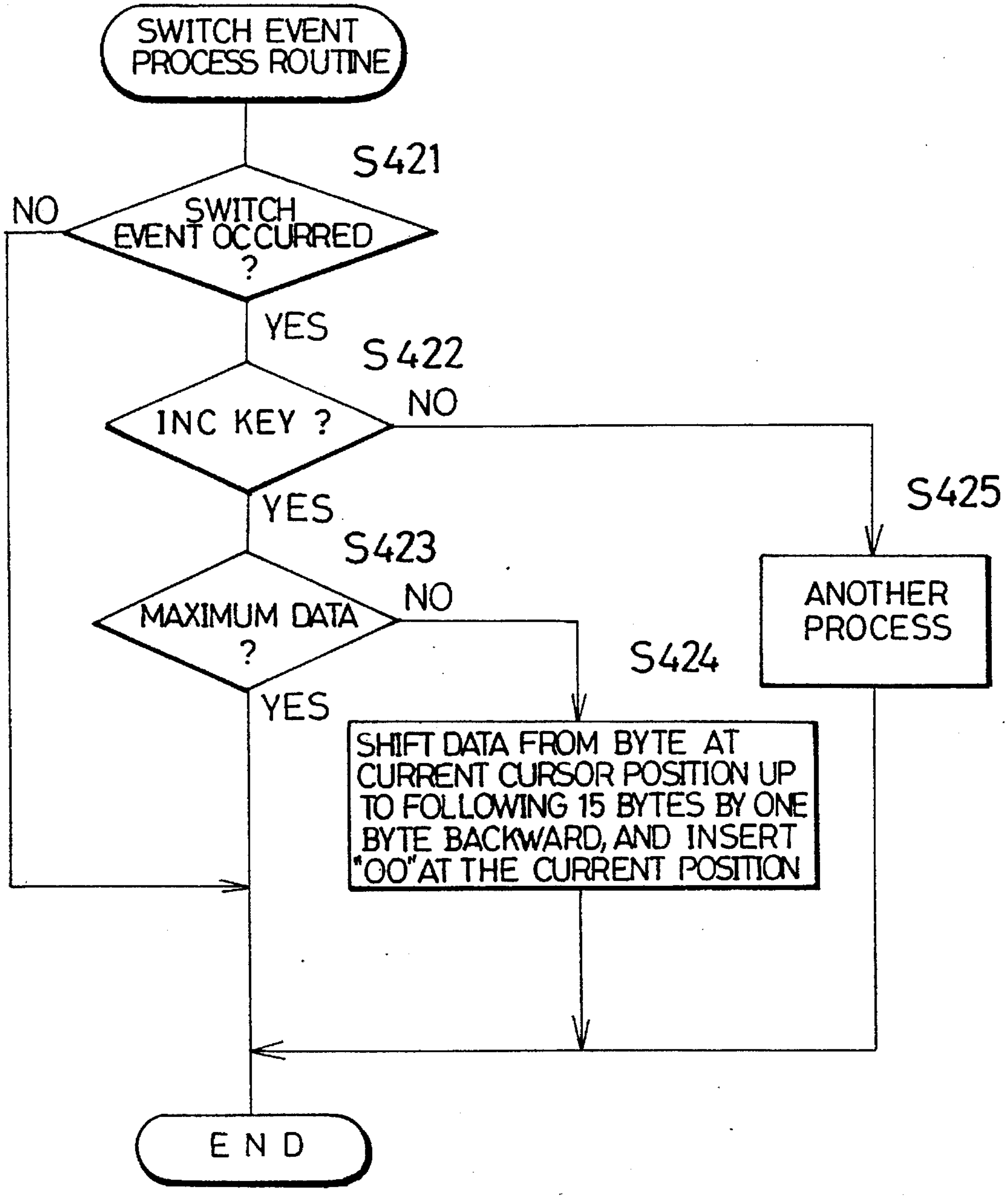
FIG. 42 is a flowchart illustrating an exclusive edit process (INC (data insertion) process)

FIG. 42 shows a routine for an exclusive edit process (INC (data insertion) process) where the contents of the EX_DB are changed.

Figure 43:
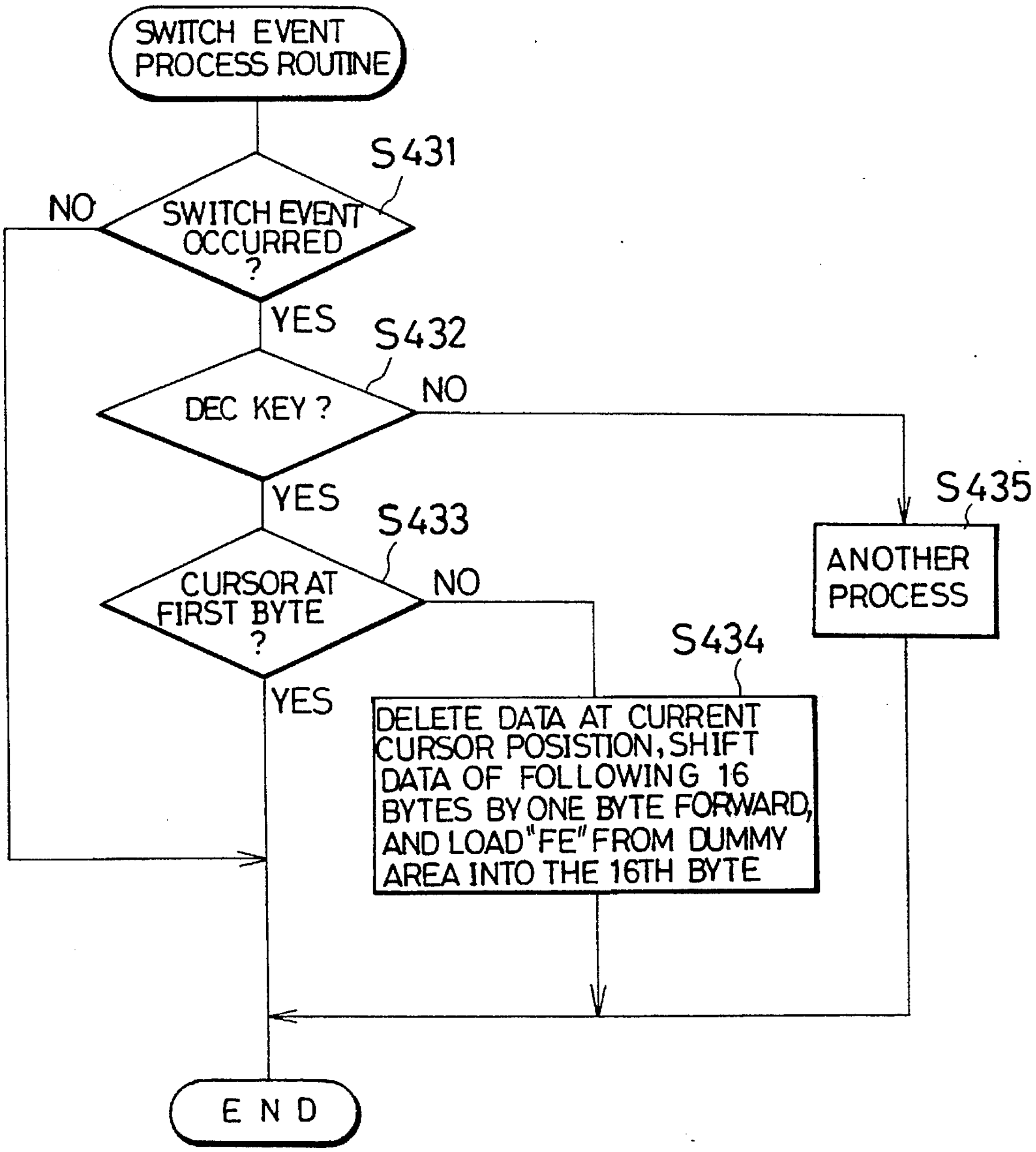
FIG. 43 is a flowchart illustrating an exclusive edit process (DEC (data erasing) process)

FIG. 43 shows a routine for an exclusive edit process (DEC (data erasing) process) where the contents of the EX_DB are changed.

Figure 44:
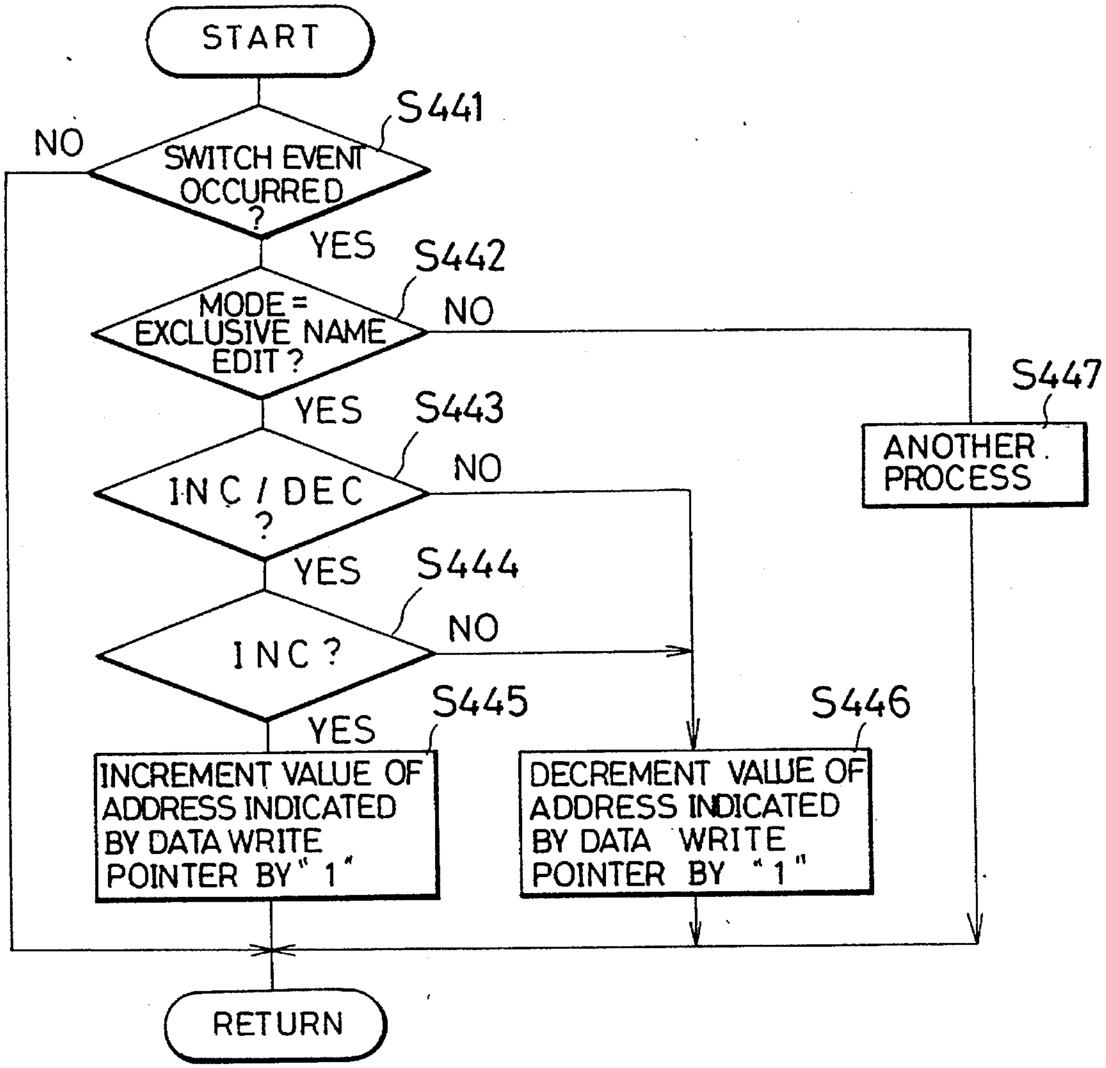
FIG. 44 is a flowchart illustrating an exclusive edit process (name edit)

FIG. 44 shows a routine for an exclusive edit process (name edit) where the contents of an EX_NB are changed.

Figure 45:
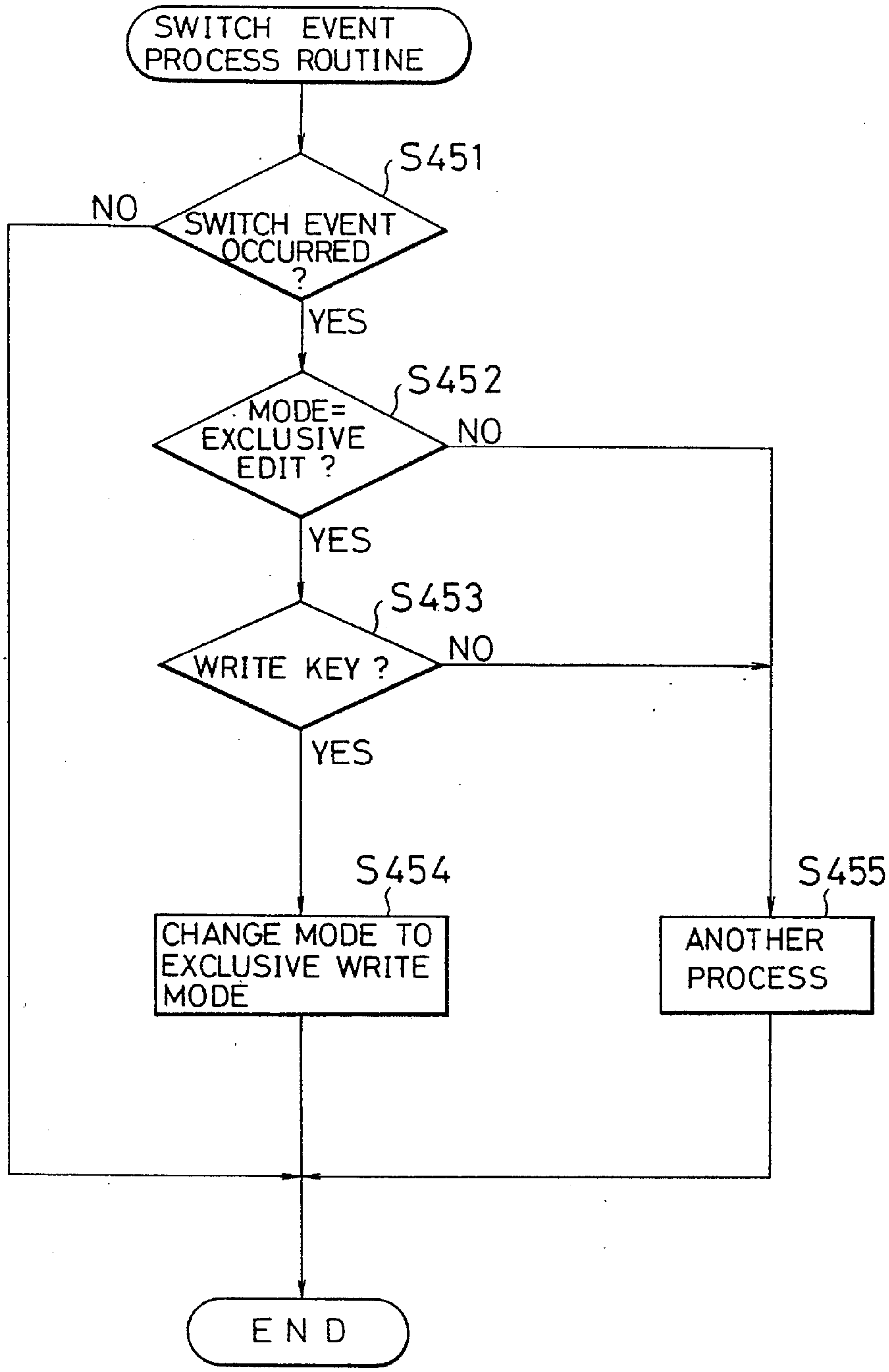
FIG. 45 is a flowchart illustrating an exclusive edit process (write process 1)

FIG. 45 shows a routine for an exclusive edit process (write process 1) where the mode is changed.

Figure 46:
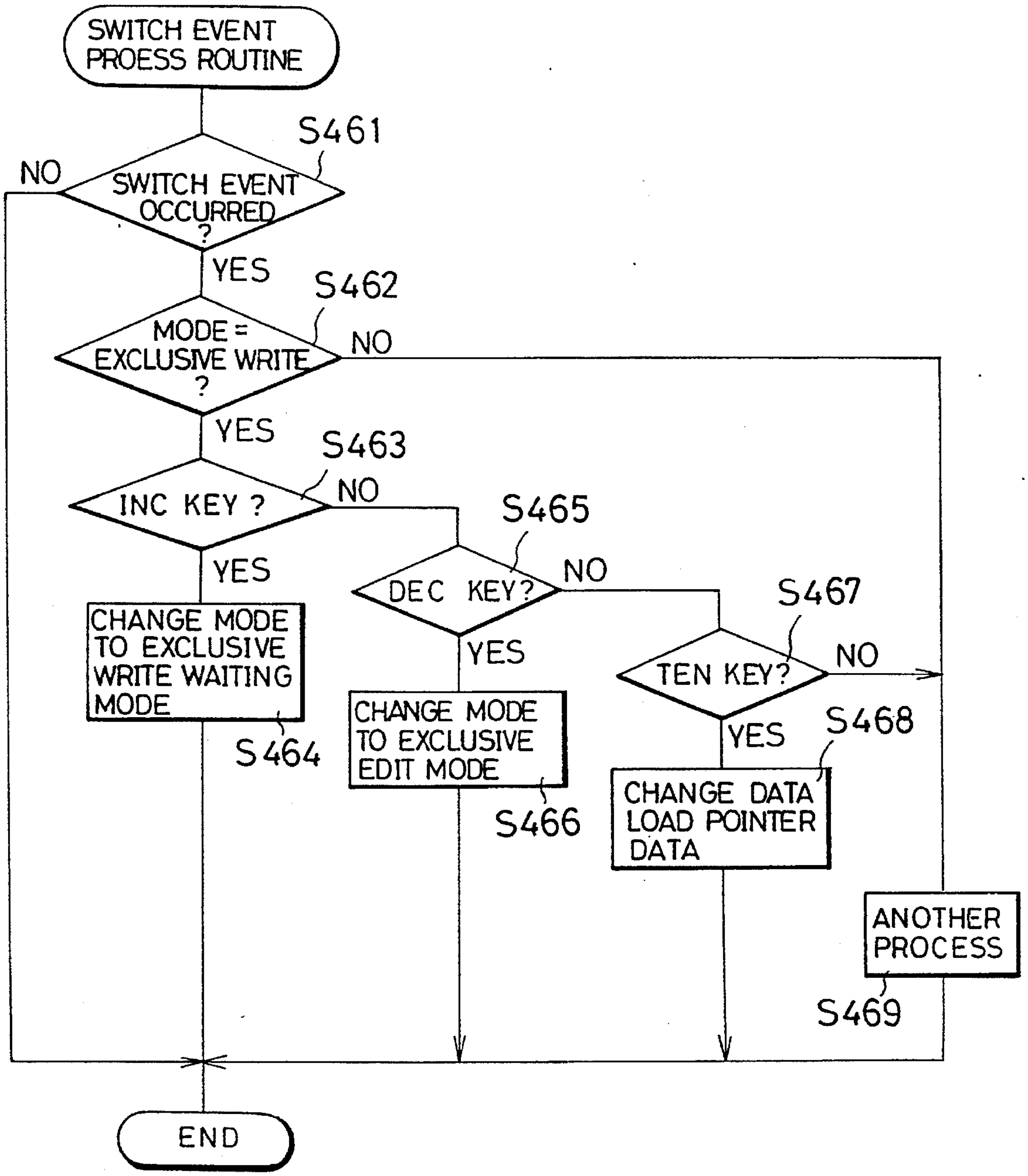
FIG. 46 is a flowchart illustrating an exclusive edit process (write process 2)

FIG. 46 shows a routine for an exclusive edit process (write process 2) where the contents of the data load pointer are changed.

Figure 47:
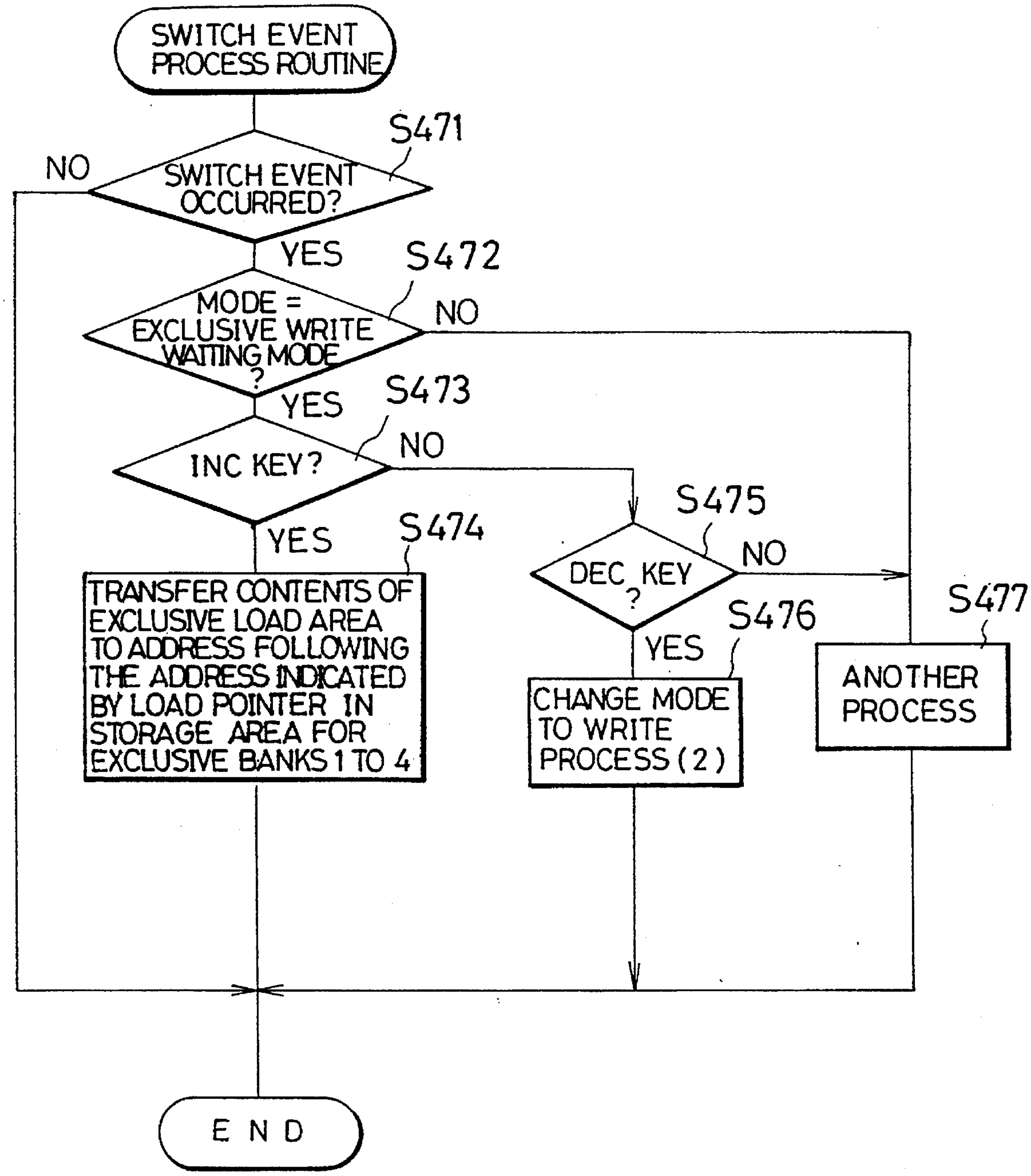
FIG. 47 is a flowchart illustrating an exclusive edit process (write process 3)

FIG. 47 shows a routine for an exclusive edit process (write process 3) where the contents of the exclusive load area are transferred to storage areas for exclusive banks 1 to 4. The transfer destination is determined by the data load pointer.

Figure 48:
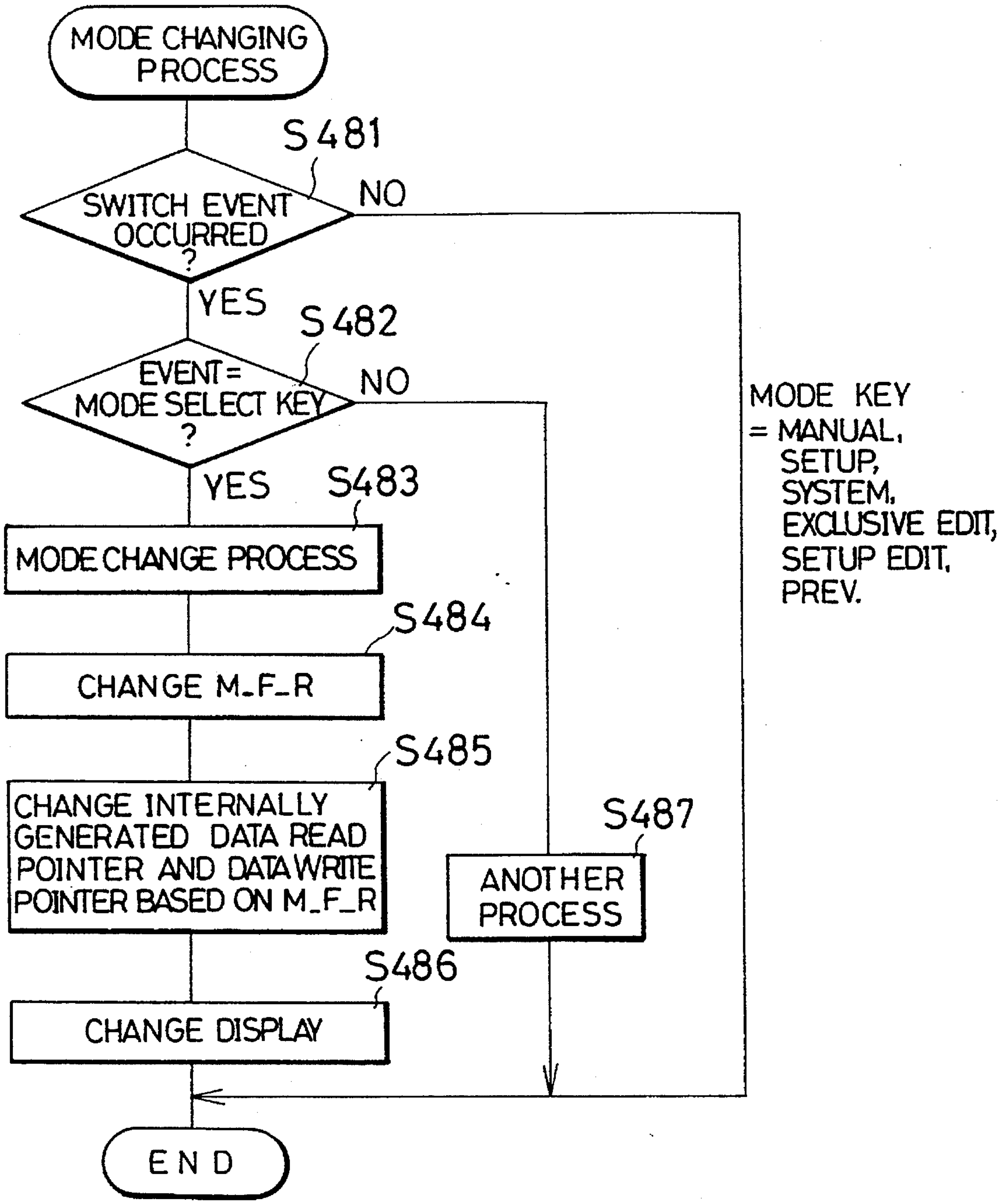
FIG. 48 is a flowchart presenting the schematic illustration of a mode changing process.

FIG. 48 presents a schematic flow of a mode change process. That is, it illustrates a general process for changing an M_F_R and changing the mode.

FIG. 49 shows a routine for an exclusive fader (Ex. Fader) process.

(1) First Embodiment

First, before executing the setup function of this invention, the SETUP EDIT key of the mode select key 28 is depressed to effect the setup edit mode. Then, the following parameters are set and are written in a plurality of (64) patches in the setup storage area of the data memory 7.

① Values (0 to 127) of the volume and master volume for 16 channels, and distinction of transmission or non-transmission ② Program change numbers for 16 channels. There may not be any.

③ Fader ON/OFF information

④ Patch name

Examples of the use of this setup edit function will be described.

Figure 50A:
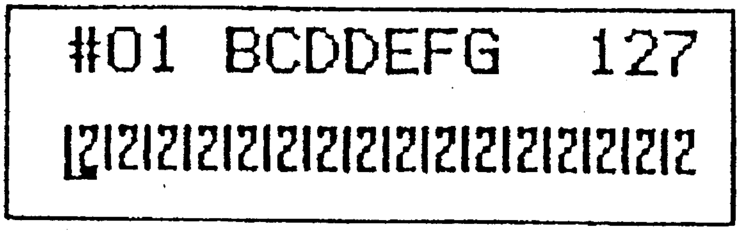
FIG. 50A is a diagram exemplifying a screen display when the setup edit is executed.
Figure 50B:
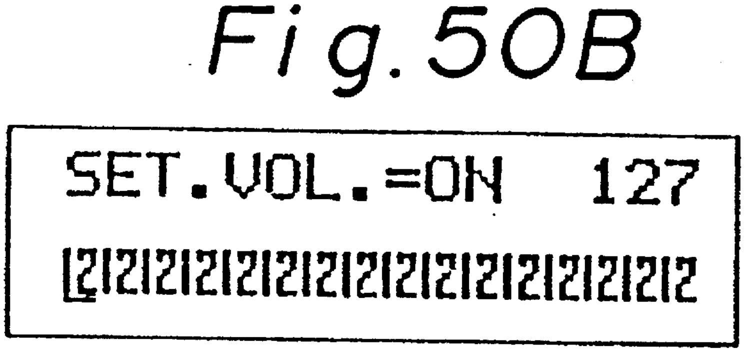
FIG. 50B is a diagram exemplifying a screen display when the setup edit is executed.
Figure 50C:
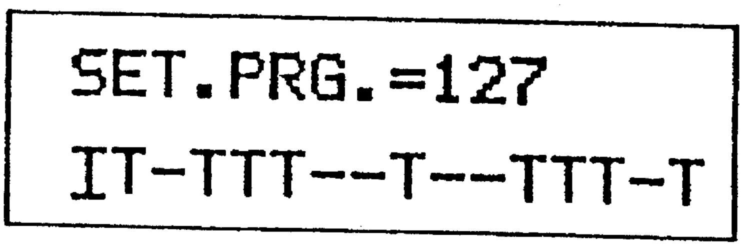
FIG. 50C is a diagram exemplifying a screen display when the setup edit is executed.

First, in setup edit mode, a screen shown in FIG. 50A is displayed on the display 22. In this condition, when a patch number and, a patch name (BCDDEFG) are changed, the fader is operated to set a predetermined value to each channel, and the SETUP EDIT switch is operated; the screen changes to the set volume screen shown in FIG. 50B. Here, the volume of each channel is set. Then, the SETUP EDIT switch is operated to change the screen to the one shown in FIG. 50C and a program change number is sent for timbre selection.

Figure 50D:
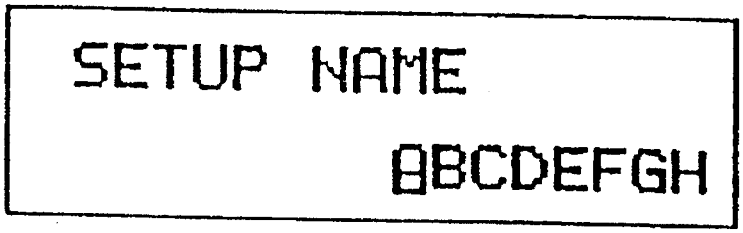
FIG. 50D is a diagram exemplifying a screen display when the setup edit is executed.

The screen may be changed to the one shown in FIG. 50D to set the name of a setup patch.

After the above patch production is completed, when the patch number where the above data has been written is input, that patch is called and the volumes and program change numbers for 16 channels are simultaneously output from this electronic musical instrument control apparatus.

At this time, it is possible to disregard the movement of the fader so that moving the fader will not change the setting.

The setup function of the present invention is accomplished as follows. When the SETUP switch of the mode select key 28 is pressed, this electronic musical instrument control apparatus enters the setup mode and the display 22 gives a display as shown in FIG. 64.

Figure 64:
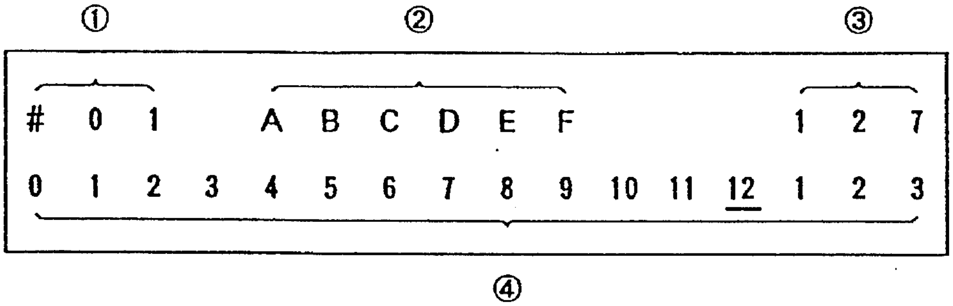
FIG. 64 is a diagram exemplifying a setup screen in the first embodiment.

In FIG. 64, ① is the patch number, ② is the patch name, ③ is the volume value of the channel at the cursor position, and ④ indicates brief values of the volumes of the individual channels.

The details of this setup process will be described referring to the flowchart in FIG. 23.

In this setup process, first, it is checked whether or not there is a switch event (step S2301), and when it is determined that a switch event has occurred, it is then checked if the current mode is the setup mode (step S2302).

When it is determined that the mode is the setup mode, it is checked if the setup number (Setup No.) is to be designated (step S2303). When it is determined that the setup number is to be designated, i.e., designation of the setup number is input from the ten keys 26, it is checked whether or not input data has been established (step S2304).

When it is determined that the input data has been established, the established data is written in the current program buffer C_P_B, the data load pointer is altered based on that value, and the setup data in the setup storage area indicated by the data load pointer is transferred to the setup data load area (step S2305).

Then, the data (volume value) of the preset volume buffer P_V_B is loaded into the fader data buffer F_D_B (step S2306). Positional data of the faders 1 to 17 is stored in the preset volume buffer P_V_B, and this data is transferred to the fader data buffer F_D_B which also stores positional data of the faders 1 to 17. Then, the master volume value is multiplied by the value of each channel of the fader data buffer F_D_B, and the result is loaded into the volume data buffer V_D_B (step S2307).

Subsequently, the program send (PROGRAM SEND) process routine (see FIG. 24) is called (step S2308). In this program send process routine, messages (for 16 channels) of a program change in a MIDI format are prepared.

First, a counter pointer is initialized to zero (step S241). The contents of the counter pointer are used as a channel number in the following process.

Then, the data in the preset program buffer P_P_B is read out (step S242). Stored in this preset program buffer P_P_B is program change data.

Then, it is checked if the most significant bit MSB of the read data is "1" (step S243). When it is determined that the most significant bit MSB is "0, " which means that program change data is to be sent, a message of a program change, which has a status with the counter pointer value as a channel number (ch NO) and the contents of the present program buffer P_P_B as a program number, is prepared and written in the internal event buffer IB (step S244).

Subsequently, the counter pointer is incremented (step S245), and it is checked if the contents of the counter pointer are "16" (step S246). When it determined that the counter pointer has not reached "16" yet, the flow returns to step S242, and the same operation is repeated until the counter pointer becomes "16."

When it is determined through the repeated execution of the above process that the counter pointer has become "16," which means that a program change message whose program change data has the MSB of "0" has been prepared in the internal event buffer IB, then the flow returns from this program send process routine to step S2309 in the setup process routine (FIG. 23).

Then it is checked whether or not the MSB of the fader ON/OFF flag F_OF_F is "0" (step S2309). The MSB of the fader ON/OFF flag F_OF_F is a flag to instruct prohibition of the volume transmission in setup read mode, and indicates transmission prohibition when "1." When the MSB of the F_OF_F is determined to be "1," therefore, the flow returns from this setup process routine without executing further processes.

When the MSB of the F_OF_F is determined to be "0," on the other hand, which means that the transmission is allowed, "1" is written to the entire bits of an F_E_F (step S2310). The F_E_F is a flag to store if a fader event has occurred. Here it is pretended that an event has occurred in every fader.

Then, the volume fader (VOLUME FADER) process routine (see FIG. 25) is called (step S2311). In this volume fader process routine, messages (for 16 channels) of a control change to alter the volume value are prepared.

First, the counter pointer is initialized to zero (step S251). The contents of the counter pointer are used as a channel number in the following process.

Then, the F_E_F is shifted to the left (or right) by one bit (step S252). Then, it is checked if the carrier is "1" (step S253). If the carrier is not "1," by which it is determined that no event has occurred for the fader corresponding to this channel, the flow jumps to step S256.

If the carrier is determined to be "1," by which it is considered that an event for the fader corresponding to this channel has occurred, a value is read out from the volume data buffer V_D_B (step S254). At this time, stored in the V_D_B is a volume value computed in step S2307 in the setup process routine.

Then, a volume message (control message), which has a status with the counter pointer value as a channel number, a constant, and the contents of the V_D_B as a volume value, is prepared and written in the internal event buffer IB (step S255).

Subsequently, the counter pointer is incremented (step S256), and it is checked if the contents of the counter pointer are "16" (step S257). When it determined that the counter pointer has not reached "16" yet, the flow returns to step S252, and the same operation is repeated until the counter pointer becomes "16."

When it is determined through the repeated execution of the above process that the counter pointer has become "16,"

which means that the volume message for every channel has been prepared in the internal event buffer IB, then the flow returns from this volume fader process routine and further from the setup process.

Thereafter, the message prepared in the internal event buffer IB is sent outside by the internal MIDI event process routine (FIG. 21) to set an external device in the initial state.

A brief description will now be given of the operation of preparing a setup patch in setup edit mode although it does not directly relate to this invention.

First, when the SETUP switch of the mode select key 28 is depressed followed by entry of the desired patch number via the ten keys 26, the display 22 gives a display as shown in FIG. 64 (which illustrates the case where a patch number "01" is input).

In FIG. 64, ① is the patch number, ② is the patch name, ③ is the volume value of the channel at the cursor position, and ④ indicates brief values of the volumes of the individual channels.

Figure 65:
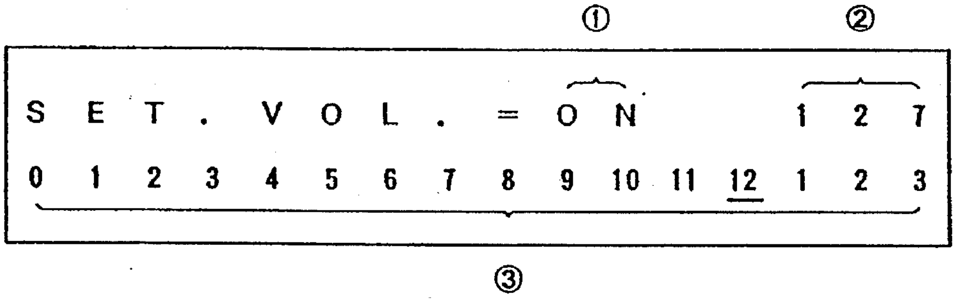
FIG. 65 is a diagram-exemplifying a setup volume edit screen in the first embodiment.

Depressing the SETUP EDIT switch in this state sets the setup volume edit mode, so that the display 22 gives a display as shown in FIG. 65.

In FIG. 65, ① indicates whether or not to send a volume value upon calling this setup patch by "ON" or "OFF," ② indicates the value of the cursor position, and ③ indicates brief values of the volumes of the individual channels.

The details of this setup volume edit process (setup setting process (1)) will be described referring to the flowchart in FIG. 28.

In this process, first, it is checked whether or not there is a switch event (step S281), and when it is determined that a switch event has occurred, it is then checked if it is a volume value transmission prohibition setting mode in setup mode (step S282). This is done by referring to the mode flag register M_F_R. When the mode is determined to be the volume value transmission prohibition setting mode, it is checked if the shift key 25 is depressed (step S283). When it is determined that the key has been depressed, it is checked if the "–NO DELETE" key has been depressed (step S284).

When it is determined that the "–NO DELETE" key has been depressed, information indicating prohibition of the transmission of the volume value is written in the fader ON/OFF flag F_OF_F (step S285). When it is determined that the "–NO DELETE" key has not been depressed, it is checked whether or not the "+YES INSERT" key has been depressed (step S286).

When it is judged that the "+YES INSERT" key has been depressed, information representing permission of the transmission of the volume value is written in the fader ON/OFF flag F_OF_F (step S285).

Through the above, information indicating prohibition or permission of the transmission of the volume value of the selected setup patch has been set.

Figure 66:
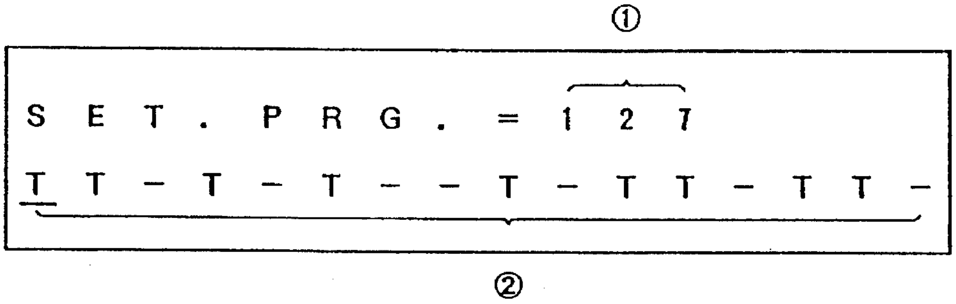
FIG. 66 is a diagram exemplifying a setup program change edit screen in the first embodiment.

Then, depressing the SETUP EDIT switch again in this state sets the setup program change edit mode, so that the display 22 presents a display as shown in FIG. 66.

In FIG. 66, ① indicates the program change number at the cursor position, and ② indicates transmission or non-transmission of program change information of each channel by "T" or "–."

The details of this setup program change edit process (setup setting process (2)) will be described referring to the flowchart in FIG. 29.

In this process, first, it is checked whether or not there is a switch event (step S2901), and when it is determined that a switch event has occurred, it is then checked if it is the setup program setting mode (step S2902). This is done by referring to the mode flag register M_F_R. When it is determined that the mode is the setup program setting mode, it is-checked if the ten key 26 is depressed (step S2903). When it is determined that the ten key 26 has been depressed, it is checked whether or not input data (program number) has been established (step S2904). When it is determined that the input data has not been established, the input data is written in the write data buffer, and the flow returns from this routine. In this case, the next ten-key input is awaited.

When the establishment of the input data is judged in the above step S2904, the established data (program number) is written at the address indicated by a data write pointer (step S2906). Accordingly, the program change data has been written in the present program buffer P_P_B. Then, the MSB of the data at the address indicated by the data write pointer or the data written in step S2906 is set to "0" (step S2910). This instructs the transmission of that data. Then, the flow returns from this routine.

When it is determined that no ten-key input is made in the above step S2903, it is checked if the "–NO DELETE" key has been pressed (step S2907). When it is determined that the "–NO DELETE" key has been depressed, the MSB of the data at the address indicated by the data write pointer is set to "1" (step S2908). This instructs the non-transmission of that data. Then, the flow returns from this routine.

When it is determined in the above step S2907 that the "–NO DELETE" key has not been depressed, it is checked if the "+YES INSERT" key has been depressed (step S2909). When it is determined that the "+YES INSERT" key has been depressed, the MSB of the data at the address indicated by the data write pointer is set to "0" as described above, instructing the transmission of that data, and then the flow returns from this routine.

Through the above, the program change number of the selected setup patch has been input and the transmission/non-transmission has been set.

Figure 67:
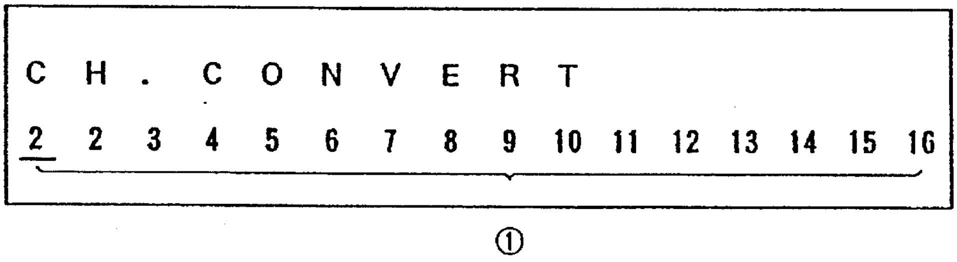
FIG. 67 is a diagram exemplifying a channel convert edit screen in the first embodiment.

Then, depressing the SETUP EDIT switch again in this state sets the channel convert edit mode, so that the display 22 presents a display as shown in FIG. 67.

In FIG. 67, ① indicates the altered channel number for each channel; for example, the input for 1 channel is to be output as 2 channel.

The details of this channel convert edit process (setup setting process (3)) will be described referring to the flowchart in FIG. 30.

In this process, first, it is checked whether or not there is a switch event (step S301), and when it is determined that a switch event has occurred, the mode flag register M_F_R_ then checked to determine if the mode is the channel convert setting mode (step S302). When it is determined that the mode is the channel convert setting mode, it is checked if the ten key 26 is depressed (step S303). When it is determined that the ten key 26 has been depressed, it is checked whether or not input data (program number) has been established (step S304). When it is determined that the input data has not been established, the input data is written in the write data buffer, and the flow returns from this routine. In this case, the next ten-key input is awaited.

When the establishment of the input data is judged in the above step S304, the established data (channel number after alteration) is written at the address indicated by a data write pointer (step S2905). Accordingly, the channel number after alteration has been written in the CH_C_T. Then, the flow returns from this routine.

When the channel convert process is completed, and the setup function is executed through the above process, data will be output to the changed channel.

Figure 68:
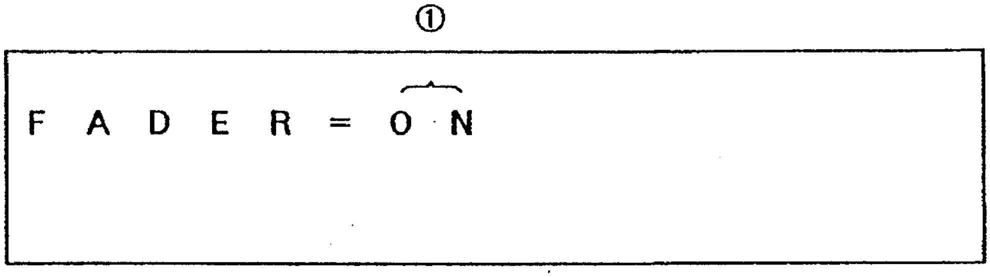
FIG. 68 is a diagram exemplifying a fader ON/OFF edit screen in the first invention.

Then, depressing the SETUP EDIT switch again in this state sets the fader ON/OFF edit mode, so that the display 22 presents a display as shown in FIG. 68.

In FIG. 68, ① indicates by "ON/OFF" whether the fader is to be valid or invalid when the setup patch is called.

The details of this fader ON/OFF edit process (setup setting process (4)) will be described referring to the flowchart in FIG. 31.

In this process, first, it is checked whether or not there is a switch event (step S311), and when it is determined that a switch event has occurred, the mode flag register M_F_R_ is then checked to determine if the mode is a mode to set the fade valid/invalid in the setup mode (step S312). When the mode is determined to be the one for setting the fader valid/invalid, it is checked if the "–NO DELETE" key has been depressed (step S313). When it is determined that the "–NO DELETE" key has been depressed, information about, the fader being invalid is written in the fader ON/OFF flag F_OF_F (step S314). Then, the flow returns from this routine.

When it is determined in the above step S313 that the "–NO DELETE" key has not been depressed, it is checked whether or not the "+YES INSERT", key has been depressed (step S315). When it is judged that the "+YES INSERT" key has been depressed, information about the fader being valid is written in the fader ON/OFF flag (step S314). Then, the flow returns from this routine.

When the fader ON/OFF edit process is completed, and the setup function is executed through the above-process, the fader valid/invalid function will work.

When the WRITE key 24 is depressed in the above-described setup edit mode, a setup data memory writing process to write the data set above into the setup storage area in the RAM 7 is executed.

Figure 69:
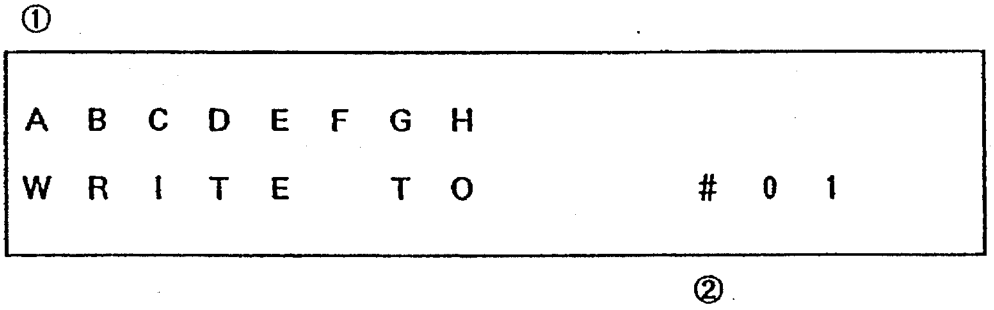
FIG. 69 is a diagram exemplifying a setup write screen in the first embodiment.

That is, depressing the WRITE key 24 presents a display as shown in FIG. 69. In FIG. 69, ① indicates the name of a patch to be written, and ② indicates the patch number of the writing designation.

The details of this setup data memory writing process will be described referring to the flowchart in FIG. 33.

In this setup process, first, it is checked whether or not there is a switch event (step S331), and when it is determined that a switch event has occurred, it is then checked if the mode is the setup setting mode (step S332). This is done by referring to the mode flag register M_F_R. When the mode is determined to be the setup setting mode, it is checked if the WRITE key 24 is depressed (step S333). When it is determined that the depression of the WRITE key 24 has occurred, the mode is changed to a setup writing preparation mode (step S334). This is a process to set the corresponding bit of the mode flag register M_F_R.

Then, the address of the writing destination based on a current program buffer C_P_B is written in the data load pointer (step S335), and then, the flow returns from this routine. The current program buffer C_P_B stores the setup number that is currently being loaded. The address in the setup storage area where the associated setup number is stored is calculated from the contents of this C_P_B.

Depressing the "+YES INSERT" key or "–NO DELETE" key in this condition initiates writing or stops writing. The details of this process will be described referring to the flowchart in FIG. 34.

In this setup process, first, it is checked whether or not there is a switch event (step S3401), and when it is determined that a switch event has occurred, it is then checked if the mode is the setup writing preparing mode (step S3402). This is done by referring to the mode flag register M_F_R.

Figure 70:
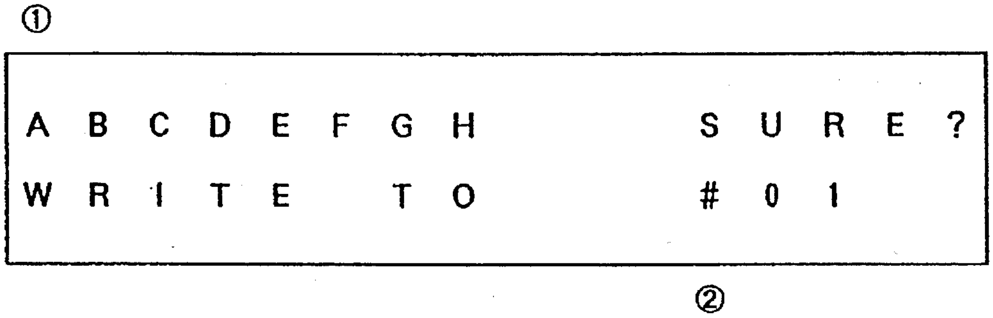
FIG. 70 is a diagram showing another example of the setup write screen in the first invention embodiment.

When the mode is determined to be the setup writing preparing mode, it is checked if the "+YES INSERT" key has been depressed (step S3403). When the "+YES INSERT" key is depressed, the display 22 displays what is shown in FIG. 70 to caution the operator. When it is determined that the "+YES INSERT" key has been depressed, all the setup data of the setup data load area (temporary) is transferred to above the address of the data load pointer (step S3404). Then, the flow returns from this routine. This completes the writing of the setup data into the memory.

When it is determined in step S3403 that the "+YES INSERT" key has not been depressed, it is checked if the "–NO DELETE" key has been depressed (step S3405). When it is determined that the "–NO DELETE" key has been depressed, the mode is changed to the setup setting mode (step S3406), and the flow returns from this routine. As a result, the state returns to before the WRITE key 24 had been depressed.

When it is determined in the above step S3405 that the "–NO DELETE" key has not been depressed, it is checked whether or not the ten key 26 is depressed (step S3407). When it is judged that depression of the ten key 26 has occurred, it is recognized as an alteration of the patch number, and the current program buffer C±P_B is changed to a value corresponding to the ten-key input (step S3408). Then, the address of the writing destination based on the current program buffer C_P_B is written in the data load pointer (step S3409), and then, the flow returns from this routine.

The above completes the process in setup edit mode.

(2) Second Embodiment

When MIDI data is received at the input terminal IN1, a reception interrupt signal to the CPU 5 is generated. The process for this reception interrupt is illustrated in the routine for the MIDI reception interrupt 0 process in FIG. 5.

First, it is Checked if the received data is a real time message (step S51). This judgment is made by checking the status (first byte) of the received data, when it is determined that the received data is not a real time message, this data is stored in the receive buffer RB0 (step S52), and then, the flow returns from this process routine.

When it is determined that the received data is a real time message, on the other hand, it is then checked if a real time separate flag is on (step S53). If this flag is on, a transmission process to the output terminal OUT2 is executed (step S55), and then, the flow returns from this process routine.

If the real time separate flag is not on, a transmission process to the output terminal OUT1 (step S54) and a transmission process to the output terminal OUT2 (step S55) are executed, and then, the flow returns from this process routine.

That is, in this routine, it is only determined if the received message is a real time message, and if it is a real time message, this process is terminated after transmission processes to the output terminals OUT1 and OUT2 are executed. If it is not a real time message, the process is terminated after the received message is stored in the receive buffer RB0.

Likewise, when MIDI data is received at the input terminal IN2, a reception interrupt signal to the CPU 5 is generated. The process for this reception interrupt is illustrated in the routine for the MIDI reception interrupt 1 process in FIG. 6.

First, it is checked if the received data is a real time message (step S61). This judgment is made by checking the status (first byte) of the received data. When it is determined that the received data is not a real time message, this data is stored in the receive buffer R_B_1 (step S62), and then, the flow returns from this process routine. When it is determined that the received data is a real time message, on the other hand, the flow returns from this process routine without executing further processing.

In other words, in this routine, it is only determined if the received message is a real time message, and if it is a real time message, this process is terminated without executing any process. If it is not a real time message, the process is terminated after the received message is stored in the receive buffer RB1.

Through the above operation, the external MIDI data has been stored in the receive buffers RB0 and R_B_1.

Independent of the above operation, the timer 11 generates an interrupt signal to the CPU 5 at a given interval. Upon generation of this interrupt, the received data (RB0, R_B_1) process routine is invoked.

First, it is checked if the receive buffer RB0 is empty (Empty) (step S71 FIG. 7), and if it is not empty, the received data process subroutine (FIG. 8) is called (step S72).

Then, it is checked if the receive buffer RB1 is empty (Empty) (step S73), and if it is not empty, the received data process subroutine (FIG. 8) is called (step S74). In this manner, the receive buffers RB0 and RB1 are always monitored, and, if there is data, the received data process will be executed.

The received data is processed by the received data process subroutine shown in FIGS. 8A and 8B according to the illustrated flow. This description covers only that part which relates to this embodiment, and the other part will be explained in the sections of the associated embodiments.

First, received data is read out from the receive buffers RB0 and RB1 (step S801). Then, it is checked whether or not the received data is a status byte, or the first byte (step S802). If it is determined that the received data is a status byte, then it is checked if that data is an exclusive status (step S803); if it is not the exclusive status, the flow goes to step S807 where it is checked if the received data is a channel message or common message. If it is determined to be a channel message, the channel conversion process routine (FIG. 19) is called.

The channel conversion process routine is called when the status is other than the exclusive status and is a channel message.

In the channel conversion process, .first, it is checked whether or not channel (Ch) data included in the status matches data set in a system channel register B_C_R (step S191). If they are not the same, it is checked whether or not the channel data included in the status matches data set in the F_C_B (step S192). If they do not match each other, the channel data included in the status is replaced with data stored in the corresponding area in the CH_C_T (step S193). Then, the flow returns from this routine. An example of channel conversion is given in the following Table 1.

TABLE 1

Example of Channel Conversion

| Reception Data | CH_C_T | | Conversion Result |
|---|---|---|---|
| 90 40 40 | 02 (0) | Convert 0 to 2 | 92 40 40 |
| 91 60 7F | 01 (1) | Convert 1 to 1 | 91 60 7F |
| 92 3C 5E | 00 (2) | Convert 2 to 0 | 90 3C 5E |
| . | . | . | . |
| . | . | . | . |
| . | . | . | . |

As should be understood from the above, no channel conversion process will be carried out when the channel specified by the video signal matches the system channel of this electronic musical instrument control apparatus and matches the channel (set in F±C_B) which is set as the target for channel control.

When the above channel conversion process is completed, the flow returns to step S809 in the received data process subroutine to store the converted received data into a status buffer (MB±RS). Then, the flow returns from this routine.

As described above, according to this invention, this electronic musical instrument control apparatus intervenes between the generator side of MIDI information and the receiver side of the MIDI information to execute channel conversion while transferring a MIDI signal, permitting the sender side of MIDI information to be collectively associated with the individual channels of the receiver side of the MIDI information to facilitate environmental setting.

(3) Third Embodiment

The following are the separating method and modes for setting associated parameters (indicated by "[ ]") at the time of using the MIDI information separating function of an electronic musical instrument control apparatus according to this invention.

① Off

② MIDI channel [output destination for every channel (1, 2 and 1+2 are not output)]

③ Odd note number/even note number [On/Off for every channel]

④ Magnitude of note number [output destination (1, 2) for boundary value and greater value, and On/Off for every channel]

⑤ Magnitude of velocity [output destination (1, 2) for boundary value and greater value, and On/Off for every channel]

⑥ Channel message, exclusive message/real time message, and system common message With the above structure, the type and value of input MIDI information are discriminated, the MIDI information is separated and is output to the respective output terminal OUT1 or OUT2 on the basis of the selected separation information and the set parameter.

Figure 51:
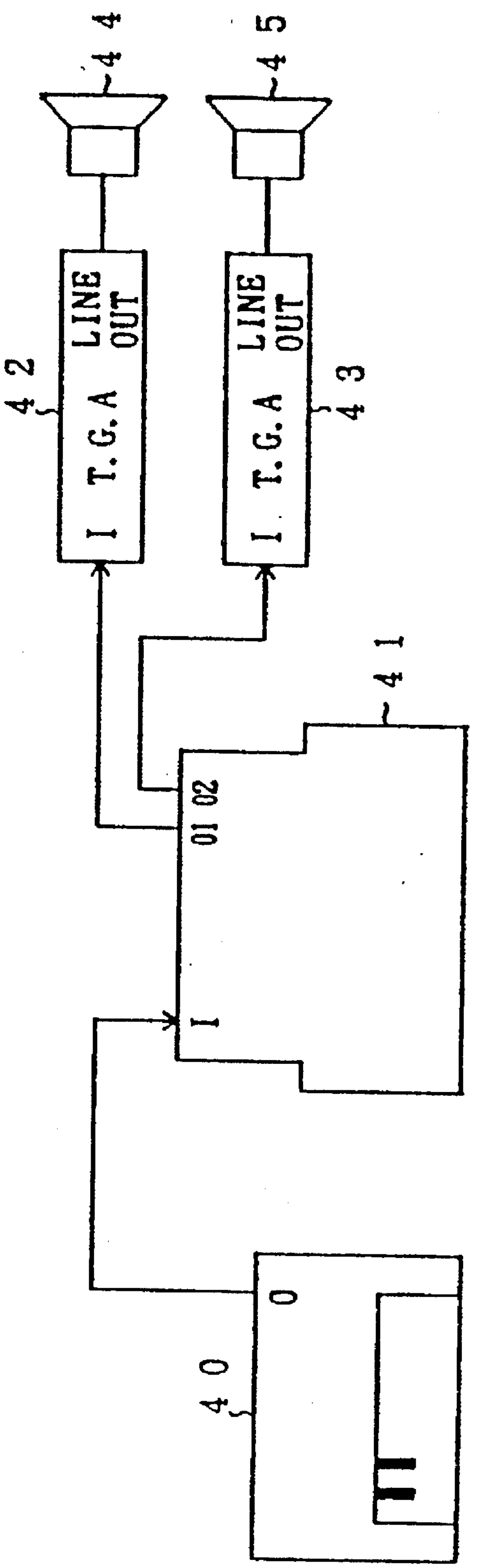
FIG. 51 is a diagram showing a first example of connection of this electronic musical instrument control apparatus at the time of separating MIDI information in the third to seventh embodiments.

FIG. 51 illustrates a first example of connection of this electronic musical instrument control apparatus.

In the diagram, reference numeral "40" is a synthesizer (or an electronic piano or the like), "41" is an electronic musical instrument control apparatus, "42" and "43" are tone generators, and "44" and "45" are loudspeakers.

With this connection, when the mode ① is set, the tone generators 42 and 43 generate musical tones in the same manner. When the mode ③ is set and the set MIDI channel is set on, musical tones of keys whose key numbers are odd numbers will be output from the tone generator 42 while the musical tones of keys whose key numbers are even numbers will be output from the tone generator 43.

With the mode, ④ set and the boundary value being C3 to above which the tone generator is assigned, when the switch of the MIDI channel is set on, musical ones below C3 (note No.=00 to 3BH) will be output from the tone generator 42, and those equal to or greater than C3 (note No.=3C to 7FH) from the tone generator 43.

Figure 52:
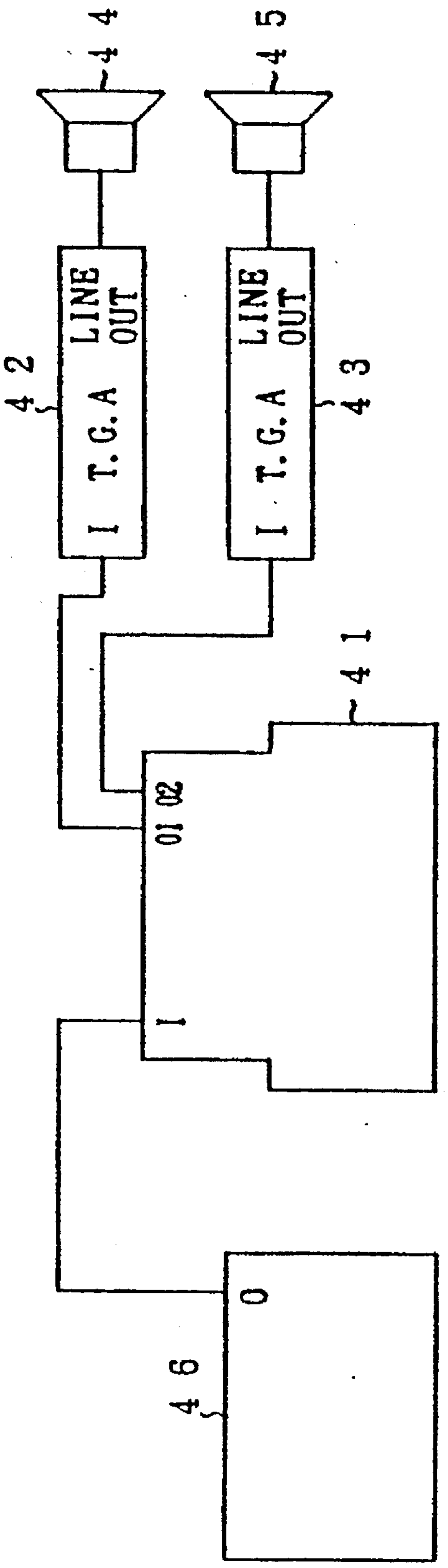
FIG. 52 is a diagram showing a second example of connection of this electronic musical instrument control apparatus at the time of separating MIDI information in the third to seventh embodiments.

FIG. 52 illustrates a second example of connection of this electronic musical instrument control apparatus.

In FIG. 52, a sequencer (or a personal computer or the like) 46 is connected in place of a synthesizer (or an electronic piano or the like).

In this connection, when the mode ② is set, the output of a channel corresponding to the tone generator 42 is "1" and the outputs of the other channels are all "2," musical tones whose output destination is assigned to "1' will be generated from the tone generator 42, and musical tones whose output destination is assigned to "2" will be generated from the tone generator 43.

It is also possible to send a channel output to the tone generators 42 and 43 channel by channel or not to send both outputs.

When music data is in the tone generator 43 and one wants to synchronize the playing of that music with performance by the sequencer (or personal computer, or the like) 46, setting the mode ⑥ causes play information of the sequencer (or personal computer or the like) 46 to be output from the tone generator 42 and causes information such as a clock to be output from the tone generator 43.

While the above has briefly explained the functions of this electronic musical instrument control apparatus, this embodiment corresponds to the mode ②. The details of this embodiment will be discussed below.

(a) Setting of separating method (setting a separate menu)

To execute the channel separate function of this invention, the separating method is set first. When the separating method is set, the corresponding bit of a separate flag SP_F is set to "1." This SP_F is a 1-byte flag register. Table 2 below shows the correlation between the separating methods and the individual bits of the SP_F.

TABLE 2

| | | Contents of SP_F | | | | | | | |
|---|---|---|---|---|---|---|---|---|---|
| Separating method | Bit | 7 | 6 | 5 | 4 | 3 | 2 | 1 | 0 |
| Not separated (OFF) | | 0 | 0 | 0 | 0 | 0 | 0 | 0 | 0 |
| CHANNEL SEPARATE | | 0 | 0 | 0 | 0 | 0 | 0 | 0 | 1 |
| ODD/EVEN SEPARATE | | 0 | 0 | 0 | 0 | 0 | 0 | 1 | 0 |
| NOTE NO. SEPARATE | | 0 | 0 | 0 | 0 | 0 | 1 | 0 | 0 |
| VELOCITY SEPARATE | | 0 | 0 | 0 | 0 | 1 | 0 | 0 | 0 |
| REAL TIME SEPARATE | | 0 | 0 | 0 | 1 | 0 | 0 | 0 | 0 |

Figure 71:
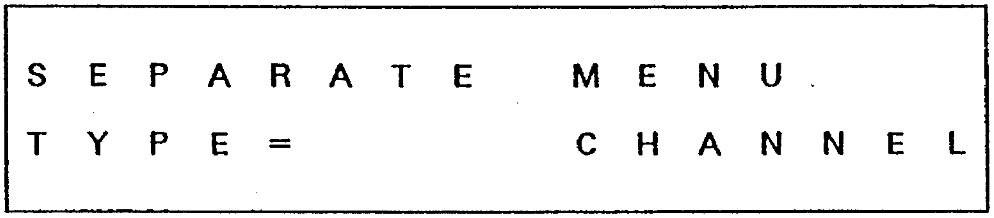
FIG. 71 is a diagram exemplifying a channel separate screen in the third embodiment.

FIG. 71 shows an example of a display on the display 22 indicating that the channel separate is set.

(b) Setting separating conditions

Separating conditions with different parameter are set to the respective separating methods. The separating conditions are written in O_P_R1 and O_P_R2.

O_P_R1 and O_P_R2 are each 2-byte registers for which each bit corresponds to a MIDI channel. When a predetermined one bit of the O_P_R1 is "1," a message of the MIDI channel corresponding to that bit will not be output from the MIDI output terminal OUT1. Likewise, when a predetermined one bit of the O_P_R2 is "1," a message of the MIDI channel corresponding to that bit will not be output from the MIDI output terminal OUT2.

Figures 72, 73, 74, 75:
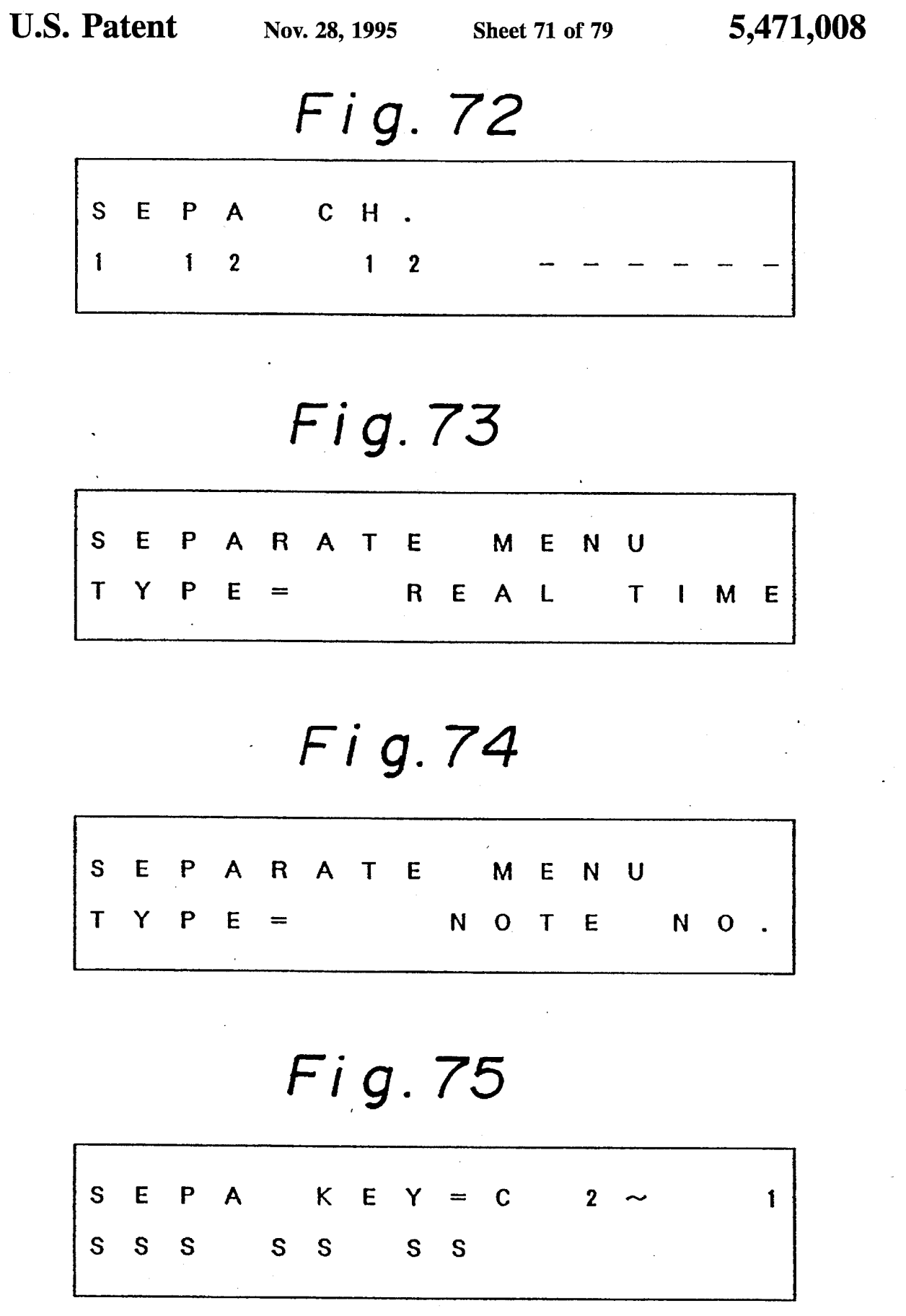

FIG. 72 illustrates one example of the setting of separating conditions. The contents of the O_P_R1 and O_P_R2 in the example in FIG. 72 are shown in Table 3 below.

TABLE 3

| MIDI channel (bit No.) | MSB 1 | 2 | 3 | 4 | 5 | 6 | 7 | 8 | 9 | 10 | 11 | 12 | 13 | 14 | 15 | LSB 16 |
|---|---|---|---|---|---|---|---|---|---|---|---|---|---|---|---|---|
| Contents of O_P_R1 | 0 | 0 | 0 | 1 | 0 | 0 | 1 | 0 | 0 | 1 | 1 | 1 | 1 | 1 | 1 | 1 |
| Contents of O_P_R2 | 1 | 0 | 1 | 0 | 0 | 1 | 0 | 0 | 0 | 1 | 1 | 1 | 1 | 1 | 1 | 1 |

(c) MIDI signal processing

The flow of processing a MIDI signal will be described referring to FIGS. 5 to 10, 14 and 21.

A MIDI message input to the MIDI input terminal IN1 is processed according to the MIDI reception interrupt 0 process flow in FIG. 5. As the details of this process have been discussed in the section of the second embodiment, its description will not be given here.

A MIDI message input to the MIDI input terminal IN2 is processed according to the MIDI reception interrupt 1 process flow in FIG. 6. As the details of this process also have been given in the section of the second embodiment, its description will not be given here.

The MIDI reception interrupts 0 and 1 cause received data to be processed for each byte.

The received data stored in the receive buffers RB0 and RB1 are processed by the received data process interrupt routine shown in FIG. 7. In this routine, when the received data is present in the RB0 or RB1, the process is terminated after calling the received data process subroutine shown in FIG. 8. As the detailed discussion of this received data process subroutine has been given in the section of the second embodiment, it will not be given here.

The received data process interrupt routine and received data process subroutine each perform a process byte-by byte.

The following will describe the process in the case where a note-ON message is stored in the RB0. The note-ON message consists of three bytes as follows.

"$90_H$, $40_H$, $7F_H$" . . . M1

The first byte is a status byte whose upper four bits represents the type of the message and lower four bits represents the number of the MIDI channel (9=Note On, 0 =channel, 0 indicating the first channel).

The second byte represents the note number.

The third byte represents the velocity.

The received data process subroutine reads out the received data from the RB0 (step S801), and checks if it is a status byte (step S802). When it is determined that the data is the status byte, step S809 is performed after execution of steps S803 and S807. That is, the status is stored in the status buffer in the MB. When the received message M1 has already been stored, "$90_H$" is to be stored. Through the above operation, the flow returns from this subroutine.

When the received data process subroutine is called again after the above operation is completed, "$40_H$" is read out in step S801, and step S810 is carried out after execution of step S802. That is, "$40_H$" is to be stored in the data buffer (MB).

Then, it is checked if the message of the MB has been completed (step S811), and if it is not Completed, the flow returns from this subroutine. In this example, the message only up to "$90_H$, $40_H$" has been stored and not finished yet, so the process is terminated and the flow returns.

When received data process subroutine is called again after the above operation is completed, "$7F_H$" is read out in step S801, and step S810 is carried out after execution of step S802. That is, "$7F_H$" is to be stored in the data buffer (MB).

Then, it is checked if the message of the MB has been completed (step S811), and if it is not completed, the flow returns from this subroutine. In this example, up to "$90_H$, $40_H$, $7F_H$" has been stored and the message is completed, so the flow advances to step S812.

In step S812, it is checked if the message is note-ON. In this case, "$90_H$" is the status of a note-ON message, so a mode judging process in step S813 is executed. When it is determined that the mode is a channel separate mode, the processes of steps S814, S815 and S816 will not be executed, and the flow advances to step S817.

Then, the contents of the MB are transferred to the PTB. In this case, three bytes, "$90_H$, $40_H$, $7F_H$," are transferred. Then, it is checked if the status byte is a program change ($Cn_H$) (step S818). In this case, if it is not in the status of a program change, a separate flag judging process is to be executed (step S820). That is, the SP_F is checked. In this case, since the SP_F is "$01_H$," a channel separate process routine (FIG. 14) is called (step S821).

The channel separate process will be described referring to the flowchart in FIG. 14.

In the channel separate process, first, it is checked if the message is a common message (step S141). In this case, it is not a common message, so the flow advances to step S142 where it is checked if the bit in the O_P_R1 corresponding to the channel included in the message is "1." In this example, since the bit of the O_P_R1 is "0" as shown in Table 3, a TBO_OP subroutine is called (step S143). This TBO_OP subroutine is to store one message in a transmission buffer TB0 as shown in FIG. 8; execution of this step S143 transfers all the data stored in the PTB to the TB0.

Then, it is checked if the bit in the O_P_R2 corresponding to the channel included in the message is "1." In this example, since the bit of the O_P_R2 is "1" as shown in Table 3, a TB1_OP subroutine is not called, or the data in the PTB is not written in the TB1, and the flow returns from this routine.

Through the above process, the flow returns from the channel separate process routine and also from the received data process subroutine, thereby terminating the channel separate process.

The data written in the TB0 and TB1 are output via the MIDI output terminals OUT1 and OUT2 to an external device by the MIDI transmission interrupt 0 (FIG. 9) and MIDI transmission interrupt 1 (FIG. 10), respectively.

The MIDI transmission interrupt 0 routine is invoked by an interrupt generated when transmission of one message is completed, and checks if there is data in the TB0 (step S91), and, if data is present, outputs the data via a transmission port 0 (I/O port 10) to the output terminal OUT1 (step S92).

The MIDI transmission interrupt 1 routine is invoked by an interrupt generated when transmission of one message is completed, and checks if there is data in the TB1 (step S101), and, if data is present, outputs the data via a transmission port 1 (I/O port 10) to the output terminal OUT2 (step S102).

As described above, this invention can perform such control as to execute separate output from the output terminal 1, output terminal 2 or output terminals 1 and 2 channel by channel by arbitrarily setting the O_P_R1 and O_P_R2, thereby providing the environment much desired by a player or suitable for the tone generator, and accomplishing the use of such environment and tone generator.

(4) Fourth Embodiment

This invention relates to that portion corresponding to the mode ⑥ described in the section of the third embodiment. The details of this embodiment will be given below. In this embodiment, when the bit 4 of the SP_R is "1," the channel message and system message in the input MIDI information are output from the output terminal OUT1, and the other (system common message, real time message, etc.) from the output terminal OUT2.

(a) Setting of separating method (setting a separate menu)

To execute the real time separate function of this invention, the separating method is set first. The details of this setting have already been given in the section of the third embodiment, they will not be repeated here.

FIG. 73 shows an example of a display on the display 22 indicating that the real time separate is set. The real time separate process in the example shown in FIG. 73 will be described.

(b) Setting of separating conditions

No separating conditions are set for this separation. In other words, if the upper fourth bit of the SP_F is set (see Table 2), automatically, a channel message and a system message are output from the output terminal OUT1, and the others (system common message, real time message, etc.) are output from the output terminal OUT2.

(c) MIDI signal processing

The flow of processing a MIDI signal will be described referring to FIGS. 5 to 10, and 18.

A MIDI message input to the MIDI input terminal IN1 is processed according to the MIDI reception interrupt 0 process flow in FIG. 5. That is, in this routine, it is only determined if the received message is a real time message, and if it is the real time message, it is checked if the bit 4 of the SP_F is "1," and if that bit is not "1," this process is terminated after transmission processes to the output terminals OUT1 and OUT2 are executed. If the bit 4 of the SP_F is "1," the process is terminated after a transmission process only to the output terminal OUT2 is executed.

The MIDI message input to the MIDI input terminal IN2 is processed along the MIDI reception interrupt 1 process flow in FIG. 6. In other words, in this process routine, it is only determined if the received message is a real time message, and if it is the real time message, this process is terminated without executing any process. If it is not a real time message, the process is terminated after the received message is stored in the RB1.

The MIDI reception interrupts 0 and 1 cause received data to be processed for each byte.

The received data stored in the receive buffers RB0 and RB1 are processed by the received data process interrupt routine shown in FIG. 7. In this routine, when the received data is present in the RB0 or RB1, the process is terminated after calling the received data process subroutine shown in FIG. 8. As the detailed discussion of this received data process subroutine has been given in the section of the second embodiment, it will not be given here. The received data process interrupt routine and received data process subroutine each perform a process byte by byte.

The following will describe the process in the case where a note-ON message or a system common message is stored in the RB0. The note-ON message is one of channel messages, and consists of three bytes as indicated by M1 in the third embodiment.

The system common message consists of three bytes as follows.

"$F2_H$, $40_H$, $7F_H$" . . . M2

The first byte indicates the function of the message, and the following two bytes are parameters about that function.

The reception data process subroutine (FIGS. 8A and 8B) causes the status of received data to be stored in a status buffer in the MB, as already explained in the section of the third embodiment. If the above reception message M1 has been stored, "$90_H$" is stored, and then the flow returns from this subroutine.

When the reception data process subroutine is called again after the above operation is completed, the second byte of the received data, i.e., "$40_H$" is stored in the data buffer in the MB, which has also already been explained in the section of the third embodiment. Since only "$90_H$, $40_H$" are stored in this case, the message is judged to be incomplete, and the flow returns from this subroutine.

When the reception data process subroutine is called again after the above operation is completed, the third byte of the received data, i.e., "$7F_H$" is stored in the data buffer in the MB. Since "$90_H$, $40_H$, $7F_H$" are stored in this case, the message is judged to be complete, and the flow advances to step $812.

Through the same steps as described-in the third embodiment after step S812, the flow moves to judgment of a separate flag (step S820). In other words, a separate flag SP_F is checked. Since the SP_F is "$10_H$" in this case, the real time separate process routine (FIG. 18) is called (step S825).

The real time separate process will be described referring to the flowchart in FIG. 18.

In the real time separate process, first, it is checked if the message is a system common message (step S181). In this case, it is not a system common message (it is a channel message), so TB0_OP is called (step S183). In other words, all the data (one message) stored in the PTB is written to the transmission buffer TB0.

The data written to the TB0 is output to an external device from the MIDI output terminal OUT1 by the MIDI transmission interrupt 0 (FIG. 9).

Next, the operation in the case where received data is a system common message M2 will now be explained. In this case, the real time separate process routine (FIG. 18) is also called through the same steps as described above; however, this case differs from the above-description with respect to calling the TB1_OP in this routine. In other words, by calling the TB1_OP in step S182, all the data (one message) stored in-the PTB is written to the transmission buffer TB1.

The data written to the TB1 is output to the external device from the MIDI output terminal OUT.2 by the MIDI transmission interrupt 1 (FIG. 10).

As described above, the channel message directly affecting tone generation is output from the first output terminal, and other messages are output from the second output terminal so as to cope with the specifications of many devices.

Further, an environment or a use that the player desires or that is proper for a tone generator can be provided by the above-described separated outputs.

(5) Fifth Embodiment

This embodiment relates to that portion corresponding to the mode ④ described in the section of the third embodiment. The details of this embodiment will be given below. In this embodiment, when the bit 2 of the SP_R is "1," MIDI information is output from the output terminal OUT1 or OUT2 according to the note number included in the received MIDI information.

(a) Setting of separating method (setting a separate menu)

To execute the note number separate function of this invention, the separating method is set first. The details of this setting have already been given in the section of the third embodiment, they will not be given here.

FIG. 74 shows an example of a display on the display 22 indicating that the note number separate is set. The note number separate process in the example shown in FIG. 74 will be described.

(b) Setting of separating conditions

In this separation, the separating conditions are written in O_P_R4, SPL_P_F and N_N_B.

O_P_R4 is a 2-byte register for which each bit corresponds to a MIDI channel. When a predetermined one bit of the O_P_R4 is "1," a message of the MIDI channel corresponding to that bit will be output from the MIDI output terminals OUT1 and OUT2. When a predetermined one bit of the O_P_R4 is "1" and a message of the MIDI channel corresponding to that bit is note-ON, note-OFF or channel key pressure, the note number is determined according to the separating conditions and the message will be output only from the MIDI output terminal OUT2 or OUT1.

N_N_B is a 1-byte register where the threshold value of the note number is written. The note number of the MIDI message is compared with the contents of the N_N_B and the output terminal OUT1 or OUT2 is determined according to the comparison result and the contents of the SPL_P_F.

SPL_P_F is a 1-byte register, and only its LSB is used. When the LSB is "1" and the note number of the MIDI message is equal to or greater than the threshold value, that message is output from the output terminal OUT1. When the LSB is "0" and the note number of the MIDI message is equal to or greater than the threshold value, that message is output from the output terminal OUT2.

FIG. 75 illustrates one example of the setting of separating conditions. The example in FIG. 75 indicates that note numbers equal to C2 or above are to be output from the output terminal OUT1 and the other note numbers are to be output from the output terminal OUT2. "S" indicates that this note number separate function is applied to this channel, and is not applied to a blank channel. In the latter case, MIDI information will be output from both the output terminals OUT1 and OUT2.

The contents of the O_P_R4 in the example in FIG. 75 are shown in Table 4, indicating that this note separate is applied to the channels 1, 2, 3, 5, 6, 8 and 9. The contents of the N_N_B are given in Table 5, showing that the note number C2 ($30_H$ corresponding to C2) is a branching point. The contents of the SPL_P_F are given in Table 6, showing that when the note number is equal to or greater than the contents of the N_N_B, information is output from the output terminal OUT1.

TABLE 4

| MIDI channel (bit No.) | MSB 1 | 2 | 3 | 4 | 5 | 6 | 7 | 8 | 9 | 10 | 11 | 12 | 13 | 14 | 15 | LSB 16 |
|---|---|---|---|---|---|---|---|---|---|---|---|---|---|---|---|---|
| Contents of O_P_R4 | 0 | 0 | 0 | 1 | 0 | 0 | 1 | 0 | 0 | 1 | 1 | 1 | 1 | 1 | 1 | 1 |

TABLE 5

| | MSB | | | | | | | LSB | |
|---|---|---|---|---|---|---|---|---|---|
| Contents of N_N_B | 0 | 0 | 1 | 1 | 0 | 0 | 0 | 0 | ($30_H$) |

TABLE 6

| | MSB | | | | | | | LSB |
|---|---|---|---|---|---|---|---|---|
| Contents of SPL_P_F | * | * | * | * | * | * | * | 1 |

(c) MIDI signal processing

The flow of processing a MIDI signal will be described referring to FIGS. 5 to 10 and 16.

As described above, a MIDI message input to the MIDI input terminal IN1 is processed according to the MIDI reception interrupt 0 process flow in FIG. 5, while a MIDI message input to the MIDI input terminal IN2 is processed along the MIDI reception interrupt 1 process flow in FIG. 6, and the received data are stored respectively in the RB0 and RB1.

The received data stored in the RB0 and RB1 are processed in the received data process interrupt routine in FIG. 7, which has been also described above.

The following will describe the process in the case where a note-ON message is stored in the RB0. The note-ON message indicated by M1 in the section of the third embodiment is used as an example.

The reception data process subroutine (FIGS. 8A and 8B) causes the status of received data to be stored in a status buffer in the MB, as already explained in the section of the third embodiment. If the above reception message M1 has been stored, "$90_H$" is stored, and then the flow returns from this subroutine.

When the reception data process subroutine is called again after the above operation is completed, the second byte of the received data, i.e., "$40_H$" is stored in the data buffer in the MB, which has also already been explained in the section of the third embodiment. Since only "$90_H$, $40_H$" are stored in this case, the message is judged to be incomplete, and the flow returns from this subroutine.

When the reception data process subroutine is called again after the above operation is completed, the third byte of the received data, i.e., "$7F_H$" is stored in the data buffer in the MB. Since "$90_H$, $40_H$, $7F_H$" are stored in this case, the message is judged to be complete, and the flow advances to step S812.

Through the same steps as described in the third invention after step S812, the flow moves to judgment of a separate flag (step S820). In other words, a separate flag SP_F is checked. Since the SP_F is "$04_H$" in this case, the note number separate process routine (FIG. 16) is called (step S823).

Next, the note number separate process will be described referring to the flowchart in FIG. 16.

In the note number separate process, first of all it is checked if a message is the one having a note number (note ON, note OFF or polyphonic key pressure) (step S160). Since the message in this example is a note 0N message having a note number, checking the O_P_R4 is performed (step S162). In other words, it is determined whether or not a bit of the O_P_R4 corresponding to the channel number of the message is "0." Since the status byte of data stored in the PTB in this case is "$90_H$," it is checked whether or not the bit 1 of the O_P_R4 is "0" (see Table 4).

When the bit 1 of the O_P_R4 is judged as "0," it is determined if the LSB of the SPL_P_F is "0" (step S163). As this example shows "1," the flow branches to step S167 where it is determined if the note number is smaller than the content of the N_N_B (step S167). If the note number is smaller than the content of the N_N_B, the TP0_OP is called (step S168), and if not, the TP1_OP is called (Step S169). As the content of the N_N_B in the example is "$30_H$" and the note number of the message M1 is "$40_H$," TB1_OP is called in step S169, and then the flow returns from this routine.

In the TB1_OP, all the data (one message) stored in the PTB is written to the transmission buffer TB1.

The data written to the TB1 is output to an external device from the MIDI output terminal OUT2 by the MIDI transmission interrupt 1 (FIG. 10).

When the LSB of the SPL_P_F is judged as "0" in step S163, it is determined whether or not the note number is equal to or greater than the content of the N_N_B (step S164), and if that note number is equal to or greater than the content of the N_N_B, the TPO_OP is called (step S165), while, if not, the TP1_OP is called (step S166).

As described above, according to this invention, the output destination can be selected by the magnitude of the note number so as to generate a musical one using atone generator the player desires, or to generate a musical tone adequate for a tone generator.

Further, an environment or a use that the player desires or that is proper for a tone generator can be provided by the above-described separated outputs.

(6) Sixth Embodiment

This invention relates to that portion corresponding to the mode ③ described in the section of the third embodiment. The details of this embodiment will be given below. In this embodiment, when the bit 1 of the SP_R is "1," MIDI information is output from the output terminal OUT1 or OUT2 according to whether a note number included in the received MIDI information is an odd number or even number (a) Setting of separating method (setting a separate menu)

To execute the odd/even separate function of this invention, the separating method is set first. The details of this setting have already been given in the section of the third embodiment, they will not be given here.

Figures 76, 77, 78, 79:
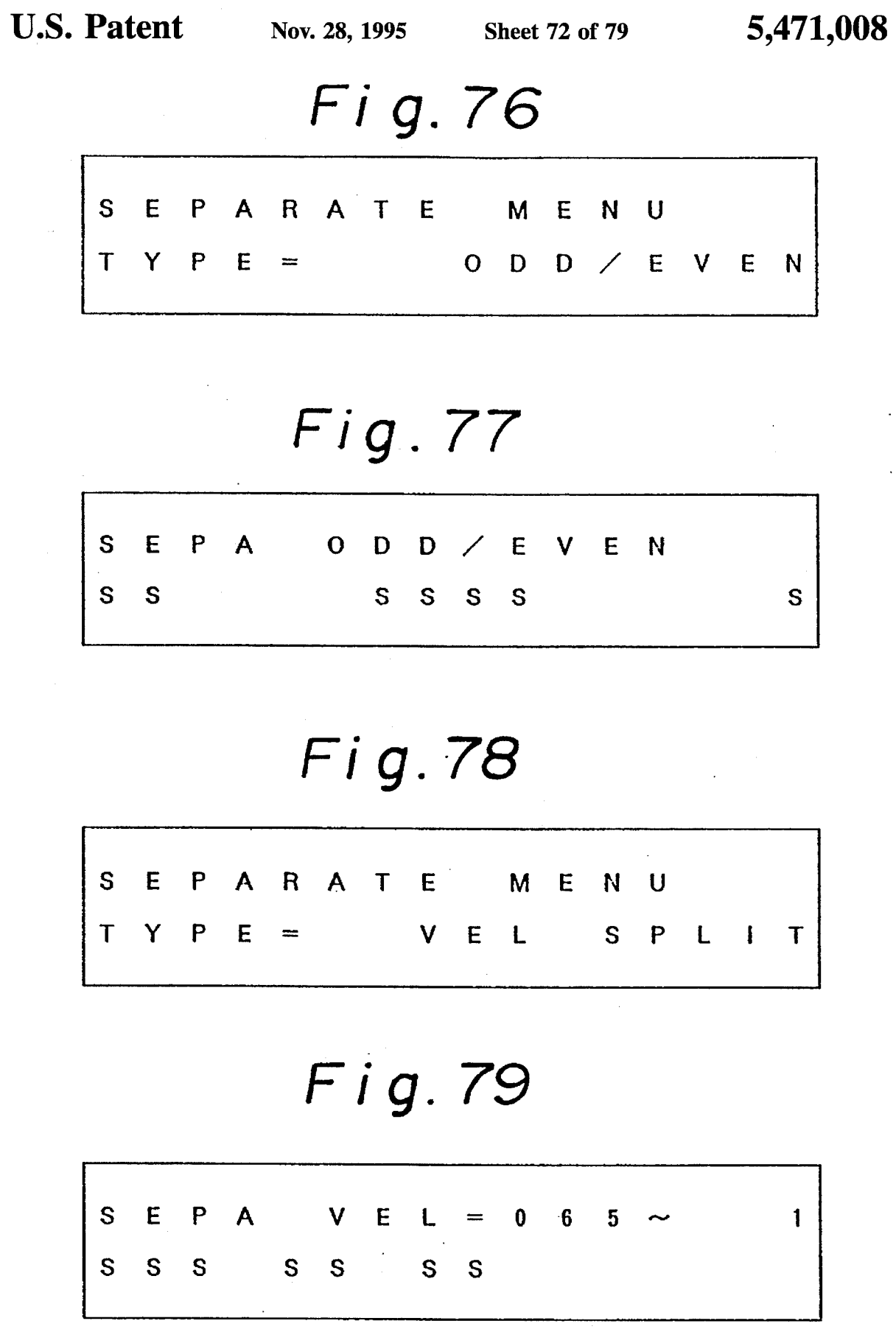

FIG. 76 shows an example of a display on the display 22 indicating that the odd/even separate is set. The odd/even separate process in the example shown in FIG. 76 will be described.

(b) Setting of separating conditions

In this separation, the separating conditions are written in

O_P_R3. The O_P_R3 is a 2-byte register for which each bit corresponds to a MIDI channel. When a predetermined one bit of the O_P_R3 is "1," a message of the MIDI channel corresponding to that bit will be output from both MIDI output terminals OUT1 and OUT2. When a predetermined bit of the O_P_R3 is "0[ and a message of the MIDI channel corresponding to that bit is note-ON or note-OFF, the message will be output from the MIDI output terminal OUT2 or OUT1 according to whether the note number is an odd number or even number.

FIG. 77 illustrates one example of the setting of separating conditions. In the example in FIG. 77, "S" indicates that this odd/even separate function is applied to this channel, and is not applied to a blank channel. In the latter case, MIDI information will be output from both the output terminals OUT1 and OUT2.

The contents of the O_P_R3 in the example in FIG. 75 are shown in Table 7, indicating that this odd/even separate is applied to the channels 1, 2, 7, 8, 9, 10 and 16.

SP_F is checked. Since the SP_F is "$02_H$" in this case, the odd/even separate process routine (FIG. 15) is called (step S823).

Next, the odd/even separate process will be described referring to the flowchart in FIG. 15.

In the odd/even separate process, first of all it is checked if a message is note-ON (step S151) or polyphonic key pressure (step S152). Since the message in this example is note-ON message, checking the O_P_R3 is performed (step S153). In other words, it is determined whether or not a bit of the O_P_R3 corresponding to a channel number of the message is "0." Since the status byte of data stored in the PTB in this case is "$90_H$," it is checked whether or not the bit 1 of the O_P_R3 is "0 " (see Table 7).

When the bit 1 of the O_P_R3 is judged as "0," it is determined if the note number in the message M1 is an odd number (Odd) (step S154). When the note number is judged as an odd number, the TBO_OP is called (step S155), and when the note number is judged as an even number, the

TABLE 7

| MIDI channel (bit No.) | MSB 1 | 2 | 3 | 4 | 5 | 6 | 7 | 8 | 9 | 10 | 11 | 12 | 13 | 14 | 15 | LSB 16 |
|---|---|---|---|---|---|---|---|---|---|---|---|---|---|---|---|---|
| Contents of O_P_R3 | 0 | 0 | 1 | 1 | 1 | 1 | 0 | 0 | 0 | 0 | 1 | 1 | 1 | 1 | 1 | 0 |

(c) MIDI signal processing

The flow of processing a MIDI signal will be described referring to FIGS. 5 to 10 and 15.

As described above, a MIDI message input to the MIDI input terminal IN1 is processed according to the MIDI reception interrupt 0 process flow in FIG. 5, while a MIDI message input to the MIDI input terminal IN2 is processed along the MIDI reception interrupt 1 process flow in FIG. 6, and the received data are stored respectively in the RB0 and RB1.

The received data stored in the RB0 and RB1 are processed in the received data process interrupt routine in FIG. 7, which has also been described above.

The following will describe the process in the case where a note-ON message is stored in the RB0. The note-0N message indicated by M1 in the section of the third embodiment is used as an example.

The reception data process subroutine (FIG. 8) causes the status of received data to be stored in a status buffer in the MB, as already explained in the section of the third embodiment. If the above reception message M1 has been stored, "$90_H$" is stored, and then the flow returns from this subroutine.

When the reception data process subroutine is called again after the above operation is completed, the second byte of the received data, i.e., "$40_H$" is stored in the data buffer in the MB, which has also already been explained in the section of the third embodiment. Since only "$90_H$, $40_H$" are stored in this case, the message is judged to be incomplete, and the flow returns from this subroutine.

When the reception data process subroutine is called again after the above operation is completed, the third byte of the received data, i.e., "$7F_H$" is stored in the data buffer in the MB. Since "$90_H$, $40_H$, $7F_H$" are stored in this case, the message is judged to be complete, and the flow advances to step S812.

Through the same steps as described in the third embodiment after step S812, the flow moves to judgment of a separate flag (step S820). In other words, a separate flag TB1_OP is called (Step S156). Then, the flow returns from this process routine.

In this example, the note number of the message M1 is "$40_H$," i.e., an even number, the TB1_OP routine is called. In the TB1_OP, all the data (one message) stored in the PTB is written to the transmission buffer TB1. The data written to the TB1 is output to an external device from the MIDI output terminal OUT2 by the MIDI transmission interrupt 1 (FIG. 10).

As described above, according to this invention, the output destination can be selected according to whether the note number is an odd number or even number, so that the number of simultaneously generated tones can artificially be increased and a player can play an electronic musical instrument as if he or she was playing, for example, an acoustic piano.

Further, an environment or a use that the player desires or that is proper for a tone generator can be provided by the above-described separated outputs.

(7) Seventh Invention

This embodiment relates to that portion corresponding to the mode ⑤ described in the section of the third embodiment. The details of this invention will be given below. In this embodiment, when the bit 3 of the SP_R is "1," MIDI information is output from the output terminal OUT1 or OUT2 according to a velocity included in the received MIDI information.

(a) Setting of separating method (setting a separate menu)

To execute the velocity separate function of this embodiment, the separating method is set first. As the details of this setting has already been given in the section of the third embodiment, they will not be given here.

FIG. 78 shows an example of a display on the display 22 indicating that the velocity separate is set. The velocity separate process in the example shown in FIG. 78 will be described.

(b) Setting of separating conditions

In this separation, the separating conditions are written in O_P_R5, SPL_P_F and velocity buffer V_B.

O_P_R5 is a 2-byte register for which each bit corresponds to a MIDI channel. When a predetermined one bit of the O_P_R5 is "1," a message of the MIDI channel corresponding to that bit will be output from the MIDI output terminals OUT1 and OUT2. When a predetermined one bit of the O_P_R5 is "0" and a message of the MIDI channel corresponding to that bit is note-ON, the velocity is determined according to the separating conditions and the message will be output only from the MIDI output terminal OUT2 or OUT1.

The V_B is a 1-byte register where the threshold value of the velocity is written. The contents of the V_B is compared with the velocity in the MIDI message, and the output terminal OUT1 or OUT2 where the MIDI message is output is determined according to the comparison result and the contents of the SPL_P_F.

SPL_P_F is a 1-byte register, and only its MSB is used. In other words, when the MSB is "1" and the velocity of the MIDI message is equal to or greater than the threshold value, that message is output from the output terminal OUT1, and when that velocity is smaller than the threshold value, the message is output from the output terminal OUT2. When the MSB is "0" and the velocity of the MIDI message is equal to or greater than the threshold value, that message is output from the output terminal OUT2, and when the velocity is smaller than the threshold value, the message is output from the output terminal OUT1.

Assigner input numbers, note numbers and MIDI channels of the output note-ON message are stored in an assigner. An assigner memory is provided in the work memory 6.

When a note-OFF message is input, referring to the assigner, it is determined from which output terminal the note number and the note-ON message corresponding to the note-OFF message is output from the MIDI channel, and that note-OFF message is output from the output terminal where the corresponding note-ON message is output.

If there is no empty entry in the assigner when the note-ON message is input, the note-ON message having the smallest assigner input number (the oldest stored note-ON message) is erased and a corresponding note-OFF message is output.

FIG. 77 illustrates one example of the setting of separating conditions. The example in FIG. 77 indicates that velocity "065" or above are to be output from the output terminal OUT1 and the others are to be output from the output terminal OUT2. "S" indicates that this velocity separate function is applied to this channel, and is not applied to a blank channel. In the latter case, MIDI information will be output from both the output terminals OUT1 and OUT2.

The contents of the O_P_R5 in the example in FIG. 77 are shown in Table 8, indicating that this velocity separate is applied to the channels 1, 2, 3, 5, 6, 8 and 9. The contents of the V_B are given in Table 9, showing that the velocity "065" ($41_H$) is a branching point. The contents of the SPL_P_F are given in Table 10, showing that when the velocity in the message is equal to or greater than the contents of the V_B, information is output from the output terminal OUT1.

TABLE 8

| MIDI channel (bit No.) | MSB 1 | 2 | 3 | 4 | 5 | 6 | 7 | 8 | 9 | 10 | 11 | 12 | 13 | 14 | 15 | LSB 16 |
|---|---|---|---|---|---|---|---|---|---|---|---|---|---|---|---|---|
| Contents of O_P_R5 | 0 | 0 | 0 | 1 | 0 | 0 | 1 | 0 | 0 | 1 | 1 | 1 | 1 | 1 | 1 | 1 |

TABLE 9

| | MSB | | | | | | | LSB | |
|---|---|---|---|---|---|---|---|---|---|
| Contents of V_B | 0 | 1 | 0 | 0 | 0 | 0 | 0 | 1 | (65). |

TABLE 10

| | MSB | | | | | | | LSB |
|---|---|---|---|---|---|---|---|---|
| Contents of SPL_P_F | 1 | * | * | * | * | * | * | * |

One example of the assigner is shown in Table 11 below. Table 11 shows that the current assign number is $3F_H$, and only one entry "$40_H$" is remained empty.

TABLE 11

| Assigner MAX INPUT NO. = $3F_H$ | | | | |
|---|---|---|---|---|
| ASSIGN NO. | OUT | MIDI CH. | NOTE NO. | INPUT NO. |
| $1_H$ | 0 | $9_H$ | $50_H$ | $5_H$ |
| $2_H$ | 1 | $1_H$ | $30_H$ | $1_H$ |
| $3_H$ | 0 | $3_H$ | $26_H$ | $6_H$ |
| . | . | . | . | . |
| . | . | . | . | . |
| . | . | . | . | . |
| $40_H$ | — | — | — | — |

(c) MIDI signal processing

The flow of processing a MIDI signal will be described referring to FIGS. 5 to 10, 17A, and 17B.

As described above, a MIDI message input to the MIDI input terminal IN1 is processed according to the MIDI reception interrupt 0 process flow in FIG. 5, while a MIDI message input to the MIDI input terminal IN2 is processed along the MIDI reception interrupt 1 process flow in FIG. 6, and the received data are stored respectively in the RB0 and RB1.

The received data stored in the RB0 and RB1 are processed in the received data process interrupt routine in FIG. 7, which has been also described above.

The following will describe the process in the case where a note-ON message is stored in the RB0. The note-ON message indicated by M1 in the section of the third embodiment is used as an example.

The reception data process subroutine (FIGS. 8A and 8B) causes the status of received data to be stored in a status buffer in the MB, as already explained in the section of the third embodiment. If the above reception message M1 has been stored, "$90_H$" is stored, and then the flow returns from this subroutine.

When the reception data process subroutine is called again after the above operation is completed, the second byte of the received data, i.e., "$40_H$" is stored in the data buffer in the MB, which has also already been explained in the section of the third invention. Since only "$90_H$, $40_H$" are stored in this case, the message is judged to be incomplete, and the flow returns from this subroutine.

When the reception data process subroutine is called again after the above operation is completed, the third byte of the received data, i.e., "$7F_H$" is stored in the data buffer in the MB. Since "$90_H$, $40_H$, $7F_H$" are stored in this case, the message is judged to be complete, and the flow advances to step S812.

Through the same steps as described in the third embodiment after step S812, the flow moves to judgment of a separate flag (step S820). In other words, a separate flag SP_F is checked. Since the SP_F is "$08_H$" in this case, the velocity separate process routine (FIGS. 17A and 17B) is called (step S824).

Next, the velocity separate process will be described referring to the flowchart in FIGS. 17A and 17B.

In the velocity separate process, first of all it is checked if a message is the one having a note number (note ON or note OFF) (step S1701). Since the message in this example has a note number, the flow advances to step S1702 where it is determined if the message is note-ON. When the message is judged as note ON, checking the O_P_R5 is performed (step S1703). In other words, it is determined whether or not a bit of the O_P_R5 corresponding to the channel number of the message is "1." Since the status byte of data stored in the PTB in this case is "$90_H$," it is checked whether or not the bit 1 of the O_P_R5 is "1" (see Table 8). When the bit 1 of the O_P_R5 is judged as "1," the flow branches to step S826 (FIG. 8B) and a note-ON message is output from both output terminals OUT1 and OUT2.

When the bit 1 of the O_P_R5 is not judged as "1," it is determined if the MSB of the SPL_P_F is "0" (step S1704). As this example shows "1," the flow branches to step S1706 where it is determined if the velocity in the message is smaller than the content of the V_B. If the velocity in the message is smaller than the content of the V_B, the TP1_OP is called (step S1709), and if not, the TP0_OP is called (Step S1710). As the content of the V_B in the example is "65=$41_H$" and the velocity of the message M1 is "$7F_H$," the flow branches to step S1710 where the TB0_OP is called, and then the flow branches to step S1711.

In the TB0_OP, all the data (one message) stored in the PTB is written to the transmission buffer TB0.

The data written to the TB0 is output to an external device from the MIDI output terminal OUT1 by the MIDI transmission interrupt 0 (FIG. 9).

When the MSB of the SPL_P_F is judged as "03[ in step S1704, it is determined whether or not the velocity of the message is smaller than the content of the V_B (step S1705); if that velocity is greater than the content of the V_B, the TP0_OP is called (step S1708), and if not, the TP1_OP is called (step S1707), then the flow branches to step S1711.

The following from step S1711 is an assigner process for a note-ON message. The assigner at this time is supposed to be set as shown in Table 11.

In the assigner process, it is checked first whether or not there is empty space in the assigner (step S1711). If the maximum input number (MAX INPUT NO.) is equal to the maximum assign number ("$40_H$" in an example in Table 11) after comparison, it is judged that there is no empty space in the assigner.

When it is judged that there is empty space in the assigner, the maximum input number is incremented (step S1713), and then MIDI channel number (MIDI CH.), note number (NOTE NO.) and output port (OUT) are written in the empty entry in the assigner. Then, the maximum input number is written to an input number (INPUT NO.) (step S1717), and the flow returns from this routine.

In the case of the exemplified message, "$40_H$" as a note number, "$9_H$" as a MIDI channel, "0" as an output port, and "$40_H$" as an input number are written, and the process is terminated. After the above process is completed, the assigner is updated as shown in Table 12.

TABLE 12

Assigner
MAX INPUT NO. = $40_H$

| ASSIGN NO. | OUT | MIDI CH. | NOTE NO. | INPUT NO. |
|---|---|---|---|---|
| $1_H$ | 0 | $9_H$ | $50_H$ | $5_H$ |
| $2_H$ | 1 | $1_H$ | $30_H$ | $1_H$ |
| $3_H$ | 0 | $3_H$ | $26_H$ | $6_H$ |
| . | . | . | . | . |
| . | . | . | . | . |
| . | . | . | . | . |
| $40_H$ | 0 | $0_H$ | $40_H$ | $40_H$ |

The case where a following message M3 is input at this time will now be explained. "$95_H$, $60_H$, $7F_H$ " . . . M3

Since the processes up to step S1711 in FIG. 17 are performed in the same manner as described above, they will not be explained. The maximum input number (MAX INPUT NO.) is compared with the maximum assigner number in step S1711. Since the maximum input number is equal to the maximum assigner number in this case, it is judged that the assigner has no empty space, and the flow goes to step S1712. All the input numbers (INPUT NO.) in the assigner are decremented.

As a result after the decrement, a note-OFF message, which corresponds to a note number stored in an entry having an input number of "0," is output from an output port stored in that entry (step S1714). As the input number of the ASSIGN NO. of "$2_H$" is "0" in this case, a message "$91_H$, $30_H$, $00_H$" is output from the output terminal OUT2. Accordingly, the oldest tone-ON in the assigner is erased.

Then, note number, MIDI channel number and output port of the input message are written in the same entry. In the case of the exemplified message, "$60_H$" as a note number, "$5_H$" as a MIDI channel, "0" as an output port, and "$40_H$" as an input number are written, and the process is terminated. After the above process is completed, the assigner is updated as shown in Table 13.

TABLE 13

Assigner
MAX INPUT NO. = $40_H$

| ASSIGN NO. | OUT | MIDI CH. | NOTE NO. | INPUT NO. |
|---|---|---|---|---|
| $1_H$ | 0 | $9_H$ | $50_H$ | $4_H$ |
| $2_H$ | 0 | $5_H$ | $60_H$ | $40_H$ |
| $3_H$ | 0 | $3_H$ | $26_H$ | $5_H$ |
| . | . | . | . | . |
| . | . | . | . | . |
| . | . | . | . | . |
| $40_H$ | 0 | $0_H$ | $40_H$ | $3F_H$ |

The case where a following message M4 is input at this time will now be explained.

"$90_H$, $40_H$, $00_H$ " . . . M4

Since the processes up to step S1701 in FIG. 17A are performed in the same manner as described above, they will not be explained. In step S1701, it is determined whether a message in the PTB to be processed is a message having a note number (note ON or note OFF). Since the message M4 has a note number, the flow advances to step S1702 where the message is checked to be a note-ON message. As the message M4 is a note-OFF message (a velocity value at the third byte is "0"), the flow branches to step S1718. It is then determined whether or not there exists a note-ON in the assigner which corresponds to the input note-OFF. In other words, it is checked if the same number as the channel number of the input message is present in the MIDI channel of the assigner.

In this example, since a note number corresponding to the note-OFF message M4 is stored in the entry "$40_H$" of the ASSIGN NO., it is judged that there exists the note-ON corresponding to the input note-OFF. The message M4 is therefore output from the output port recorded in that entry, i.e., the output terminal 1 (step S1719).

Erasing an assigner is then performed (step S1720). In other words, a control code indicating that the entry of the ASSIGN NO. "$40_H$" is empty is written in that entry. All input numbers in the assigner greater than the erased input number are decremented (step S1721), and further the current maximum assigner input number is decremented (step S1722). Since the input number of the ASSIGN NO. "$40_H$" is "$40_H$" and no greater assigner input number is present, the assigner input numbers in the assigner area are not changed.

(8) Eighth Embodiment

In short, this embodiment is to permit direct manipulation of the velocity of input note information. In other words, this electronic musical instrument control apparatus as a velocity manipulating apparatus processes an input MIDI signal by means of a sliding volume (fader) and outputs it.

In this invention, there are a velocity absolute for replacing the velocity of input note information with the value of the fader, and a velocity offset in which the fader value is added to the velocity of the input note information and the result is output as a new velocity.

Figure 54:
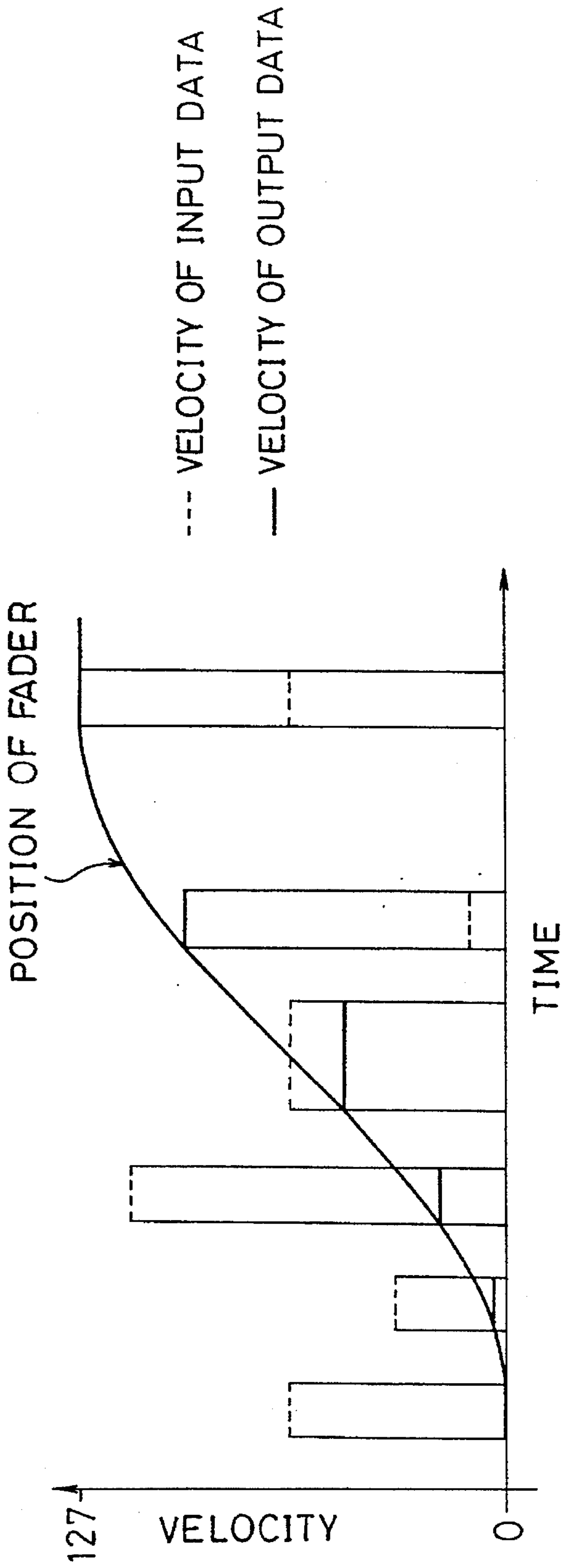
FIG. 54 is a diagram for explaining the operation of a velocity absolute in the eighth embodiments.
Figure 55:
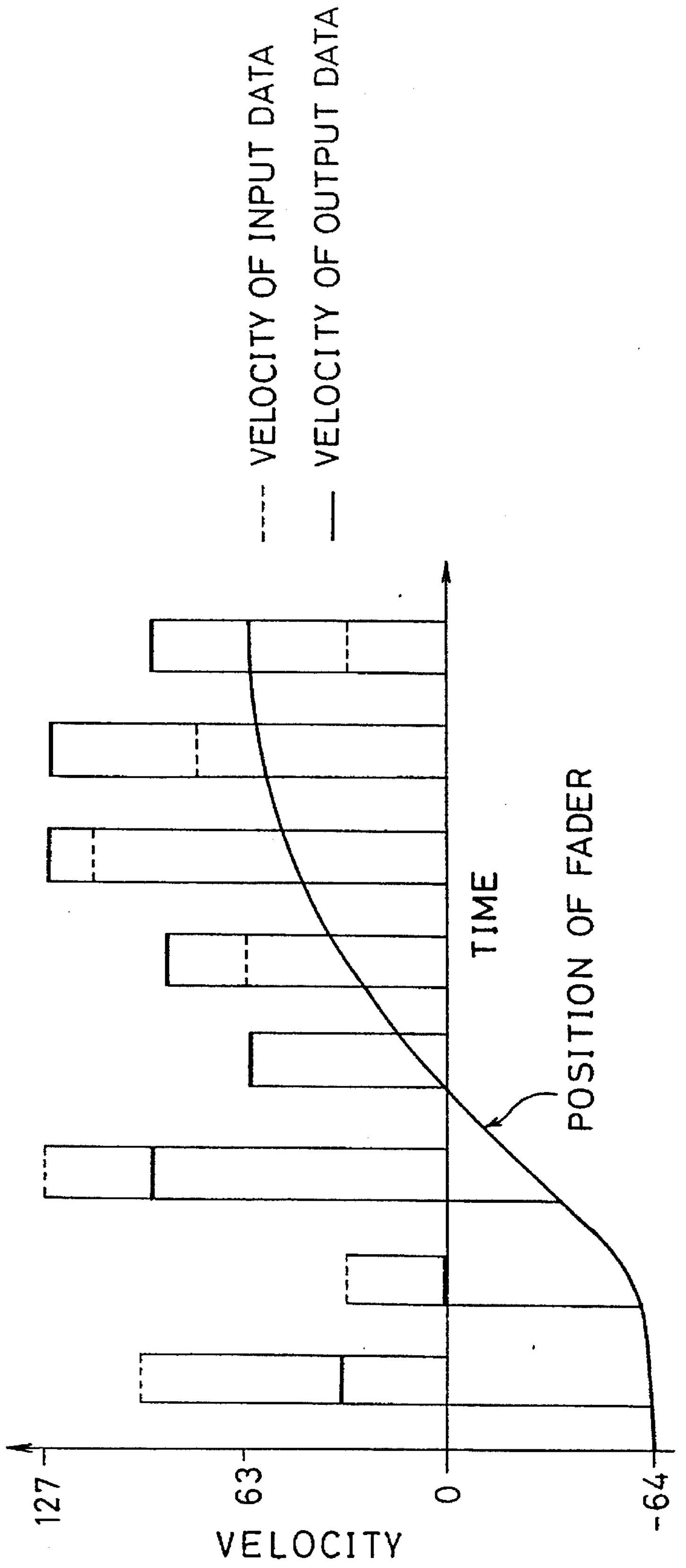
FIG. 55 is a diagram for explaining the operation of a velocity offset in the eighth embodiment.
Figure 56:
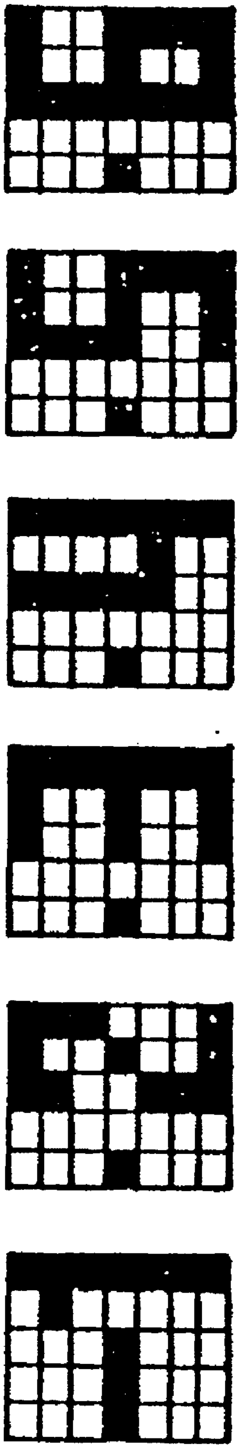
FIG. 56 is a diagram showing an example of an undesirable display in the ninth embodiment.
Figure 57:
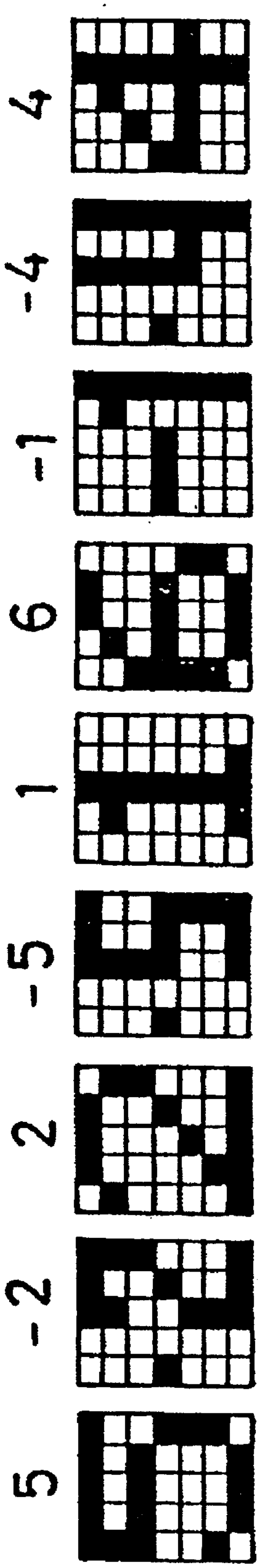
FIG. 57 is a diagram showing an example of an undesirable display in the ninth embodiment.

FIG. 54 shows an example of the velocity absolute, and FIG. 55 shows an example of the velocity offset.

In these diagrams, the vertical scale indicates the velocity and the horizontal scale the time. The broken line indicates the velocity of input data, while the solid line indicates the velocity of output data.

In the velocity absolute shown in FIG. 54, the velocity of the input note information is replaced with the velocity value corresponding to the fader position at that time.

In the velocity offset shown in FIG. 55, the values ranges from "–64" to "+63" with "0" being the center of the fader. This value is added to the velocity value of the input note information. When the result of the addition exceeds "+127," the value is set to "+127." When the result of the addition equals "0" or below, the value is set to "+1.

This embodiment of the invention will be described referring to the accompanying drawings.

Before executing the velocity manipulation in this invention, the "MANUAL" switch of the mode select key 28 is depressed. The subsequent process will be carried out according to the schematic flow of the mode changing process shown in FIG. 48. In the mode changing process routine, first, it is checked whether or not there is a switch event (step S481). When it is determined that a switch event has occurred, it is then checked if the event is from the mode select key (step S482). When it is determined that the event is from the mode select key, the mode changing process is performed (step S483), and then the M_F_R is altered (step S484). More specifically, when the mode is the velocity offset mode, the bit of the M_F_R corresponding to the velocity offset mode is set to "1" and the remaining bits are cleared to "0." When the mode is the velocity absolute mode, the bit of the M_F_R corresponding to the Velocity absolute mode is set to "1" and the remaining bits are cleared to "0." Then, a process for altering the internally generated data read pointer and data write pointer is executed (step S485). This step may be skipped depending on the function to be executed, and may be skipped in this velocity offset mode or velocity absolute mode.

Figure 80:
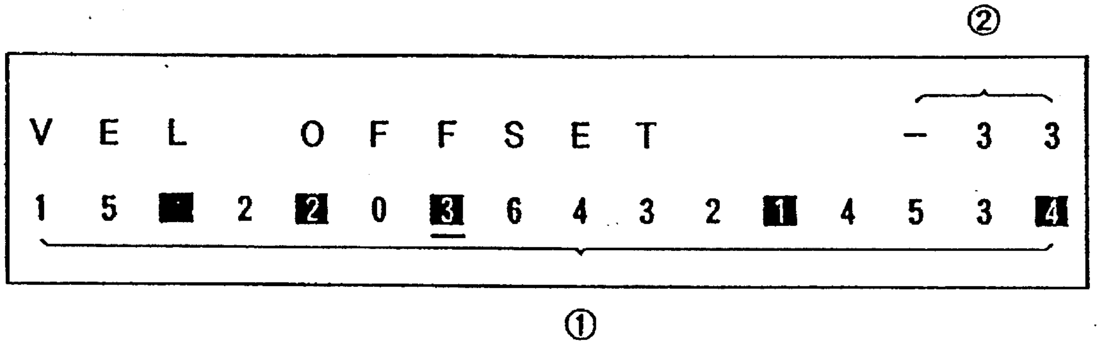
FIG. 80 is a diagram exemplifying a velocity offset screen in the eighth embodiment.

Then, a display change process is performed (step S486). More specifically, in velocity offset mode, a display shown in FIG. 80 will be presented. In FIG. 80, ① is a 16-digit numeral corresponding to 16 faders 32, schematically displaying the values of the fader 32, "–64 to 63," by the values "–6 to 6. " ② shows the fader value at the cursor position, "–64 to 63."

Figure 81:
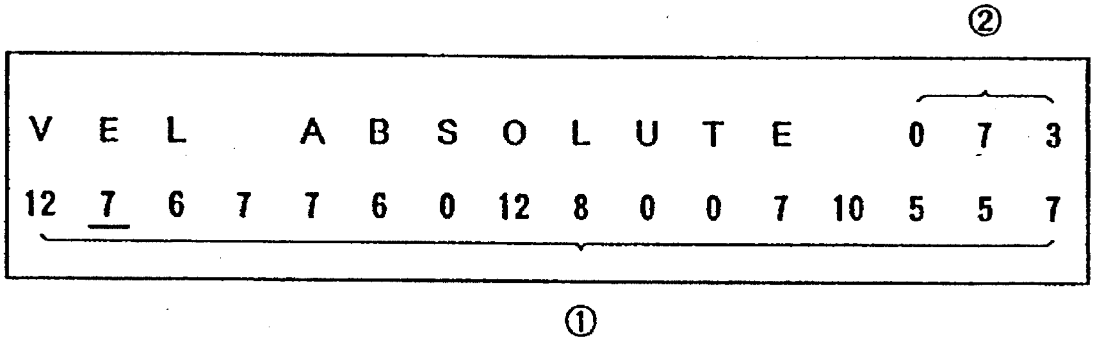
FIG. 81 is a diagram exemplifying a velocity absolute screen in the eighth embodiment.

In velocity absolute mode, a display shown in FIG. 81 will be presented. In FIG. 81, ① is a 16-digit numeral corresponding to 16 faders 32, schematically displaying the values of the fader 32, "000 to 127," by the values "0 to 12." ② shows the fader value at the cursor position, "000 to 127."

In short, this embodiment has two sets of input terminals IN1 and IN2 and output terminals OUT1 and OUT2, merges MIDI information input from the input terminal, processes the message with 16 faders 32 channel by channel, and outputs it from the output terminal after separation. As the description of the separation has already been given, it will not be given here.

The velocity offset mode is to add the fader value, "–64 to 63," to the velocity of the input note-ON message and outputs the result from the output terminal. The velocity absolute mode is to replace the velocity of the input note-ON message with the fader value, "0 to 127," and outputs the result from the output terminal.

The flow of processing a MIDI signal will be described referring to FIGS. 5 to 10, 17A, and 17B.

As described above, a MIDI message input to the MIDI input terminal IN1 is processed according to the MIDI reception interrupt 0 process flow in FIG. 5, while a MIDI message input to the MIDI input terminal IN2 is processed along the MIDI reception interrupt 1 process flow in FIG. 6, and the received data are stored respectively in the RB0 and RB1.

The received data stored in the RB0 and RB1 are processed in the received data process interrupt routine in FIG. 7, which has been also described above.

The following will describe the process in the case where a note-ON message is stored in the RB0. The note-0N message indicated by M1 in the section of the third invention is used as an example..

The reception data process subroutine (FIGS. 8A and 8B) causes the status of received data to be stored in a status buffer in the MB, as already explained in the section of the third embodiment. If the above reception message M1 has been stored, "$90_H$" is stored, and then the flow returns from this subroutine.

When the reception data process subroutine is called again after the above operation is completed, the second byte of the received data, i.e., "$40_H$" is stored in the data buffer in the MB, which has also already been explained in the section of the third embodiment. Since only "$90_H$, $40_H$" are stored in this case, the message is judged to be incomplete, and the flow returns from this subroutine.

When the reception data process subroutine is called again after the above operation is completed, the third byte of the received data, i.e., "$7F_H$" is stored in the data buffer in the MB. Since "$90_H$, $40_H$, $7F_H$" are stored in this case, the message is judged to be complete, and the flow advances to step S812.

In step S812 it is checked if the message is note-ON. In this example "$90_H$" is the status of a note-ON message, so the mode judging process in step S813 is executed. When the mode is judged to be the velocity offset mode., a velocity offset (VELOCITY OFFSET) process routine is called (step S814).

The velocity offset process will now be described referring to the flowchart in FIG. 11.

In the velocity offset process, first, data corresponding to the channel of the note-ON message is read out from the O_D_B (step S111). Since the values of the individual faders 32, "0 to $7F_H$," are stored in the O_D_B, a fader value is read out from the area in the O_D_B corresponding to the channel number included in the note-ON message.

Then, "$40_H$" is subtracted from the read fader value, and the result is added to the velocity of the note-ON message (step S112). A value acquired by converting the value of the fader, 32, "0 to 127," into "–64" to 63" has therefore been added to the velocity of the note-ON message.

Then, it is checked if the velocity becomes "0" or below by the above addition (step S113). When the velocity is judged to be "0" or below, "1" is substituted for the velocity data of the note-ON message (step S114).

Then, if the velocity is judged to be greater than "0" by the above addition, it is checked if the velocity data is "$80_H$" or larger (step S115). If it is judged to be "$80_H$" or greater, "$7F_H$" is substituted for the velocity data of the note-ON message (step S116). In the other cases than the above, the result of the addition is directly used as the velocity value of the note-ON message.

When the velocity of the note-ON message falls out of the range of "1 to 127" as a consequence of the above process, the limit is set to "1" or "127." The reason why the lower limit is set to "1" is that if it is "0," it indicates a note-OFF message.

When the above processing is completed, the flow returns from this velocity offset process routine.

When the mode judging process is executed in step S813 and the decision is such that the mode is the velocity absolute mode, a velocity absolute (VELOCITY ABSOLUTE) process routine is called (step S815).

The velocity absolute process will now be described referring to the flowchart in FIG. 12.

In the velocity absolute process, first, data corresponding to the channel of the note-ON message is read out from the O_D_B (step S121). Since the values of the individual faders 32, "0 to $7F_H$," are stored in the O_D_B, a fader value is read out from the area in the O_D_B corresponding to the channel number included in the note-ON message.

Then, it is checked whether or not the contents of the O_D_B are "0" (step S122), and if they are not "0," the O_D_B data is written in the velocity of the note-ON message (step S123). If the contents-of the O_D_B are judged to be "0," "1" is substituted for the velocity of the note-ON message (step S124). As a result, when the velocity of the note-ON message is "0," it is set to "1."

When the above process is completed, the flow returns from this routine.

Then, the flow advances to step S817 in the received data process subroutine where the contents of the MB are transferred to the PTB. In this case, three bytes of the note-ON message with the altered velocity are transferred. Then, it is checked if the status byte is a program change ($Cn_H$) (step S818). In this case, it is not the status of a program change, so the separate flag judging process is to be executed (step S820). That is, the SP_F is checked. In this case, since the SP_F is "$00_H$," a TBO_OP subroutine is called (step S826). This TBO_OP subroutine performs a process to store one message to the transmission buffer TB0; execution of this step process transfers all the data stored in the PTB to the TB0.

Then, a TB1_OP subroutine is called (step S827). This TB1_OP subroutine performs a process to store one message to the transmission buffer TB1; execution of this step process transfers all the data stored in the PTB to the TB1.

As described earlier, the data written in the TB0 and TB1 are output via the MIDI output terminals OUT1 and OUT2 to an external device by the MIDI transmission interrupt 0 (FIG. 9) and MIDI transmission interrupt 1 (FIG. 10), respectively.

The fader value to be set in the O_D_B is acquired by a fader event process routine in FIGS. 22A and 22B. A description will now be given of only that portion of the fader event process routine which concerns this embodiment.

In the fader event process, first, it is checked if there is a fader event (step S2201), and if a fader event is judged to have occurred, it is checked if the fader event corresponds to the fader numbers 1 to 16 (step S2202). When it is judged that the event corresponds to the fader numbers 1–16, the mode judging process is executed (step S2203). When it is determined whether the mode is the velocity offset or velocity absolute, fader data is written in the area in the O_D_B corresponding to the event-occurred fader (step S2204). Then, the value displayed on the display 22 corresponding to that fader is changed (step S2205), and the flow returns from this routine.

A cursor moving process to move the cursor will be described referring to the cursor moving process routine shown in FIG. 32. This .cursor moving process, which is to be performed in various processes, will be described here.

In the cursor moving process, first, it is checked if there is a switch event (step S321), and if it is determined that a switch event has occurred, it is then checked whether or not this event is from a cursor key (step S322). When the event is judged to have come from the cursor key, the cursor position is changed and position data is input to Cursor (step S323). Then, a write address is input to the data write pointer based on this data. Then, the flow returns from this routine. Through the above, the data write pointer is updated.

As described above, according to this embodiment:, it is possible to directly manipulate the velocity data as well as to change the volume by adding a volume signal to an input MIDI signal, so that volume Change according to a change in velocity volume can be accomplished and a note-ON message having the same velocity value like some sort of automatic play data can easily be prepared.

According to this embodiment, in absolute mode, the velocity of input data can be averaged. In offset mode, the input data can be balanced for each channel at the velocity stage.

In velocity offset mode in the above embodiment, if the fader position is associated with "0 to 1" instead of "–64 to 63" and the velocity value of the input note information is multiplied by this value, it is unnecessary to perform rounding off at the top to set the value to "+127" when it exceeds "+127" or perform rounding off at the bottom to set the value to "+1" when the result of the addition is "0" or below.

(9) Ninth Embodiment

In the electronic musical instrument control apparatus according to this embodiment, it is necessary to display negative numerals on the display 22 in the above-described velocity offset mode or a key balance mode to be described later.

For instance, in step S486 in the schematic flow of the mode changing process (FIG. 48) in velocity offset mode, a display as shown in FIG. 80 will be presented. The meaning of the display has already been described. In this case, negative numerals will be displayed in inverted form (highlighted display).

The meaning of the brief display of ① in FIG. 80 is present in Table 4 below.

Figure 58A:
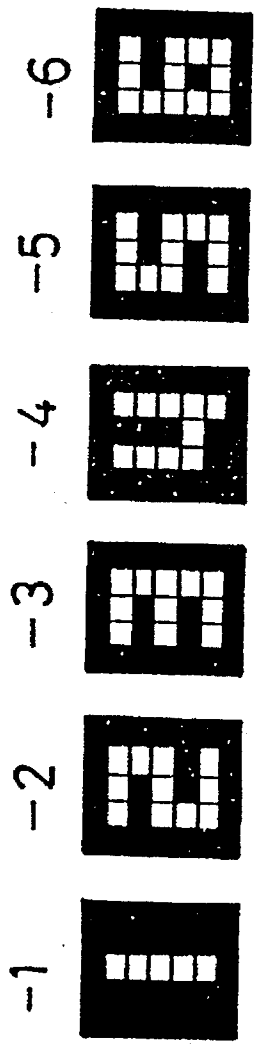
FIG. 58A is a diagram showing a first display example in the ninth embodiment.
Figure 58B:
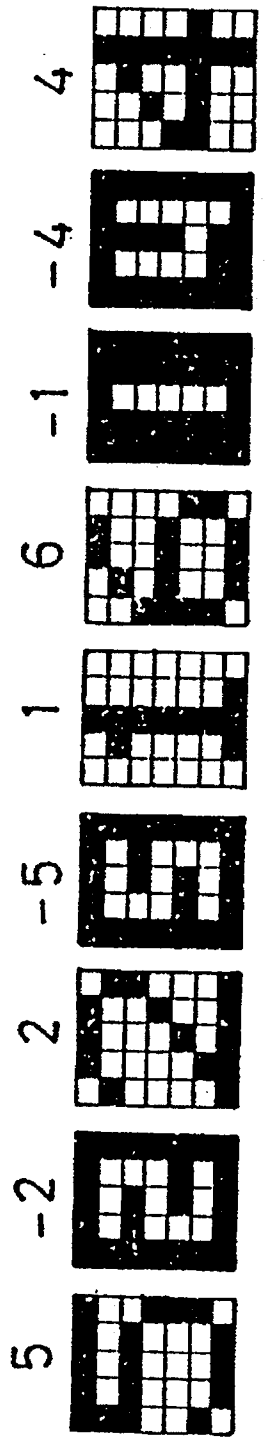
FIG. 58B is a diagram showing a first display example in the ninth embodiment.

FIG. 58B shows an example of the mixed display of a positive numeral and a negative numeral. As exemplified, since the visual difference between the negative numeral and positive numeral increases, both values can be distinguished one from the other at a glance, thus improving the visual confirmation. Further, this prevents the boundary between adjoining numerals from becoming difficult to distinguish.

While the foregoing description has been given with reference to the case where the display polarity of a negative numeral is inverted, a positive numeral may be highlighted.

TABLE 14

| Fader value | −64~55 | −54~−45 | −44~−35 | −34—25 | −24—15 | −14—5 | −4~5 | 6~15 | 16~25 | 26~35 | 36~45 | 46~55 | 56~63 |
|---|---|---|---|---|---|---|---|---|---|---|---|---|---|
| Brief display | invert 6 | invert 5 | invert 4 | invert 3 | invert 2 | invert 1 | 0 | 1 | 2 | 3 | 4 | 5 | 6 |

In step S485 in the above schematic flow of the mode changing process (FIG. 48), the address of a user font to be written in a character generator RAM is set to the address where the highlighted display data is stored.

In step S486, a user font is written in the character generator (CG) RAM of the LCD to effect display alteration according to the mode change.

Figure 53:
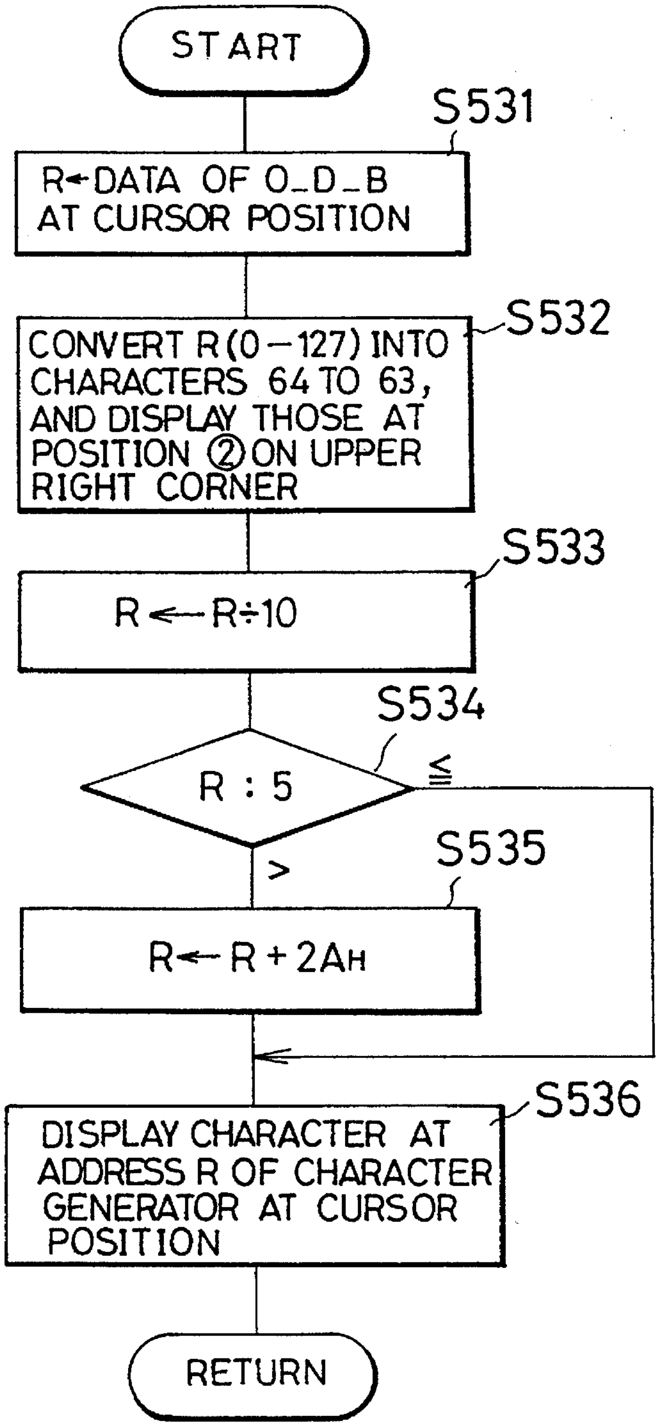
FIG. 53 is a flowchart illustrating a display change process.

The display changing process will be described in detail referring to the flowchart of the display changing process in FIG. 53.

The character generator of the LCD is constituted as indicated in Table 15 below.

Figure 59:
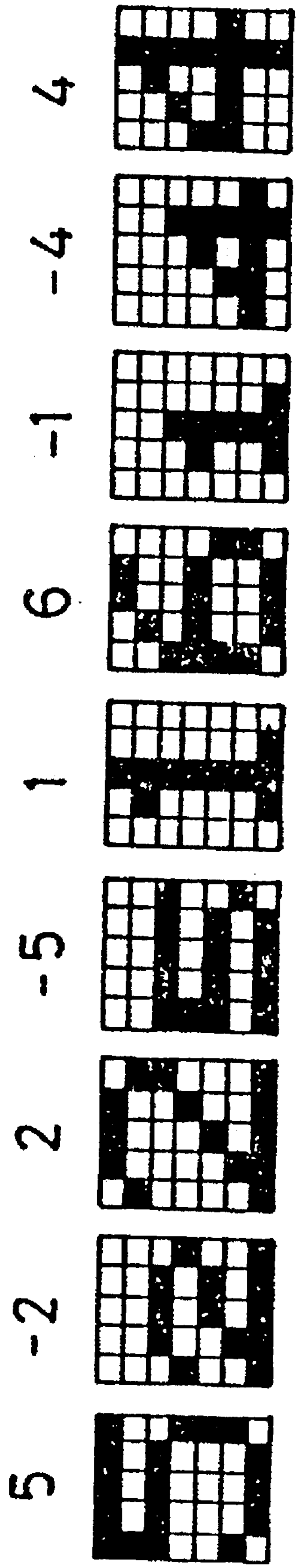
FIG. 59 is a diagram showing a second display example in the ninth embodiment.

In addition, the size of a negative numeral may be changed from that of a positive numeral as shown in FIG. 59 to ensure easy distinction between both numerals. Although the negative numeral is displayed small in FIG. 59, the positive numeral may be displayed small instead.

Figure 60A:
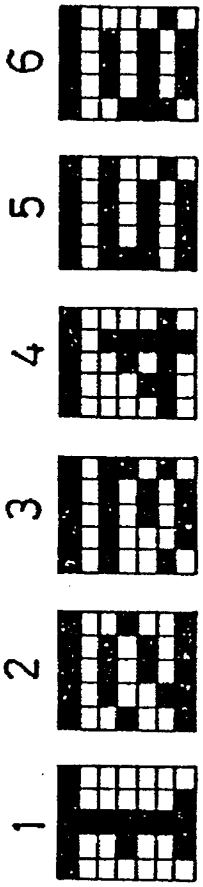
FIG. 60A is a diagram showing a third display example in the ninth embodiment.
Figure 60B:
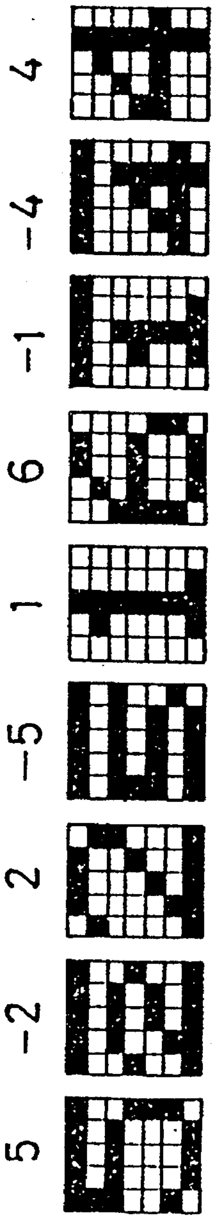
FIG. 60B is a diagram showing a third display example in the ninth embodiment.
Figure 60C:
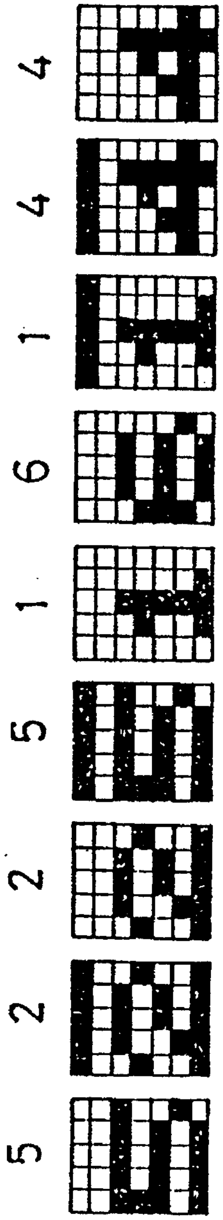
FIG. 60C is a diagram showing a third display example in the ninth embodiment.

To display a negative numeral, the numeral itself may be displayed small with a bar affixed thereto using the uppermost line, as shown in FIG. 60A. Although FIG. 60A shows the representative case to display a bar using the uppermost line, the bar may be displayed using the lowermost line. In this case, a positive numeral may be displayed large as shown in FIG. 60B or small as shown in FIG. 60C.

TABLE 15

| | CGRAM | | | | | | | | CGROM | |
|---|---|---|---|---|---|---|---|---|---|---|
| Address HEX | 0 | 1 | 2 | 3 | 4 | 5 | 6 | 7 | 20212223 . . . | 30313233 . . . |
| Displayed character | invert 6 | invert 5 | invert 4 | invert 3 | invert 2 | invert 1 | unused | unused | !" # . . . | 0 1 2 3 . . . |

First, the data in the O_D_B at the cursor position is latched in a register R (step S531). An arbitrary register in the CPU 5 is used as this register R. Then, the contents of the register R (0 to 127) is converted to "−64" to 63" to be a 2-digit numeral and a sign, which will be displayed at the position ② in FIG. 80 (step S532).

Subsequently, the contents of the register R is divided by "10" and the result is stored in the register R (step S533). As a result, "0" to 127" becomes "0 to 12." Then, the contents of the register R are compared with "5" (step S534). When it is determined that the contents of the register R are greater than "5,""$2A_H$ is added to the contents of the register R and the result is stored in the register R (step S535). When the contents are smaller than "5," they directly becomes the address of the CGRAM. The above process can yield the address of the character generator in the register R.

Then, data is obtained from the character generator using the address set in the register R and is displayed at the cursor position (step S536).

As described above, according to this embodiment, to briefly display a negative numeral by one character as shown in FIG. 58A, a highlighted numeral stored in the CGRAM is used.

It is therefore possible to effectively display a negative numeral within limited space without being annoyed with the display position of the minus "−."

It is of course possible to display a positive numeral with a bar affixed thereto and display a negative numeral large or small without a bar.

(10) Tenth Embodiment

An electronic musical instrument control apparatus according to this embodiment relates to a function to deal with the case where the actual volume and fader position are changed by mode alteration on the sender side or an operation on the receiver side in a device which outputs MIDI volume information by means of a sliding volume (fader).

When this function is executed immediately after the electronic musical instrument control apparatus is powered on or immediately after the mode is changed to a manual mode from a mode other than the manual mode, MIDI volume information corresponding to the fader position before the power on or before the mode change to the manual mode.

First, before executing a send fader position function of this invention, the MANUAL switch of the mode select key 28 is depressed. Thereafter, the process is executed according to the brief flow of the mode changing process in FIG. 48. In the mode changing process routine, the bit of the M_F_R corresponding to the manual mode is set to "1" and the remaining bits are cleared to "0" as described earlier.

Then, depression of a send fader position key 30 permits the process to be performed according to the brief flow of the switch event process shown in FIG. 27. As the send fader position key 30 has the same function over the entire modes (there is a difference of whether this function works or not, though), steps S272 and S273 are not concerned with this embodiment. In step S274, a process to the send fader position key 30 will be executed.

Figure 82:
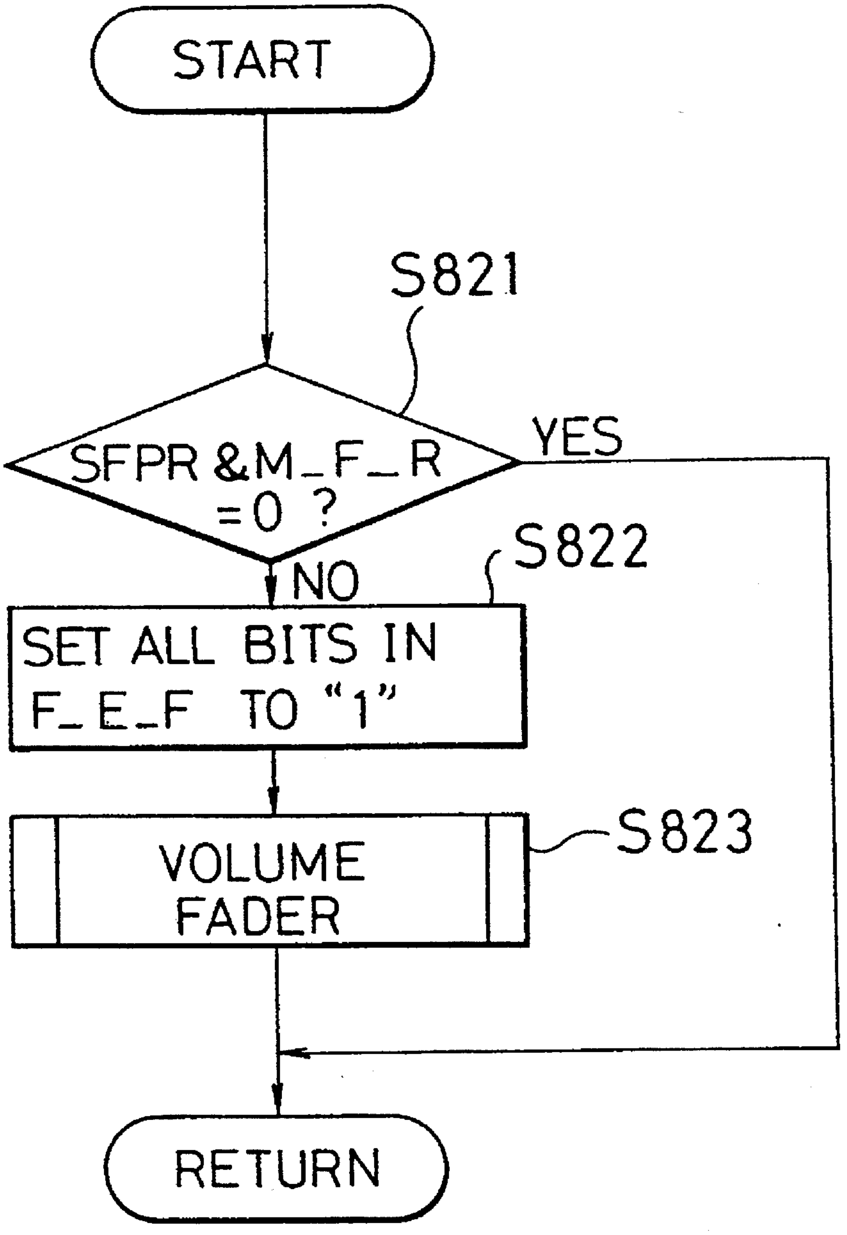
FIG. 82 is a flowchart illustrating a send fader position key process in the tenth embodiment.

The send fader position key process will be described referring to the flowchart in FIG. 82.

In this process, first, a logical product of an SFP execution register (SFPR) and M_F_R is obtained, and it is checked if the result is zero (step S821). The SFP execution register is provided as fixed data in the data memory 8, and those bits corresponding to the mode in which the send fader position key corresponding to the mode is valid are "1" and invalid bits are "0." Since only that bit in the M_F_R corresponding to the current mode becomes "1," the send fader position key is valid unless the logical product of the two registers is zero.

When the result is not judged as zero, the entire bits of an F_E_F are set to "1" (step S822). This F_E_F is used in the next volume fader (VOLUME FADER) process routine.

Then, the volume fader (VOLUME FADER) process routine is called (step S823). This volume fader process routine is to read out volume data stored in the V_D_B for a channel corresponding to the bit of the F_E_F which is set to "1," produces a MIDI volume message, and writes it in the IB, as already described in the section of the first embodiment.

As all the bits of the F_E_F are sent to "1" in send fader position process, a message having a volume value corresponding to the current fader position is produced for every channel.

The message thus prepared in the IB is output to an external device through an internal MIDI event process routine (FIGS. 21A and 21B).

This internal MIDI event process routine is called and invoked-by the main routine (FIG. 20).

In this internal MIDI event process routine, it is checked if data is present in the IB (step S2101), and if there is data, the data is read out from the IB (Step S2102). Then, it is checked if the read data is a status byte (step S2103), and if it is the status byte, it is stored in the PTB (step S2104). Then, it is checked if the status is "$FO_H$" or if it is system exclusive (step S2105), and if the status is "$FO_H$," an exclusive message is read out and written in the PTB (step S2106). It is then checked if one message has been established (step S2107), and steps S2106 and S2107 are repeatedly executed until one message is established.

When it is judged in step S2103 that the read data is not status data, or if it is judged in step S2105 that the status is not "$FO_H$," a data byte is read out from the IB and written in the PTB (step S2108). It is then checked if one message has been established (step S2109), and steps S2108 and S2109 are repeatedly executed until one message is established.

When one message is established, the separate judging process is executed (step S2110). That is, the separate process is executed referring to the SP_F as described in the section of the third embodiment referring to FIG. 8. More specifically, the channel separate process is performed if the channel separate flag is set (step S2111), the odd/even separate process is performed if the odd/even flag is set (step S2112), the note number separate process is performed if the note number flag is set (step S2113), the-velocity separate process is performed if the velocity flag is set (Step S2114, and the real time separate process is performed if the real time flat is set (step S2115). The details of each of those processes have already been given in the sections of the third to seventh embodiments, they will not be discussed here.

When none of the flags are set, the TB0_OP is called (step S2116) to store one message in the TB0, and then the TB1_OP is called (step S2117) to store one message in the TB1. In the individual processes of steps S2111 to S2115, the TB0_OP and TB1_0P are called in each process routine.

Through the above process, if the send fader position key 30 is depressed and is valid in that mode, MIDI volume messages for the entire 16 channels are output from the output terminal OUT1 or OUT2.

As described above, according to this embodiment, simply depressing the send fader position key permits a volume corresponding to the fader position at that time to be output.

With the above structure, when one thinks that there is a volume shift, he has only to depress the switch once.

It is therefore possible to clear the difference between the fader, the displayed value and the actual value, which is originated from alteration of the volume value using the INC or DEC key.

It iS also possible to clear the difference between the fader, the displayed value and the actual value, when the fader is moved in a changed mode and the mode then returns to the original mode.

Further, it is possible to correct the difference between the fader, the displayed value and the actual value immediately after connection to an external tone generator.

In the case where an external tone generator outputs volume information upon reception of a program change, the program change can be used to correct the difference between the fader, the displayed value and the actual value, which is originated from the reception of the program change.

It is also possible to sharply change the volume by depressing the key at some timing during playing of music.

This embodiment can be applied not only to the case where the volumes for 16 channels and the main volume are all output, but also to the case of outputting only the volume of a single channel, or volumes for several channels or the main volume.

This embodiment can be applied not only to the case of outputting volume information to the outside, but also to the case where the player's apparatus has a tone generator and other components to change the volume.

This embodiment can also be applied to the case of controlling not only volume information but also other MIDI signals (e.g., pan-pot signals as well as signals other than a MIDI signal.

This embodiment can also be applied to the case of using a rotary type volume or other type of volumes as well as to the case of using the sliding volume.

(11) Eleventh Embodiment

This embodiment relates to an electronic musical instrument controls apparatus as a volume information storing apparatus storing volume information in modes except for a mixer mode, which is a MIDI machine having a plurality of modes including a mode for controlling volumes of a plurality of MIDI channels (mixer) and providing a master volume valid even in other modes.

An example of this embodiment will now be explained referring to a flowchart in FIGS. 22A and 22B.

First, a process of changing a volume by a normal fader will be explained. When a switching event has occurred, it is first checked if the fader event had occurred (step S2201). When it is judged that the fader event has occurred, it is then checked if that event is an event for fader numbers 1 to 16 (step S2202).

If the judgment is made that the event is that for the fader numbers 1 to 16, a mode is judged (step S2203). When the mode is judged as a mode for changing a volume (Volume Fader, Setup, Channel data Fader), the mode is processed as follows.

If the mode is, for example, a volume fader (Volume Fader) mode, the display change subroutine is called (step S2218) so as to change a display on the display 22 indicating a volume value.

Figure 83:
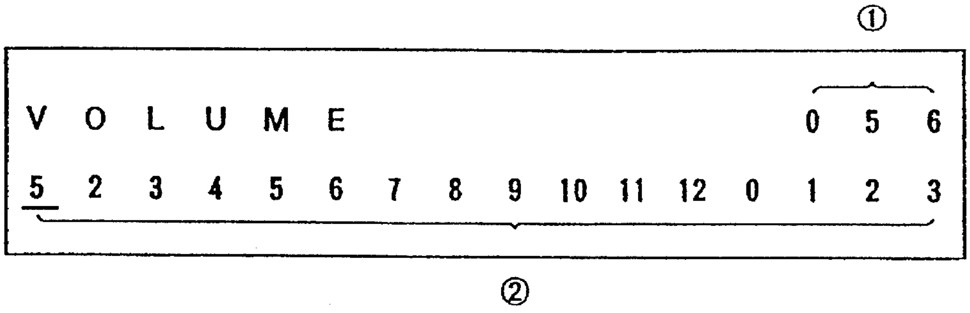
FIG. 83 is a diagram exemplifying a volume fader screen in the eleventh embodiment.

FIG. 83 illustrates an example of a display. In FIG. 83, ① indicates a volume value at a cursor position (when a fader is changed, the cursor moves to the position of a channel corresponding to the changed fader.), and ② shows an approximate value of a volume for each channel.

Then, data of the changed fader is written in a corresponding area of the F_D_B (step S2219). The written data in step S2219 and data stored in the area corresponding to the fader number 17 of the F_D_B are multiplied together, and the result is written in the area V_D_B corresponding to the changed fader (step S2220).

"1" is written to a bit in F_E_F corresponding to the changed fader (step S2221). Further, the volume fader (VOLUME FADER) process routine is called (step S2222), and the flow returns from this process routine.

As already described in the section of the first embodiment, in the volume fader process routine (FIG. 25), volume data stored in the V_D_B is read out for a channel corresponding to a bit of the F_E_F which is set at "1" to generate a MIDI volume message, thereby performing a process to write that message in the IB.

Since the bit of the F_E_F corresponding to the changed fader is set at "1" in the send fader position process, a message having a volume value corresponding to the position of the current fader is generated for a channel of that bit.

A message prepared in the IB in this manner is output to an external device through the internal MIDI event process routine (FIGS. 21A and 21B) as already described.

Next, the volume change process by the master volume directly concerning the feature of this invention will be described.

In other words, if it is judged in step S2202 that a fader where an event has occurred is the fader number 17, the value of the fader number 17 is written in a corresponding area of the F_D_B (step S2224), and the value of the fader number 17 and data written in areas of the F_D_B corresponding to the fader numbers 1 to 16 are multiplied together, and the results are written respectively in areas of the V_D_B corresponding to the fader numbers 1 to 16 (step S2225).

Through the process in step S2225, since the same conditions as in the occurrence of the event are caused in all the fader numbers 1 to 16, all the bits of the F_E_F are set at "1" (step S2226), the volume fader (VOLUME FADER) process routine is called (step S2222), and the flow returns from this routine.

As a result, a message having a volume value corresponding to the position of the current fader is generated in the IB for every channel, and is output to the external device through the internal MIDI event process routine (FIGS. 21A and 21B).

As described above, as volume information for every channel is stored in the F_D_B, this information can be referred to even in other modes. In operating the master volume (fader number 17), therefore, volume information in the F_D_B for all 16 channels is altered in accordance with a change of the master volume, regardless of mode, and by performing the control as if the fader event occurred for all 16 channels, so a volume can be changed while keeping the volume balance even in a mode with no volume alteration means.

In other words, in this embodiment, fader positions in volume mode are stored in a storage means, and referring to the positions, a master volume valid even in other modes calculates volume values from the positions, performing a MIDI output.

The master volume is therefore valid even in modes other than for the volume mode, while keeping the volume balance.

(12) Twelfth Embodiment

This embodiment relates to an electronic musical instrument control apparatus as an exclusive editing apparatus which can not only transmit MIDI exclusive data but which also can prepare this exclusive data.

More specifically, this exclusive editing apparatus has an exclusive mode to output exclusive data, and an exclusive edit mode to prepare exclusive data. The exclusive edit mode is set by depressing the exclusive edit (EXCLUSIVE EDIT) key in the mode select key 28.

Exclusive data corresponds to each of 16 faders, and 16 pieces of exclusive data constitute one patch. There are 16 patches.

In the following description, one exclusive data consists of within 16 bytes, excluding the statuses "$FO_H$" and "$F7_H$." This is to be displayed on the display 22 which is formed by 16×2 LCDs.

Figure 61:
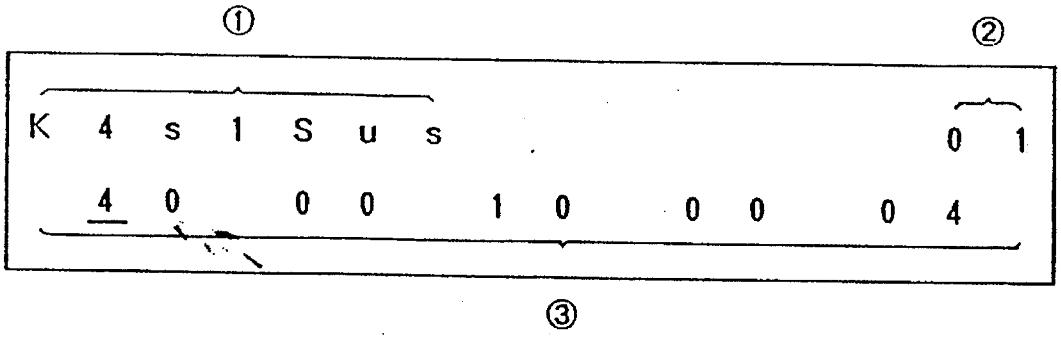
FIG. 61 is a diagram exemplifying an exclusive edit screen in the twelfth invention.

FIG. 61 exemplifies the screen in exclusive edit mode. In the diagram, ① is the exclusive name, ② is the cursor position, and ③ is exclusive data.

Figure 62:
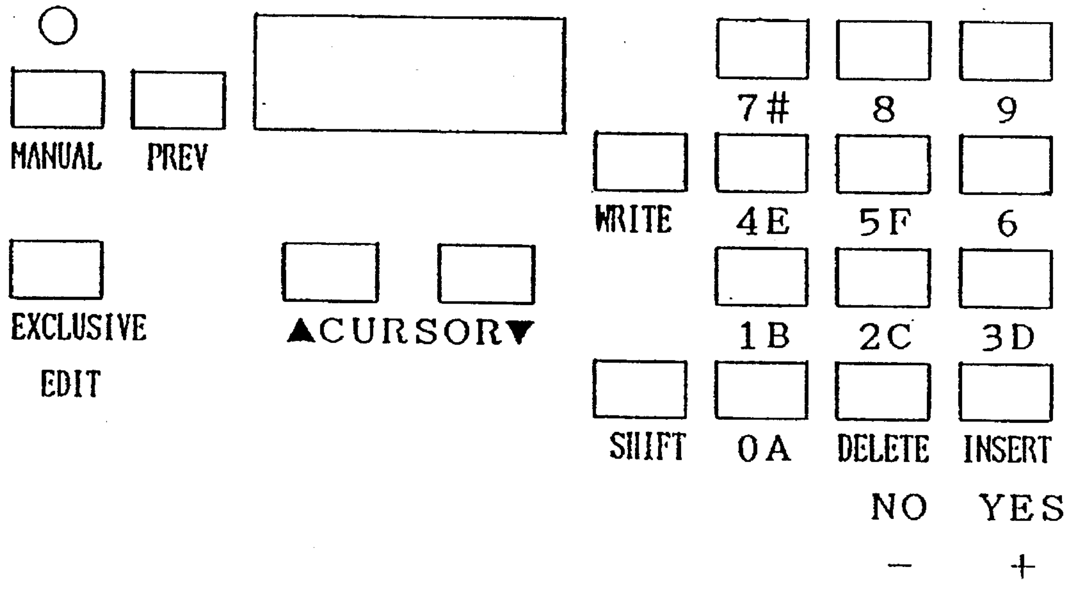
FIG. 62 is a diagram showing keys on an operation panel associated with an exclusive edit in the twelfth embodiment.

FIG. 62 illustrates that part of the operation panel shown in FIG. 2 which relates to the exclusive edit.

In inputting exclusive data indicated by ③ in FIG. 61, it is input byte by byte at the cursor position using the ten keys 26. In this case, hexadecimal numbers A to F can be input by depressing the ten keys 26 while pressing the SHIFT key 25. Key "7" in the ten keys 26 with the SHIFT key 25 enters ##, which represents an exclusive variable byte.

When the fader is moved in exclusive mode, the fader value is input to this byte and output. ## cannot be input more than one time in exclusive mode. It also cannot be input to the head.

The cursor movement is performed by the cursor key 31. When the exclusive data consists of 6 bytes or more, it cannot be displayed on the screen, so the screen will scroll when the cursor reaches the end.

Depressing the INSERT key enters 1-byte "00" at the cursor position. When the data becomes 16 bytes in total, no more data can be inserted.

Depressing the DELETE key erases the byte at the cursor position. The next byte (head) of "$FO_H$" cannot however be deleted in order to prevent preparation of data without a maker ID.

Depressing the WRITE key stores the edited contents. At this time, when the write destination is changed, copying is possible.

Figure 63:
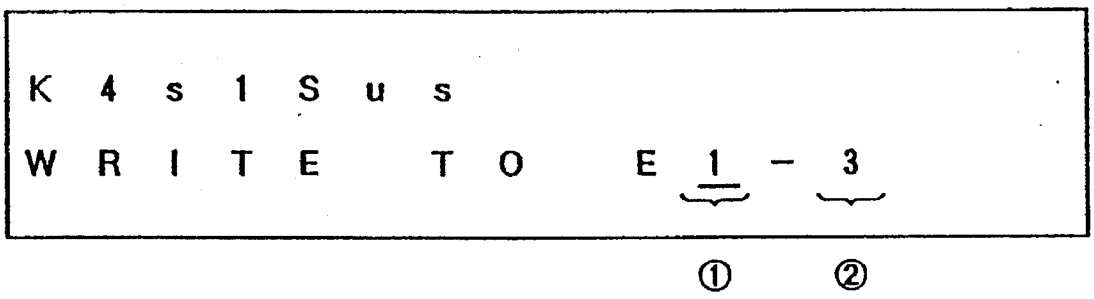
FIG. 63 is a diagram exemplifying an exclusive write screen in the twelfth embodiment.

FIG. 63 exemplifies the screen in exclusive write mode. In the diagram, ① is the patch number, and ② represents the order in that patch. Data is input at the position where the cursor is present using the ten keys 26. The cursor can be moved by the cursor key 31.

Depressing the YES key then provides a SURE ? display (see FIG. 95). Depressing the NO key returns the mode to the original exclusive edit mode.

Depressing the YES key again in the SURE ? display effects writing and returns the mode to the exclusive write mode (FIG. 63).

Writing can be effective only to the patches (for a user) of the exclusive banks 1 to 4; preset for the other.

When the exclusive edit key is depressed twice, for example, the mode enters the exclusive name (edit) mode where the name of each exclusive data can be edited. This is done by using the cursor key and "+" and "–" keys.

This embodiment will be described in detail below referring to the accompanying drawings.

(a) Exclusive data edit

Figure 84:
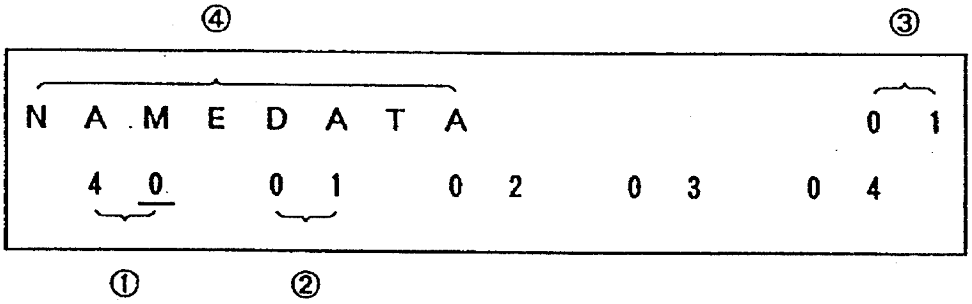
FIG. 84 is a diagram exemplifying an exclusive data edit screen in the twelfth embodiment.

First, mode change is executed. That is, when the exclusive edit (EXCLUSIVE EDIT) key is depressed, the mode changing process is performed according to the flowchart shown in FIG. 48. More specifically, in steps S483 and S484, the bit of the M_F_R corresponding to the exclusive edit mode is set to "1" and the remaining bits are cleared to "0.38 Then, the head address of the exclusive data buffer EX_DB is set to the data write pointer in step S485. Then, display alteration is performed (step S486). An example of the screen to be displayed is shown in FIG. 84. In the diagram, ① indicates the first-byte data in the EX_DB, ② indicates the second-byte data in the EX_DB, ③ indicates in which byte data the cursor is positioned, and ④ is the exclusive name stored in the exclusive name buffer EX_NB.

Figure 85:
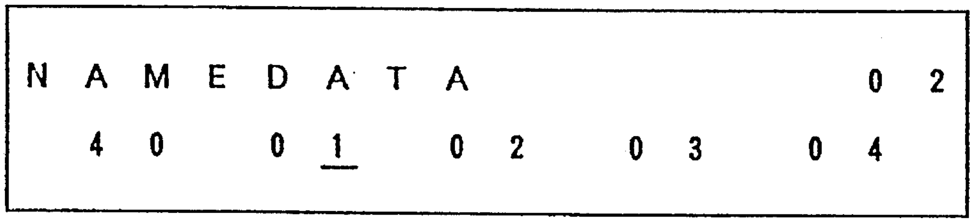
FIG. 85 is a diagram showing another example of the exclusive data edit screen in the twelfth embodiment.

The cursor movement will be described below. When the cursor key 31 is depressed, the cursor moving process is executed according to the flowchart shown in FIG. 32. That is, the cursor position is changed and position data is input to the Cursor in step S323. Based on that data, the write address is input to the data write pointer in step S324. FIG. 85 illustrates that the cursor is moved to the next byte.

Data input (one byte) will now be described. In the above conditions, when the ten key 26 is depressed, the exclusive edit process is performed according to the flowchart in FIG. 41. Data input is done in such a way that "0 to 9" are input using the ten keys 26 and "A to F" and "##" are input using the SHIFT key 25 and ten keys 26. It is to be noted that "##" becomes "$FF_H$ as internal data.

Figure 86:
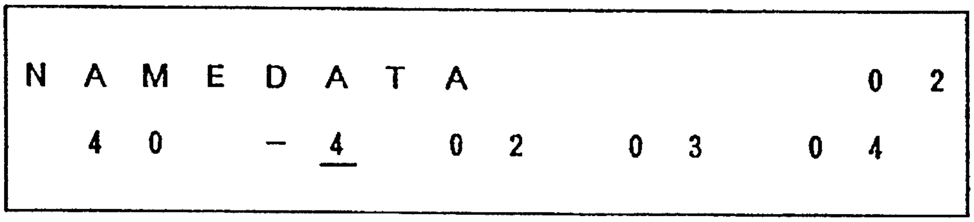
FIG. 86 is a diagram showing a different example of the exclusive data edit screen in the twelfth embodiment.

In the exclusive edit process, first it is checked if there is a switch event (step S411), and if such an event is judged to have occurred, it is then checked if the mode is the exclusive edit mode (step S412). If the mode is judged to be the exclusive edit mode, it is checked if it is data updating (step S413). If "4," a ten key, is input, for example, it is judged to be data updating, and it is checked if the input data is established (step S414). As a 2-digit (one byte) input is made here and data is judged to have been established, the flow goes to step S416 where the input data is written in the write buffer. Then, the flow returns from this routine. At this time, what is displayed on the display 22 is changed as shown in FIG. 86.

Figures 87, 88, 89, 90:
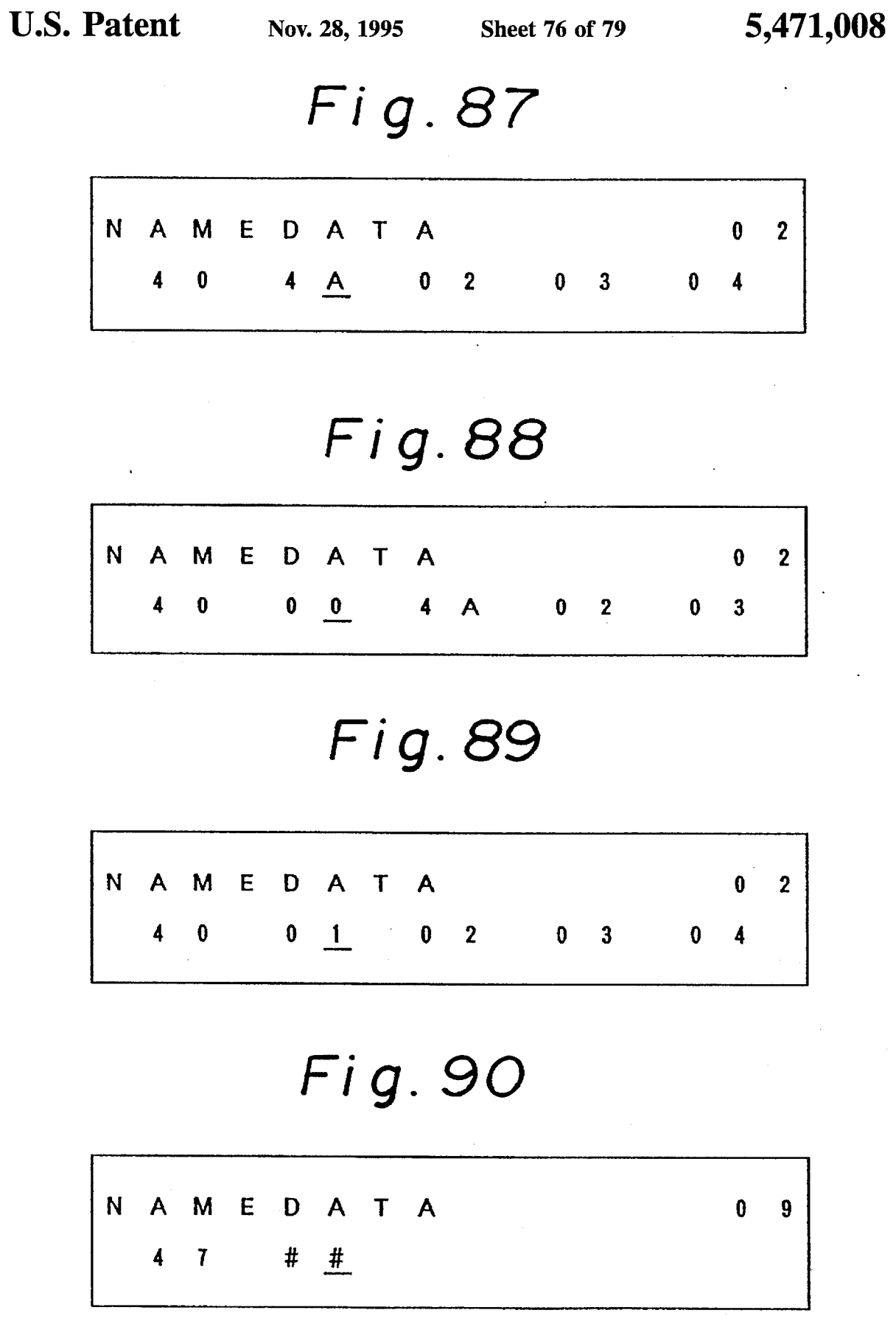

Likewise, depressing the ten key "0" while depressing the SHIFT key 25, "A" is input and it is judged to be data updating in step S413. The input data is judged to have been established in step S414, and the flow advances to step S415. The established data "$4A_H$" is then written at the address indicated by the data write pointer. At this time, what is displayed on the display 22 is changed as shown in FIG. 87.

When the "+YES INSERT" key (hereinafter called "INC key") is depressed in the condition shown in FIG. 85, the INC (data insertion) process is executed according to the flowchart shown in FIG. 42. That is, when the input of the INC key is confirmed, it is checked whether or not data for the maximum pieces of exclusive data has already been input, data up to the fifteenth byte following the address indicated by the data write pointer is shifted back byte by byte, and "$00_H$" is input to that address.

In this process, first, it is checked if there is a switch event (step S421), and if it is determined that a switch event has occurred, it is then checked whether or not it is the depression of the INC key (step S422). When it is judged to be the depression of the INC key, it is checked if the data is maximum (step S423). When it is judged that the data is judged to be maximum or judged to consist of up to the sixteenth byte, the flow returns directly from this routine. When the data is not judged to be maximum, data up to the fifteenth byte following the current cursor position inclusive is shifted back by one byte and "$00_H$" is written at the current position (step S424). Then, the flow returns from this routine. At this time the display on the display 22 will be changed-as shown in FIG. 88.

When the "–NO DELETE" key (hereinafter called "DEC key") is depressed in the condition shown in FIG. 85, the DEC (data erasing) process is executed according to the flowchart shown in FIG. 43.

In this process, first, it is checked if there is a switch event (step S431), and if it is determined that a switch event has occurred, it is then checked whether or not it is the depression of the DEC key (step S432). When it is judged to be the depression of the DEC key, it is checked if the cursor is at the first byte (step S433). When the cursor is judged to be at the first byte, the flow returns directly from this routine. When the cursor is not judged to be at the first byte, data of the current cursor position is deleted and data up to the sixteenth is shifted forward by one byte, and data "$FE_H$" is loaded in the sixteenth byte from a dummy area (step S434). Then, the flow returns from this routine. The data "$FE_H$" means the end of the exclusive data and neither MIDI output nor display will be effected.

The display relationship between-the MIDI output data and internal data is presented below.

MIDI output data:

"F0 40 01 02 03 04 05 06 07 7F F7"

Internal data (16 bytes)

"40 01 02 03 04 05 06 07 FF FE FE FE FE FE FE FE"

At this time the display on the display 22 will be changed as shown in FIG. 89. When the cursor is further moved to scroll the screen to the next screen, the display will be changed as shown in FIG. 90. In this diagram, "##" corresponds to "$FF_H$" of internal data, indicating that a value (fader position) should be input.

(b) Exclusive name edit

Figure 91:
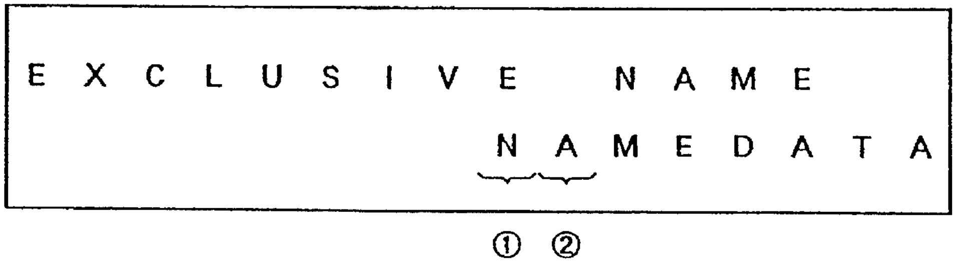
FIG. 91 is a diagram exemplifying an exclusive name edit screen in the twelfth embodiment.

First, mode change is executed. That is, when the exclusive edit (EXCLUSIVE EDIT) key is depressed in exclusive edit mode, the mode changing process is performed according to the flowchart shown in FIG. 48 so that the mode becomes the exclusive name edit mode. More specifically, in steps S483 and S484, the bit of the M_F_R corresponding to the exclusive edit mode is set to "1" and the remaining bits are cleared to "0." Then, the head address of the exclusive name buffer EX_NB is set to the data write pointer in step S485. Then, display alteration is performed (step S486). An example of the screen to be displayed is shown in FIG. 91. In the diagram, ① indicates the first-byte data in the EX_NB, and ② indicates the second-byte data in the EX_NB, both in ASCII codes.

The cursor movement will be described below. When the cursor key 31 is depressed, the cursor moving process is executed according to the flowchart shown in FIG. 32. That is, the cursor position is changed and position data is input to the Cursor in step S323. Based on that data, the write address is input to the data write pointer in step S324.

Data input will now be described. In the above conditions, when there is a key input, the exclusive name edit process in the exclusive edit process is performed according to the flowchart in FIG. 44.

Figure 92:
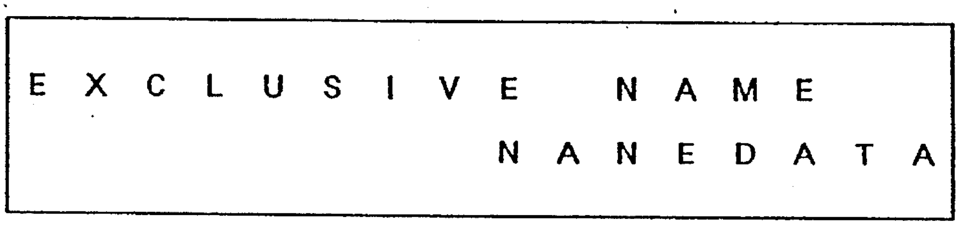
FIG. 92 is a diagram showing another example of the exclusive name edit screen in the twelfth embodiment.

In exclusive name edit process, first, it is checked if there is a switch event (step S441), and if such an event is judged to have occurred, it is then checked if the mode is the exclusive name edit mode (step S442). If the mode is judged to be the exclusive name edit mode, it is checked if either the INC key or the DEC key has been depressed (step S443). When it is judged that either the INC key or the DEC key has been depressed, it is checked if it is the INC key. When the INC key is judged to have been depressed, the value of the address indicated by the data write pointer is incremented by "1" (step S445), and then, the flow returns from this routine. At this time the display on the display 22 will be changed as shown in FIG. 92.

Figure 93:
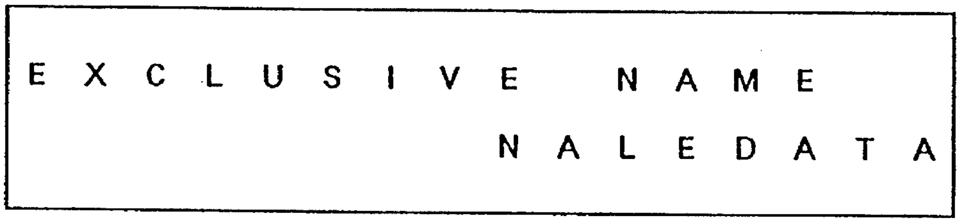
FIG. 93 is a diagram showing a different example of the exclusive name edit screen in the twelfth embodiment.

When it is judged that the INC key has not been depressed, i.e., the DEC has been depressed, the value of the address indicated by the data write pointer is decremented by "1" (step S446), and then, the flow returns from this routine. At this time the display on the display 22 will be changed as shown in FIG. 93.

(c) Setting of the write address to the data memory

Figure 94:
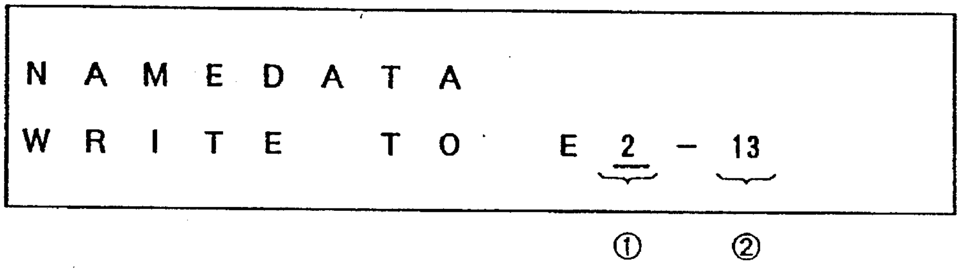
FIG. 94 is a diagram exemplifying an exclusive write screen in the twelfth embodiment.

First, mode change is executed. That is, when the write (WRITE) key is depressed, the mode changing process is performed according to the flowchart shown in FIG. 48. The details of the mode changing process in step S483 in the same diagram are illustrated in a write process 1 in the exclusive edit process in FIG. 45. First, it is checked if there is a switch event (step S451), and if it is determined that a switch event has occurred, it is then checked whether or not the mode is the exclusive edit mode (step S452). When the mode is judged to be the exclusive edit mode, it is checked if the WRITE key 24 has been depressed (step S453). When it is judged that the WRITE key 24 has been depressed, the current mode is changed to the exclusive write mode (step S454), and the flow returns from this routine. In step S484, the bit of the M_F_R corresponding to the exclusive write mode is set to "1" and the remaining bits are cleared to "0." Then, display alteration is performed (step S486). An example of the screen to be displayed is shown in FIG. 94. In the diagram, ① indicates the bank number, and ② indicates the fader number.

Designation of the write address will now be described. In the above conditions, when there is a key input, a write process 2 in the exclusive edit process is performed according to the flowchart in FIG. 46.

In this process, first, it is checked if there is a switch event (step S461), and if such an event is judged to have occurred, it is then checked if the mode is the exclusive write mode (step S462). If the mode is judged to be the exclusive write mode, it is checked if the INC key has been depressed (step S463). When it is determined that the INC key has been depressed, the mode is changed to the exclusive write waiting mode (step S464), and the flow returns from this routine.

When it is determined in step S463 that the INC key has not been depressed, it is checked if the DEC key has been depressed (S465). When it is determined that the DEC key been depressed, the mode is changed to the exclusive edit mode (step S466). In exclusive write mode, the mode change is possible by depressing the INC key or DEC key in the above manner.

When it is determined in step S465 that depression of the DEC key has not occured, it is checked if the ten key has been depressed (step S467). When it is determined that the ten key has been depressed, the input data is written at the address indicated by the data load pointer or in the exclusive bank number EX_BANK_NO area (step S468). As a result, the bank number is changed.

When there is a cursor key input in the above condition, the process is executed according to what is shown in FIG. 32, so that the cursor can be moved to the position ② in FIG. 94. When a ten-key input is made in this situation, this data is input as a fader number and its value is written in the F_E_F. Then, the head address of the area where the edited exclusive data is to be written is computed from two values, the back number and fader number, and is written in the data load pointer.

Data writing will now be explained. In the above-described exclusive write waiting mode, when the INC is depressed, the process is performed according to the flowchart of a write process 3 in the exclusive edit process shown in FIG. 47.

In this process, first, it is checked if there is a switch event (step S471), and if such an event is judged to have occurred, it is then checked if the mode is the exclusive write waiting mode (step S472). If the mode is judged to be the exclusive write waiting mode, it is checked if the INC key has been depressed (step S473). When it is determined that the INC key has been depressed, the contents of the exclusive load area are transferred to the storage area for exclusive banks 1 to 4 at and following the address indicated by the data load pointer (step S474). Then, the flow returns from this routine.

When it is determined in step S473 that the INC key has not been depressed, it is checked if the DEC key has been depressed (S475). When it is determined that the DEC key been depressed, the mode is changed to the write process 2 or the exclusive write mode (Step S476), and then, the flow returns from this routine.

As described above, according to this embodiment, a mode for an exclusive edit is provided separate from a mode for an exclusive manipulation, thus ensuring easy preparation, alteration and copying of exclusive data.

With this structure, exclusive data can easily be prepared by reading the manual without depending on the library.

Further, if one exclusive data is prepared, most exclusive data can be prepared for the same type of devices by copying the data and slightly altering it.

Furthermore, preset exclusive data can be copied and processed before being used.

(13) Thirteenth Embodiment

This embodiment relates to a technique for improving the operability of setting parameters such as timbre of an electronic musical instrument.

A detailed explanation of this embodiment will be given below referring to the drawings.

(a) Mode change

First, mode change will be explained. When the manual edit (MANUAL) key of the mode select keys 28 is depressed, the mode changing process is performed according to the flowchart shown in FIG. 48 so that the mode is changed to the exclusive fader mode. More specifically, in steps S483 and S484, the bit of the M_F_R corresponding to the exclusive fader mode is set to "1" and the remaining bits are cleared to "0." Then, the head address of the exclusive data buffer EX_DB is set to the internally generated data read pointer in step S485. Then, display alteration is performed (step S486). An example of the screen to be displayed is shown in FIG. 96. In the diagram, ① indicates the approximate value of a fader, ② indicates the value of a fader corresponding to the position of a cursor, and ③ indicates the content of the exclusive name buffer EX_NB.

FIG. 96 illustrates an example where "7" is written to the EX_BANK_NO and "5" is written to the Cursor.

(b) Cursor movement

The cursor movement will be described below. When the cursor key 31 is depressed, the cursor moving process is executed according to the flowchart shown in FIG. 32. That is, the cursor position is changed and position data is input to the Cursor in step S323. Based on that data, the write address is input to the data write pointer in step S324.

In FIG. 96, when the cursor key 31 is depressed once, the cursor moves to the position indicating the fader number 6. In this case, "6" is written to the Cursor.

After the cursor movement is performed, the exclusive data read process shown in FIG. 26 is sequentially performed. In this process, it is checked whether or not a switch event has occurred (step S2601), and if such an event is judged to have occurred, it is then checked if the mode is the exclusive fader mode (step S2602). If the mode is judged to be the exclusive fader mode, it is checked if the bank number is switched (step S2603). Whether or not the bank number is switched is determined by whether there is an input by ten keys. Since the event in this case is that of the cursor movement, it is not judged that the bank number is switched, and the flow goes to step S2607. It is determined in step S2607 whether or not the event is the cursor movement (step S2606). If the event is judged to be the cursor movement, the flow branches to step S2605 where the data load pointer is altered based on the values of the EX BANK NO and the Cursor, and exclusive data, which is indicated by the data load pointer in the storage areas of the exclusive banks 1 to 4 or 5 to 16, is transmitted to the exclusive load area.

Since the EX_BANK_NO shows "7" and the Cursor is "6" in this case, data in the exclusive No. 6 of the exclusive bank 7 is written in the exclusive load area.

The display alteration process is then performed (step S2606). At this time, a display on the display 22 will be changed as shown in FIG. 97.

(c) Change of bank number

When a ten key input is made in exclusive fader mode, it is judged in step S2603 that the bank number is changed. It is then checked if the input data is established (step S2604). This judgment is made by checking whether a 2-digit input is made. When it is judged that the input data has not be established, the flow returns from this routine, and waits until data is input again.

If the ten key is operated in such conditions and the input data is judged to have been established in step S2604, the flow advances to step S2605 to .execute the same operation as described above.

In FIG. 97, with "0, 2" being input, "2" is written to the EX_BANK_NO. When the process of step S2605 is executed, since the EX_BANK_NO is "2" and the Cursor is "6," the contents of the load pointer indicate the head address of data in the exclusive NO. 6 in the exclusive bank 2, and write all the data in the exclusive NO. 6 to the exclusive load area. The display alteration process is then performed (step S2606). At this time a display on the display 22 will be changed as shown in FIG. 98.

(d) Fader event process

When the fader is operated in exclusive fader mode, the process is performed according to the flowchart of the fader event process shown in FIGS. 22A and 22B.

The following explanation will be given of the case where the fader with the fader number 13 is operated in the condition shown in FIG. 98.

Figure 99:
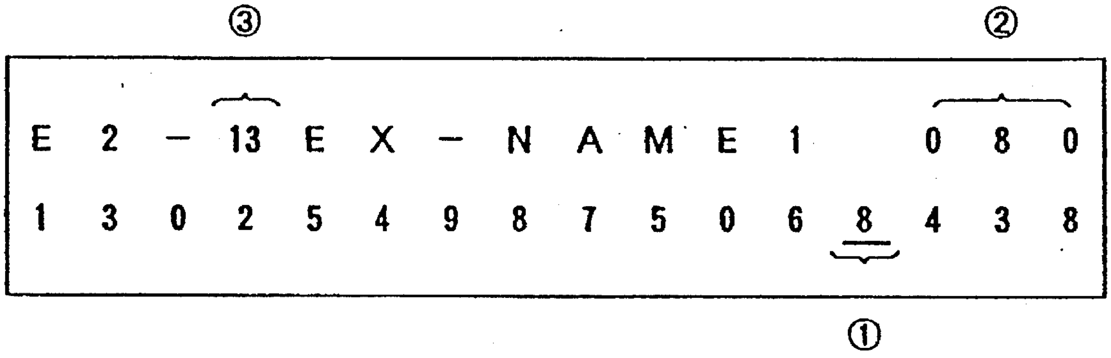
FIG. 99 is a diagram showing a further example of the exclusive fader screen in the thirteenth embodiment.

When the fader event is Judged to have occurred in step S2201, it is checked if that event is a fader event for the fader number 1 to 16 (step S2202). Since the fader having the event in this example iS the fader number 13, the flow advances to step S2203 where the mode judgment is made. If the mode is judged as the exclusive fader mode, the flow goes to step S2213 where the more alteration process is performed. The display 22 will be changed as shown in FIG. 99 at this time. In other words, values corresponding to a position after the fader number 13 is operated are indicated at positions ① and ②, and the fader number is indicated at the position ③.

Figure 100:
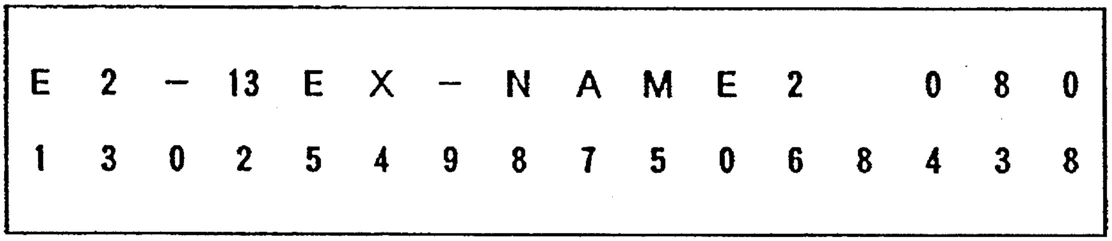
FIG. 100 is a diagram showing a still further example of the exclusive fader screen in the thirteenth embodiment.

Next, the exclusive data read process is performed (step S2223). This process starts with step S2609 in the exclusive data read process routine (FIG. 26). That is, the cursor moves to a position corresponding to the fader where the event has occurred (step S2609), and then it is checked if the mode is the exclusive fader mode (step S2610). When the mode is judged as the exclusive fader mode, the flow branches to step S2605 where the same process as described above is performed. At this time, a display on the display 22 will be changed as shown in FIG. 100.

Data of the fader is then written in the area of the O_D_B corresponding to the fader (step S2214). More specifically, a value corresponding to the position after the fader with the fader number 13 is operated is written as "80=$50_H$" in the area of the O_D_B corresponding to the fader number 13.

The bit of the F_E_F corresponding to the fader number 13 is set to "1" (step S2215). The exclusive fader process routine is called (FIG. 49).

The exclusive fader process will now be explained referring to the flowchart in FIG. 49. First in this process "$FO_H$" is written to the IB (step S4901). This is an exclusive status byte. Then, the pointer reset is performed (step S4902). In other words, the head address of the exclusive data buffer EX_DB in the exclusive load area is written to the internally generated data read pointer. It is assumed that the following data has been stored in the EX_DB at this time.

"40 00 10 00 04 3F 04 FF FE FE FE FE FE FE FE FE"

(all data is hexadecimal)

Then, the contents of the exclusive data buffer are read out (step S4903). It is determined if the read data is "$FE_H$" (step S4904), and when the data is not judged as "$FE_H$," it is then checked if the data is "$FF_H$" (step S4906). When that data is not judged as "$FF_H$," the data is written to the IB (step S4909), and the internally generated data read pointer is incremented (step S4910) before the flow returns to step S4903. The above-described series of processes is repeatedly performed. The data of "40 00 10 00 04 3F 04" is stored in the IB.

If the data read out in step S4906 is judged as "$FF_H$" in the process repeatedly performed, the contents of the area in the O_D_B corresponding to the fader number 13 is read out (step S4907). In this case "$50_H$" is read out. Next, the above data is written to the I.B (step S4908). The flow then branches to step S4910 where the same process as described above is repeated.

When the read data is judged as "$FE_H$" in step S4904, "$F7_H$" is written to the IB (step S4905), and the flow returns from the exclusive fader process routine.

Through the above-described process, the following data is written to the IB.

"F0 40 00 10 00 04 3F 04 50 F7"

(all data is hexadecimal)

After the above process is completed, the flow also returns from the fader event process routine (FIGS. 22A and 22B). The data written to the IB is output to an external device through the above-described internal MIDI event process routine (FIGS. 21A and 22B).

An electronic instrument controlling-apparatus according to this embodiment is used as follows. This apparatus is connected to a synthesizer by a MIDI to match both channels. It is assumed that exclusive data for that synthesizer is written in this apparatus.

As an arbitrary fader of this apparatus moves, the timbre of the synthesizer is converted according to the position of the fader with respect to a parameter assigned to the fader.

According to this embodiment, it-is unnecessary to call a parameter in editing a synthesizer or the like, and the operability is improved, such as permitting alteration of a plurality of parameters at the same time.

Industrial Applicability

As described above in detail, the present invention can provide:

(1) An electronic musical instrument control apparatus with excellent operability which can output program change signals and volume signals for entire 16 MIDI channels at the same time, and execute setup of many MIDI devices simultaneously.

(2) An electronic musical instrument control apparatus with excellent operability which converts channels between the output side of MIDI information and the receiver side of the MIDI information (on the way of transferring a MIDI signal) to collectively associate the channels of the output side of the MIDI information with those of the receiver side of the MIDI information, simplifying environmental setting or the like.

(3) An electronic musical instrument control apparatus as a MIDI information dividing apparatus which can permit an output terminal to be selected for every MIDI channel so that it can generate a musical tone from a tone generator of a player's preference or a musical tone proper for a tone generator.

(4) An electronic musical instrument control apparatus as a MIDI information dividing apparatus which can allow a channel message directly affecting tone generation to be output from a first output terminal and other messages to be output from a second output terminal so as to interfere with the specifications of many devices.

(5) An electronic musical instrument control apparatus as a MIDI information dividing apparatus which can allow an output destination to be selected according to the magnitude of a note number so as to generate a musical tone from a tone generator of a player's preference or a musical tone proper for a tone generator.

(6) An electronic musical instrument control apparatus as a MIDI information dividing apparatus which can permit an output destination to be selected according to whether a note number is an odd number or even number so as to artificially increase the number of simultaneously generated tones by driving different tone generators for individual output destinations, thus ensuring a variety of performances that a player desires.

(7) An electronic musical instrument control apparatus as a MIDI information dividing apparatus which can permit an output destination to be selected according to the velocity of a message having a note number so as to generate a musical tone from a tone generator of a player's preference or a musical tone proper for a tone generator.

(8) An electronic musical instrument control apparatus as a velocity manipulating apparatus which can not only change the volume by adding a volume signal to an input MIDI signal, but also directly manipulate velocity data.

(9) An electronic musical instrument control apparatus having a display device which can improve the visibility of negative numerals by effectively displaying the negative numerals in limited space.

(10) An electronic musical instrument control apparatus with excellent operability which can correct mismatching of volume to the positions of faders for all the channels at a time and without moving faders.

(11) An electronic musical instrument control apparatus as a volume information storing apparatus with excellent operability, which has-a master volume valid in modes other than a mode that permits volume alteration, and allows for a volume operation even in the other modes.

(12) An electronic musical instrument control apparatus as an exclusive editing apparatus which permits a user to freely prepare exclusive data.

(13) An electronic musical instrument control apparatus with an improved operability, which does not require selection of a parameter by means of a key switch or the like, and which can move a fader to which a parameter to be altered is assigned so as to change data.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

We claim:

1. A MIDI control apparatus for performing simultaneous setup for each MIDI channel of an external MIDI device having at least 16 MIDI channels, comprising:

storage means for storing patch information;

said patch information including program change information and volume information for each MIDI channel of said at least 16 MIDI channels;

instruction means for simultaneously setting up each MIDI channel of said external MIDI device; and output means for reading said patch information and simultaneously outputting said patch information to said external MIDI device;

said path information completely setting up said external MIDI device so that no successive path information is required to be sent by said output means.

2. A MIDI control apparatus for collectively associating channels on an output side of a MIDI signal transfer device with channels on an input side of said device, comprising:

input means for inputting MIDI information;

said MIDI information including channel information;

means or converting said channel information;

a table for storing channel information before conversion and channel information after conversion in association with one another;

processing means for searching said table using channel information included in said MIDI information as channel information before conversion to extract channel information after conversion and replacing said channel information after conversion with said channel information included in said MIDI information; and output means for outputting said MIDI information to a MIDI device.

3. A MIDI control apparatus for enabling selection of a particular output terminal for each MIDI channel of a plurality of channels, comprising:

input means for inputting MIDI information;

said MIDI information including a plurality of channels;

specifying means for specifying than an output destination of MIDI information is to be determined on a channel by channel basis;

setting means for setting a predetermined parameter indicating an output destination for each channel of said plurality of channels;

control means for,· when MIDI information is input through said input means, referring to said predetermined parameter corresponding to channel information included in said MIDI information set by said setting means and determining said output destination based on said predetermined parameter; and a parameter of output means for outputting MIDI information whose output information has been determined by said control means;

whereby a particular output terminal may be selected for each MIDI channel of a plurality of channels so that a musical tone may be generated by a tone generator selected by a player and so that a musical tone proper for a particular tone generator may be selected.

4. A MIDI control apparatus that divides messages to meet specification of external devices requiring differing messages, comprising:

input means for inputting MIDI information of differing types;

specifying means for specifying that an output destination of MIDI information is to be determined in accordance with a preselected type of said differing types of MIDI information;

control means for, when MIDI information is input through said input means with determination of an output destination of MIDI information specified by said specifying means, determining an output destination in accordance with said preselected type of said MIDI information; and a plurality of output means for outputting MIDI information whose output destination has been determined by said control means; said MIDI information being divided into separate messages, a message directly affecting tone generation being output from a first output terminal and other messages being output from a second output terminal, said division of MIDI information enabling said control apparatus to meet the specification of devices that require each division of messages.

5. A multi-channel MIDI control apparatus for enabling a player to direct MIDI information of each channel to an arbitrary output destination in accordance with the magnitude of a note number, comprising:

input means for inputting MIDI information;

said MIDI information including a plurality of note numbers, each note number of said plurality of note numbers having a predetermined magnitude;

specifying means for specifying that an output destination of MIDI information is to be determined by the magnitude of a note number;

setting means for setting a threshold value for discrimination of the magnitude of a note number and a parameter indicating an output destination for each channel in accordance with said threshold value when it is specified by said specifying means that an output destination of MIDI information is to be determined by the magnitude of a note number;

control means for referring to threshold values and parameters corresponding to channel information included in said MIDI information which are set by said setting means to thereby determine said output destination of MIDI information; and a plurality of output means for outputting MIDI information whose output destination has been determined by said control means;

whereby a player may direct MIDI information of each channel to an arbitrary output destination in accordance with the magnitude of a note number.

6. A MIDI control apparatus for increasing the number of simultaneously generated tones, comprising:

input means for inputting MIDI information;

said MIDI information including odd and even note numbers;

specifying means for specifying that an output destination of MIDI information is to be determined in accordance with whether a note number is an odd number or an even number;

setting means for setting a parameter indicating an output destination for each channel in accordance with whether a note number is an odd number or an even number;

control means for, when MIDI information is input through said input means, referring to that parameter corresponding to channel information included in said MIDI information which is set by said setting means to thereby determine said output destination of MIDI information; and a plurality of output means for outputting MIDI information whose output destination has been determined by said control means;

whereby the number of simultaneously generated tones is increased, thus increasing the variety of performances that a player may create.

7. A MIDI control apparatus for outputting MIDI information to an arbitrary output destination, comprising:

input means for inputting MIDI information;

said MIDI information including velocity information;

specifying means for specifying that an output destination of MIDI information is to be determined by velocity information;

setting means for setting a threshold value for discrimination of said velocity information and a parameter indicating an output destination for each channel in accordance with said threshold value when it is specified by said specifying means that an output destination of MIDI information is to be determined by velocity information;

control means for referring to threshold values and parameters corresponding to channel information included in said MIDI information which are set by said setting means to thereby determine said output destination of MIDI information; and a plurality of output means for outputting MIDI information whose output destination has been determined by said control means;

whereby a player causes output of MIDI information of each channel of a plurality of channels to an arbitrary output destination in accordance with the value of velocity information.

8. A MIDI control apparatus for changing a volume signal by direct manipulation of velocity information, comprising:

input means for inputting MIDI information;

said MIDI information including velocity information;

instruction means for instructing alteration of velocity information input through said input means;

said instruction means including a "manual" mode key which is depressed to activate said instruction means;

velocity imparting means for providing velocity information to be changed;

control means for, when velocity information alteration is instructed by said instruction means, altering velocity information input through said input means in accordance with said velocity information given by said velocity information imparting means;

a plurality of output means for outputting MIDI information whose velocity information has been changed by said control means;

said control means being a manually operable velocity manipulator that changes volume by adding a volume signal to said input MIDI information and that directly manipulates velocity data.

9. A MIDI control apparatus for displaying positive and negative numerals in the absence of positive and negative signs, comprising:

display means for temporarily displaying a plurality of numbers;

said plurality of numbers being subject to continual change as data input into said MIDI control apparatus changes;

means for highlighting negative numbers of said plurality of numbers, said negative numbers being highlighted when displayed by said display means;

said display means including no space for positive or negative signs.

10. A MIDI control apparatus for simultaneously matching MIDI volume and manipulator positions, comprising:

instruction means for instructing outputting of MIDI volume information;

said instruction means being an instruction switch that is operable by an operator;

a plurality of manipulators, each of which has a plurality of functional positions;

storage means for storing positional information of said plurality of manipulators;

producing means, stored in said storage means, for producing plural pieces of MIDI volume information including said positional information of said plurality of manipulators; and output means for outputting said plural pieces of MIDI volume information produced by said producing means whereby simultaneous matching of MIDI volume and manipulator positions is achieved without moving the manipulators.

11. The MIDI control apparatus of claim 10, further comprising:

a master volume manipulator;

storage means for storing individual pieces of volume information designated by said first plurality of manipulators;

said master volume manipulator instructing relative alteration of all of said individual pieces of volume information designated by said plurality of manipulators;

producing means for, when said master volume manipulator is manipulated, processing said individual pieces of volume information stored in said storage means in accordance with the amount of manipulation of said master volume manipulator irrespective of modes to produce new volume information; and output means for outputting master information produced by said producing means.

12. A MIDI control apparatus for enabling a player to produce, alter, or copy exclusive data and to use said exclusive data during a performance, comprising:

instruction means for establishing an exclusive edit mode;

input means for inputting predetermined data;

producing means for producing exclusive information in accordance with an input from said input means when said instruction means establishes said exclusive edit mode; and storage means for storing exclusive information produced by said producing means.

13. The MIDI control apparatus of claim 12, comprising:

a manipulator for inputting information;

a key switch means for opening and closing a switch;

a manipulator for inputting information;

producing and altering means for reading out said exclusive information and altering said exclusive information by manipulation of said manipulator to produce new exclusive information; and outputting means for outputting said exclusive information produced by said producing means;

whereby said exclusive information is altered by said manipulator without first selecting said exclusive information by said key switch means.

* * * * *

UNITED STATES PATENT AND TRADEMARK OFFICE

CERTIFICATE OF CORRECTION

PATENT NO. : 5,471,008

DATED : November 28, 1995

INVENTOR(S) : Akihiro Fujita, Katsushi Ishii

It is certified that error appears in the above-indentified patent and that said Letters Patent is hereby corrected as shown below:

Column 60, Line 56, change "path" to --patch--
Column 60, Line 57, change "path" to --patch--
Column 60, Line 65, change "or" to --for--
Column 61, Line 15, change "than" to --that--
Column 61, Line 27, change "parameter" to --plurality--
Column 61, Line 36, change "specification to --specifications--
Column 61, Line 54, after "means;" add a paragraph indentation
Column 61, Line 60, change "specification" to --specifications-- and change "each" to --such--
Column 64, Line 7, after "means" add ";"

Signed and Sealed this

Thirtieth Day of April, 1996

Attest:

BRUCE LEHMAN

Attesting Officer

Commissioner of Patents and Trademarks